(12) United States Patent
Wilkinson et al.

(10) Patent No.: US 10,430,817 B2
(45) Date of Patent: Oct. 1, 2019

(54) PARTIALITY VECTOR REFINEMENT SYSTEMS AND METHODS THROUGH SAMPLE PROBING

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 22 days.

(21) Appl. No.: 15/487,882

(22) Filed: Apr. 14, 2017

(65) Prior Publication Data

US 2017/0300944 A1    Oct. 19, 2017

Related U.S. Application Data

(60) Provisional application No. 62/485,045, filed on Apr. 13, 2017, provisional application No. 62/482,863, (Continued)

(51) Int. Cl.
*G06Q 30/02*    (2012.01)
*G06F 16/28*    (2019.01)

(52) U.S. Cl.
CPC ....... *G06Q 30/0203* (2013.01); *G06F 16/288* (2019.01)

(58) Field of Classification Search
None
See application file for complete search history.

(56) References Cited

U.S. PATENT DOCUMENTS 4,771,380 A    9/1988 Kris
4,931,929 A    6/1990 Sherman
(Continued)

FOREIGN PATENT DOCUMENTS

CA    2822865    2/2014
CN    103106267    5/2013
(Continued)

OTHER PUBLICATIONS

U.S. Appl. No. 15/487,538, filed Apr. 14, 2017, Bruce W. Wilkinson.
(Continued)

*Primary Examiner* — Thomas L Mansfield
(74) *Attorney, Agent, or Firm* — Fitch, Even, Tabin & Flannery LLP

(57) ABSTRACT

Some embodiments provide customer partiality vectorization refinement systems, comprising: a customer database storing a set of multiple customer partiality vectors for each of multiple different customers; a product database storing a set of multiple product partiality vectors for each of multiple different products; and a vectorized refinement control circuit configured to: identify, for a first customer, a multi-dimensional partiality vector target area defined by a limited range of partiality magnitudes and limited range of representative partiality directions; select a first product having at least a product partiality vector that is within a threshold alignment with the partiality vector target area, and cause the first product to be presented to the first customer; receive feedback associated with the first customer and corresponding to the first product; and adjust the partiality vector target area based on the feedback.

16 Claims, 20 Drawing Sheets

Related U.S. Application Data filed on Apr. 7, 2017, provisional application No. 62/467,546, filed on Mar. 6, 2017, provisional application No. 62/436,842, filed on Dec. 20, 2016, provisional application No. 62/348,444, filed on Jun. 10, 2016, provisional application No. 62/323,026, filed on Apr. 15, 2016.

(56) References Cited

U.S. PATENT DOCUMENTS

| | | |
|---|---|---|
| 5,092,343 A | 3/1992 | Spitzer |
| 5,357,439 A | 10/1994 | Matsuzaki |
| 5,410,471 A | 4/1995 | Alyfuku |
| 5,737,611 A | 4/1998 | Vicik |
| 5,974,396 A | 10/1999 | Anderson |
| 6,236,974 B1 | 5/2001 | Kolawa |
| 6,249,773 B1 | 6/2001 | Allard |
| 6,260,024 B1 | 7/2001 | Shkedy |
| 6,327,574 B1 | 12/2001 | Kramer |
| 6,519,571 B1 | 2/2003 | Guheen |
| 6,583,720 B1 | 6/2003 | Quigley |
| 6,594,642 B1 | 7/2003 | Lemchen |
| 6,615,208 B1 | 9/2003 | Behrens |
| 6,654,725 B1 | 11/2003 | Langheinrich |
| 6,731,940 B1 | 5/2004 | Nagendran |
| 6,826,541 B1 | 11/2004 | Johnston |
| 6,856,249 B2 | 2/2005 | Strubbe |
| 6,901,304 B2 | 5/2005 | Swan |
| 6,937,710 B1 | 8/2005 | Griffiths |
| 7,063,263 B2 | 6/2006 | Swartz |
| 7,072,848 B2 | 7/2006 | Boyd |
| 7,130,814 B1 | 10/2006 | Szabo |
| 7,147,154 B2 | 12/2006 | Myers |
| 7,174,312 B2 | 2/2007 | Harper |
| 7,225,979 B2 | 6/2007 | Silverbrook |
| 7,249,708 B2 | 7/2007 | McConnell |
| 7,330,828 B2 | 2/2008 | Schoder |
| 7,346,563 B2 | 3/2008 | Pellerin |
| 7,369,680 B2 | 5/2008 | Trajkovic |
| 7,508,307 B2 | 3/2009 | Albert |
| 7,584,139 B2 | 9/2009 | Goodwin |
| 7,657,457 B2 | 2/2010 | Razumov |
| 7,658,327 B2 | 2/2010 | Tuchman |
| 7,680,694 B2 | 3/2010 | Glazer |
| 7,685,024 B2 | 3/2010 | Ofer |
| 7,707,073 B2 | 4/2010 | Bloebaum |
| 7,720,720 B1 | 5/2010 | Sharma |
| 7,766,829 B2 | 8/2010 | Sloan |
| 7,778,773 B2 | 8/2010 | Yaqub |
| 7,814,029 B1 | 10/2010 | Siegel |
| 7,819,315 B1 | 10/2010 | Pienkos |
| 7,856,368 B2 | 12/2010 | Avallone |
| 7,860,759 B2 | 12/2010 | Stoppelman |
| 7,873,543 B2 | 1/2011 | Perrier |
| 7,945,473 B2 | 5/2011 | Fano |
| 8,036,951 B2 | 10/2011 | Kraft |
| 8,055,546 B1 | 11/2011 | Cassone |
| 8,073,460 B1 | 12/2011 | Scofield |
| 8,086,546 B2 | 12/2011 | Spiegel |
| 8,117,089 B2 | 2/2012 | Minsky |
| 8,140,388 B2 | 3/2012 | Gross |
| 8,244,830 B2 | 8/2012 | Robinson |
| 8,249,946 B2 | 8/2012 | Froseth |
| 8,261,306 B2 | 9/2012 | Dimitrova |
| 8,266,017 B1 | 9/2012 | Dearlove |
| 8,271,322 B2 | 9/2012 | Ariyibi |
| 8,285,715 B2 | 10/2012 | Faria |
| 8,316,020 B1 | 11/2012 | Kleinmann |
| 8,364,520 B1 | 1/2013 | Eichorn |
| 8,370,207 B2 | 2/2013 | Edwards |
| 8,370,216 B2 | 2/2013 | Kessel |
| 8,386,285 B2 | 2/2013 | Chen |
| 8,401,914 B1 | 3/2013 | Kim |
| 8,429,026 B1 | 4/2013 | Kolawa |
| 8,447,703 B2 | 5/2013 | Yuasa |
| 8,494,915 B2 | 7/2013 | Mesaros |
| 8,538,829 B1 | 9/2013 | Hu |
| 8,558,703 B2 | 10/2013 | Edlund |
| 8,577,753 B1 | 11/2013 | Vincent |
| 8,583,511 B2 | 11/2013 | Hendrickson |
| 8,595,773 B1 | 11/2013 | Wang |
| 8,606,636 B1 | 12/2013 | Keoshkerian |
| 8,606,645 B1 | 12/2013 | Applefeld |
| 8,630,921 B2 | 1/2014 | Nuzzi |
| 8,666,844 B2 | 3/2014 | Shaya |
| 8,738,541 B2 | 5/2014 | Gross |
| 8,744,920 B2 | 6/2014 | Aldomar |
| 8,803,366 B2 | 8/2014 | Proud |
| 8,818,876 B2 | 8/2014 | Yu |
| 8,849,719 B2 | 9/2014 | Baker |
| 8,874,485 B2 | 10/2014 | Partridge |
| 8,968,195 B2 | 3/2015 | Tran |
| 9,015,277 B1 | 4/2015 | Slavin |
| 9,030,295 B2 | 5/2015 | Allen |
| 9,036,019 B2 | 5/2015 | Hanson |
| 9,087,358 B1 | 7/2015 | Giorgalli |
| 9,129,250 B1 | 9/2015 | Sestini |
| 9,165,320 B1 | 10/2015 | Belvin |
| 9,174,758 B1 | 11/2015 | Rowley |
| 9,183,510 B1 | 11/2015 | Walti |
| 9,189,021 B2 | 11/2015 | Jerauld |
| 9,218,633 B2 | 12/2015 | Hulett |
| 9,224,157 B2 | 12/2015 | Lim |
| 9,230,070 B2 | 1/2016 | Farha |
| 9,251,527 B2 | 2/2016 | Shah |
| 9,256,693 B2 | 2/2016 | Nice |
| 9,256,890 B1 | 2/2016 | Schmidt |
| 9,286,617 B2 | 3/2016 | Maskatia |
| 9,294,298 B2 | 3/2016 | Lee |
| 9,325,849 B1 | 4/2016 | Brydon |
| 9,424,589 B2 | 8/2016 | Perrier |
| 9,451,576 B2 | 9/2016 | Lifshitz |
| 9,489,674 B2 | 11/2016 | Faith |
| 9,750,439 B2 | 9/2017 | Doniger |
| 10,169,971 B2 | 1/2019 | Wilkinson |
| 2001/0014868 A1 | 8/2001 | Herz |
| 2001/0034661 A1 | 10/2001 | Ferreira |
| 2002/0003166 A1 | 1/2002 | Miller |
| 2002/0010000 A1 | 1/2002 | Chern |
| 2002/0052825 A1 | 5/2002 | Bensemana |
| 2002/0095345 A1 | 7/2002 | Panelli |
| 2002/0128910 A1 | 9/2002 | Sakuma |
| 2002/0152001 A1 | 10/2002 | Knipp |
| 2002/0161664 A1 | 10/2002 | Shaya |
| 2002/0174025 A1 | 11/2002 | Hind |
| 2002/0178013 A1 | 11/2002 | Hoffman |
| 2002/0194604 A1 | 12/2002 | Sanchez |
| 2003/0028424 A1 | 2/2003 | Kampff |
| 2003/0065520 A1 | 4/2003 | Jutzi |
| 2003/0083951 A1 | 5/2003 | Connelly |
| 2003/0088370 A1 | 5/2003 | Bagepalli |
| 2003/0126023 A1 | 7/2003 | Crampton |
| 2003/0130897 A1 | 7/2003 | Pickover |
| 2003/0130908 A1 | 7/2003 | Hing |
| 2003/0149693 A1 | 8/2003 | Dobler |
| 2003/0177072 A1 | 9/2003 | Bared |
| 2003/0212619 A1 | 11/2003 | Jain |
| 2004/0030531 A1 | 2/2004 | Miller |
| 2004/0064379 A1 | 4/2004 | Anderson |
| 2004/0100380 A1 | 5/2004 | Lindsay |
| 2004/0103043 A1 | 5/2004 | Reade |
| 2004/0117383 A1 | 6/2004 | Lee |
| 2004/0153442 A1 | 8/2004 | Mantz |
| 2004/0158497 A1 | 8/2004 | Brand |
| 2004/0165708 A1 | 8/2004 | White |
| 2004/0176987 A1 | 9/2004 | Dial |
| 2004/0198386 A1 | 10/2004 | Dupray |
| 2004/0225651 A1 | 11/2004 | Musgrove |
| 2005/0034161 A1 | 2/2005 | Brown |
| 2005/0049920 A1 | 3/2005 | Day |
| 2005/0159996 A1 | 7/2005 | Lazarus |
| 2005/0187021 A1 | 8/2005 | Daskalakis |
| 2005/0189414 A1 | 9/2005 | Fano |
| 2005/0273377 A1 | 12/2005 | Ouimet |

(56) References Cited

U.S. PATENT DOCUMENTS

| | | |
|---|---|---|
| 2005/0283394 A1* | 12/2005 | McGloin ............... G06Q 10/10 705/7.32 |
| 2006/0010029 A1 | 1/2006 | Gross |
| 2006/0036485 A1 | 2/2006 | Duri |
| 2006/0055543 A1 | 3/2006 | Ganesh |
| 2006/0136293 A1 | 6/2006 | Kasravi |
| 2006/0183980 A1 | 8/2006 | Yang |
| 2006/0230053 A1 | 10/2006 | Eldering |
| 2006/0237532 A1 | 10/2006 | Scott-Leikach |
| 2006/0256008 A1 | 11/2006 | Rosenberg |
| 2006/0259360 A1 | 11/2006 | Flinn |
| 2006/0288374 A1 | 12/2006 | Ferris |
| 2007/0016488 A1 | 1/2007 | Ulenas |
| 2007/0035511 A1 | 2/2007 | Banerjee |
| 2007/0050201 A1 | 3/2007 | Gardner |
| 2007/0073553 A1 | 3/2007 | Flinn |
| 2007/0179846 A1 | 8/2007 | Jain |
| 2007/0219866 A1 | 9/2007 | Wolf |
| 2007/0244741 A1 | 10/2007 | Blume |
| 2007/0265870 A1 | 11/2007 | Song |
| 2007/0290038 A1 | 12/2007 | Woodcock |
| 2007/0294133 A1 | 12/2007 | Lasker |
| 2007/0299724 A1 | 12/2007 | Hales |
| 2008/0004995 A1 | 1/2008 | Klingenberg |
| 2008/0043013 A1 | 2/2008 | Gruttadauria |
| 2008/0052171 A1 | 2/2008 | Eldering |
| 2008/0059297 A1 | 3/2008 | Vallier |
| 2008/0065468 A1 | 3/2008 | Berg |
| 2008/0071622 A1 | 3/2008 | Walker |
| 2008/0089288 A1 | 4/2008 | Anschutz |
| 2008/0114642 A1 | 5/2008 | Goldberg |
| 2008/0208673 A1 | 8/2008 | Mebruer |
| 2008/0248815 A1 | 10/2008 | Busch |
| 2008/0288327 A1 | 11/2008 | Watarai |
| 2009/0012704 A1 | 1/2009 | Franco |
| 2009/0018996 A1 | 1/2009 | Hunt |
| 2009/0063290 A1 | 3/2009 | Mehew |
| 2009/0083121 A1 | 3/2009 | Angell |
| 2009/0094121 A1 | 4/2009 | Newhouse |
| 2009/0128325 A1 | 5/2009 | Ivanov |
| 2009/0132347 A1 | 5/2009 | Anderson |
| 2009/0164772 A1 | 6/2009 | Karkaria |
| 2009/0166375 A1 | 7/2009 | Butler |
| 2009/0171968 A1 | 7/2009 | Kane |
| 2009/0197616 A1 | 8/2009 | Lewis |
| 2009/0234712 A1 | 9/2009 | Kolawa |
| 2009/0271293 A1 | 10/2009 | Parkhurst |
| 2009/0303052 A1 | 12/2009 | Aklepi |
| 2010/0030578 A1 | 2/2010 | Siddique |
| 2010/0042940 A1 | 2/2010 | Monday |
| 2010/0064040 A1 | 3/2010 | Wise |
| 2010/0084463 A1 | 4/2010 | Huang |
| 2010/0133850 A1 | 6/2010 | Winkler |
| 2010/0185552 A1 | 7/2010 | Deluca |
| 2010/0198668 A1 | 8/2010 | Resnick |
| 2010/0216509 A1 | 8/2010 | Riemer |
| 2010/0293032 A1 | 11/2010 | Engelsma |
| 2010/0293569 A1 | 11/2010 | Kusumoto |
| 2011/0004588 A1 | 1/2011 | Leitersdorf |
| 2011/0022606 A1 | 1/2011 | Mason |
| 2011/0035282 A1 | 2/2011 | Spatscheck |
| 2011/0131089 A1 | 6/2011 | Walker |
| 2011/0213661 A1 | 9/2011 | Milana |
| 2011/0218859 A1 | 9/2011 | Wang |
| 2011/0225046 A1 | 9/2011 | Eldering |
| 2011/0246260 A1 | 10/2011 | Gilbert |
| 2011/0246306 A1 | 10/2011 | Blackhurst |
| 2011/0251897 A1 | 10/2011 | Litvack |
| 2011/0267374 A1 | 11/2011 | Sakata |
| 2011/0282476 A1 | 11/2011 | Hegemier |
| 2011/0302011 A1 | 12/2011 | Yoder |
| 2012/0019378 A1 | 1/2012 | Watson |
| 2012/0036522 A1 | 2/2012 | Wang |
| 2012/0054018 A1 | 3/2012 | Pradeep |
| 2012/0150626 A1 | 6/2012 | Zhang |
| 2012/0166268 A1 | 6/2012 | Griffiths |
| 2012/0259732 A1 | 10/2012 | Sasankan |
| 2012/0271740 A1 | 10/2012 | Connors |
| 2012/0310715 A1 | 12/2012 | Singhal |
| 2013/0030915 A1 | 1/2013 | Statler |
| 2013/0031018 A1 | 1/2013 | Jellum |
| 2013/0066740 A1 | 3/2013 | Ouimet |
| 2013/0073389 A1 | 3/2013 | Heath |
| 2013/0080364 A1 | 3/2013 | Wilson |
| 2013/0091146 A1 | 4/2013 | Stanger |
| 2013/0106604 A1 | 5/2013 | Lee |
| 2013/0138530 A1 | 5/2013 | Westphal |
| 2013/0232221 A1 | 5/2013 | Brechner |
| 2013/0140357 A1 | 6/2013 | Ure |
| 2013/0175335 A1 | 7/2013 | Roberts |
| 2013/0176115 A1 | 7/2013 | Puleston |
| 2013/0204737 A1 | 8/2013 | Agarwal |
| 2013/0214938 A1 | 8/2013 | Kim |
| 2013/0268317 A1 | 10/2013 | Mattila |
| 2013/0268335 A1 | 10/2013 | Cooper |
| 2013/0268886 A1 | 10/2013 | Sureshkumar |
| 2013/0275275 A1 | 10/2013 | Lemmons |
| 2013/0311324 A1 | 11/2013 | Stoll |
| 2013/0326008 A1 | 12/2013 | Morgan |
| 2013/0339122 A1 | 12/2013 | Truitt |
| 2014/0002643 A1 | 1/2014 | Aziz |
| 2014/0040038 A1 | 2/2014 | Hermanowski |
| 2014/0052562 A1 | 2/2014 | Oliveira |
| 2014/0058775 A1 | 2/2014 | Siig |
| 2014/0058794 A1 | 2/2014 | Malov |
| 2014/0074649 A1 | 3/2014 | Patel |
| 2014/0074743 A1 | 3/2014 | Rademaker |
| 2014/0089133 A1 | 3/2014 | Argue |
| 2014/0108125 A1 | 4/2014 | Maraz |
| 2014/0122228 A1 | 5/2014 | Wical |
| 2014/0129393 A1 | 5/2014 | Soon-Shiong |
| 2014/0156392 A1 | 6/2014 | Ouimet |
| 2014/0164046 A1 | 6/2014 | Haralambos |
| 2014/0164476 A1 | 6/2014 | Thomson |
| 2014/0180815 A1 | 6/2014 | Chatwin |
| 2014/0180953 A1 | 6/2014 | Westcott |
| 2014/0195902 A1 | 7/2014 | Yang |
| 2014/0207659 A1 | 7/2014 | Erez |
| 2014/0214543 A1 | 7/2014 | Gandhi |
| 2014/0214590 A1 | 7/2014 | Argue |
| 2014/0214600 A1 | 7/2014 | Argue |
| 2014/0214629 A1 | 7/2014 | Azam |
| 2014/0249966 A1 | 9/2014 | Zaragoza |
| 2014/0266791 A1 | 9/2014 | Lloyd |
| 2014/0278815 A1 | 9/2014 | Grant |
| 2014/0279200 A1 | 9/2014 | Hosein |
| 2014/0279202 A1 | 9/2014 | Egozi |
| 2014/0279208 A1 | 9/2014 | Nickitas |
| 2014/0279294 A1 | 9/2014 | Field-Darragh |
| 2014/0297001 A1 | 10/2014 | Silverman |
| 2014/0297470 A1 | 10/2014 | Ramadge |
| 2014/0304123 A1 | 10/2014 | Schwartz |
| 2014/0310040 A1 | 10/2014 | Carmichael |
| 2014/0310056 A1 | 10/2014 | Alapati |
| 2014/0316916 A1 | 10/2014 | Hay |
| 2014/0330738 A1 | 11/2014 | Falcone |
| 2014/0344102 A1 | 11/2014 | Cooper |
| 2015/0006314 A1 | 1/2015 | Goulart |
| 2015/0032847 A1 | 1/2015 | Van Coppenolle |
| 2015/0058154 A1 | 2/2015 | Appleyard |
| 2015/0058175 A1 | 2/2015 | Axt |
| 2015/0081469 A1 | 3/2015 | Acharyya |
| 2015/0106236 A1 | 4/2015 | Morris |
| 2015/0120550 A1 | 4/2015 | Jung |
| 2015/0120600 A1 | 4/2015 | Luwang |
| 2015/0139416 A1 | 5/2015 | Skiba |
| 2015/0149443 A1 | 5/2015 | Aravamudan |
| 2015/0161706 A1 | 6/2015 | Karmakar |
| 2015/0186773 A1 | 7/2015 | Weill |
| 2015/0186981 A1 | 7/2015 | Holman |
| 2015/0190086 A1 | 7/2015 | Chan |
| 2015/0193115 A1 | 7/2015 | Chirakan |
| 2015/0206246 A1 | 7/2015 | Lange |
| 2015/0221016 A1 | 8/2015 | Schulz |

(56) References Cited

U.S. PATENT DOCUMENTS

| | | |
|---|---|---|
| 2015/0227871 A1 | 8/2015 | Zeile |
| 2015/0227883 A1 | 8/2015 | Murphy |
| 2015/0242750 A1 | 8/2015 | Anderson |
| 2015/0254712 A1 | 9/2015 | Chen |
| 2015/0254785 A1 | 9/2015 | Yang |
| 2015/0256899 A1 | 9/2015 | Chand |
| 2015/0269642 A1 | 9/2015 | Cai |
| 2015/0310536 A1 | 10/2015 | Brady |
| 2015/0324490 A1* | 11/2015 | Page ................. G05B 19/4183 700/98 |
| 2015/0324881 A1 | 11/2015 | Ouimet |
| 2015/0356601 A1 | 12/2015 | Lu |
| 2015/0370985 A1 | 12/2015 | Carvalko |
| 2015/0379597 A1 | 12/2015 | Gupta |
| 2016/0005070 A1 | 1/2016 | Burr |
| 2016/0027068 A1 | 1/2016 | Brantley |
| 2016/0027094 A1 | 1/2016 | Chamyvelumani |
| 2016/0034907 A1 | 2/2016 | Worrall |
| 2016/0063440 A1 | 3/2016 | Webb |
| 2016/0063551 A1 | 3/2016 | Yankovich |
| 2016/0071116 A1 | 3/2016 | Atkins |
| 2016/0086255 A1 | 3/2016 | Sainfort |
| 2016/0092988 A1 | 3/2016 | Letourneau |
| 2016/0094703 A1 | 3/2016 | Wernevi |
| 2016/0098547 A1 | 4/2016 | Char |
| 2016/0110759 A1 | 4/2016 | Polehn |
| 2016/0140589 A1 | 5/2016 | Deshpande |
| 2016/0171424 A1 | 6/2016 | Kannan |
| 2016/0171539 A1 | 6/2016 | Ganduri |
| 2016/0171597 A1 | 6/2016 | Todeschini |
| 2016/0171866 A1 | 6/2016 | Dupasquier |
| 2016/0239857 A1 | 8/2016 | Milton |
| 2016/0253710 A1 | 9/2016 | Publicover |
| 2016/0283979 A1 | 9/2016 | Chatterton |
| 2016/0292634 A1 | 10/2016 | Mehring |
| 2016/0292769 A1 | 10/2016 | Colson |
| 2016/0300547 A1 | 10/2016 | El-Rukby |
| 2016/0345869 A1 | 12/2016 | Rishi |
| 2016/0350715 A1 | 12/2016 | Minvielle |
| 2016/0371650 A1 | 12/2016 | Schmidt |
| 2017/0109806 A1* | 4/2017 | Adoni ................. G06Q 30/0631 |
| 2017/0180147 A1 | 6/2017 | Brandman |
| 2017/0300856 A1 | 10/2017 | Wilkinson |
| 2017/0300936 A1 | 10/2017 | Wilkinson |
| 2017/0300946 A1 | 10/2017 | Wilkinson |
| 2017/0300956 A1 | 10/2017 | Cantrell |
| 2017/0300992 A1 | 10/2017 | Wilkinson |
| 2017/0300999 A1 | 10/2017 | Wilkinson |
| 2017/0301000 A1 | 10/2017 | Morgan |
| 2017/0301001 A1 | 10/2017 | Wilkinson |
| 2017/0301002 A1 | 10/2017 | Wilkinson |
| 2017/0301008 A1 | 10/2017 | Houdek-Heis |
| 2017/0308909 A1 | 10/2017 | Faith |
| 2017/0345033 A1 | 11/2017 | Wilkinson |
| 2017/0364860 A1 | 12/2017 | Wilkinson |
| 2017/0364925 A1 | 12/2017 | Wilkinson |
| 2017/0364962 A1 | 12/2017 | Wilkinson |
| 2018/0005177 A1 | 1/2018 | Wilkinson |
| 2018/0025365 A1 | 1/2018 | Wilkinson |
| 2018/0040044 A1 | 2/2018 | Mattingly |
| 2018/0047065 A1 | 2/2018 | Wildberger |
| 2018/0053240 A1 | 2/2018 | Jones |
| 2018/0060943 A1 | 3/2018 | Mattingly |
| 2018/0082252 A1 | 3/2018 | Wilkinson |
| 2018/0083908 A1 | 3/2018 | Dotan-Cohen |
| 2018/0107971 A1 | 4/2018 | Vukin |
| 2018/0108062 A1 | 4/2018 | McHale |
| 2018/0113431 A1 | 4/2018 | Wilkinson |
| 2018/0137461 A1 | 5/2018 | Wilkinson |
| 2018/0144397 A1 | 5/2018 | Wilkinson |
| 2018/0174101 A1 | 6/2018 | Mattingly |
| 2018/0174188 A1 | 6/2018 | Wilkinson |
| 2018/0174198 A1 | 6/2018 | Wilkinson |
| 2018/0174223 A1 | 6/2018 | Cantrell |
| 2018/0174224 A1 | 6/2018 | Wilkinson |
| 2018/0233014 A1 | 8/2018 | Wilkinson |
| 2018/0254096 A1 | 9/2018 | Karunanithi |
| 2018/0268357 A1 | 9/2018 | Cantrell |
| 2018/0285816 A1 | 10/2018 | Mattingly |
| 2018/0300677 A1 | 10/2018 | Wilkinson |
| 2018/0300788 A1 | 10/2018 | Mattingly |
| 2019/0005021 A1 | 1/2019 | Miller |

FOREIGN PATENT DOCUMENTS

| | | |
|---|---|---|
| CN | 203299604 | 11/2013 |
| CN | 203405712 | 1/2014 |
| CN | 203745868 | 7/2014 |
| EP | 3018591 | 5/2016 |
| JP | 2002123716 | 4/2002 |
| KR | 101220581 | 1/2013 |
| KR | 20130082894 | 7/2013 |
| KR | 101595538 | 2/2016 |
| WO | 2000033228 | 6/2000 |
| WO | 2000070481 | 11/2000 |
| WO | 2000073958 | 12/2000 |
| WO | 2001011511 | 2/2001 |
| WO | 2001073651 | 10/2001 |
| WO | 2001075680 | 10/2001 |
| WO | 2002003267 | 1/2002 |
| WO | 2006006940 | 1/2006 |
| WO | 2007041275 | 4/2007 |
| WO | 2007072579 | 6/2007 |
| WO | 2014195902 | 12/2014 |
| WO | 2015123751 | 8/2015 |
| WO | 2015171072 | 11/2015 |
| WO | 2016018994 | 2/2016 |
| WO | 2016085827 | 6/2016 |

OTHER PUBLICATIONS

U.S. Appl. No. 15/487,728, filed Apr. 14, 2017, Bruce W. Wilkinson.
U.S. Appl. No. 15/487,760, filed Apr. 14, 2017, Starla C. Morgan.
U.S. Appl. No. 15/487,775, filed Apr. 14, 2017, Robin Houdek-Heis.
U.S. Appl. No. 15/487,792, filed Apr. 14, 2017, Robert L. Cantrell.
U.S. Appl. No. 15/487,826, filed Apr. 14, 2017, Bruce W. Wilkinson.
U.S. Appl. No. 15/487,894, filed Apr. 14, 2017, Bruce W. Wilkinson.
U.S. Appl. No. 15/488,004, filed Apr. 14, 2017, Bruce W. Wilkinson.
U.S. Appl. No. 15/488,015, filed Apr. 14, 2017, Bruce W. Wilkinson.
U.S. Appl. No. 15/488,107, filed Apr. 14, 2017, Bruce W. Wilkinson.
U.S. Appl. No. 15/606,602, filed May 26, 2017, Bruce W. Wilkinson.
U.S. Appl. No. 15/624,030, filed Jun. 15, 2017, Bruce W. Wilkinson.
U.S. Appl. No. 15/625,599, filed Jun. 16, 2017, Bruce W. Wilkinson.
U.S. Appl. No. 15/628,282, filed Jun. 20, 2017, Bruce W. Wilkinson.
U.S. Appl. No. 15/634,862, filed Jun. 27, 2017, Bruce W. Wilkinson.
"Amazon Alexa;" Wikipedia; https://web.archive.org/web/20160926125220/https://en.wikipedia.org/wiki/Amazon_Alexa; Sep. 26, 2016; pp. 1-4.
"Amazon Dash Buttons;" Amazon; https://web.archive.org/web/20160623172354/https://www.amazon.com/Dash-Buttons/b?ie=UTF8&node=10667898011; Jun. 23, 2016; pp. 1-8.
"Amazon Dash;" Wikipedia; https://web.archive.org/web/20160310021300/https://en.wikipedia.org/wiki/Amazon_Dash; Mar. 10, 2016; pp. 1-2.
"Amazon Echo;" Amazon; https://web.archive.org/web/20160602024155/https://www.amazon.com/Amazon-Echo-Bluetooth-Speaker-with-WiFi-Alexa/dp/B00X4WHP5E; Jun. 2, 2016; pp. 1-10.
"Predicting Customer Needs with Forward Demand;" Blue Yonder; https://www.blueyonder.com/en/products/forward-demand.html; retrieved on Mar. 16, 2016; pp. 1-11.
Gustafson, Krystina; "The anti-Amazons: Two brands shaking up retail"; http://www.cnbc.com/2016/03/22/the-anti-amazons-two-brands-shaking-up-retail.html; Mar. 28, 2016; pp. 1-8.
Karim, Shah; "Seven Retail Megatrends for 2020;" Chain Store Age; http://www.chainstoreage.com/article/seven-retail-megatrends-2020; Feb. 22, 2015; pp. 1-3.
Kohan, Shelley E.; "5 Retail Trends for 2015;" RetailNext; https://retailnext.net/en/blog/retail-trends-2015/; Feb. 24, 2015; pp. 1-4.
Lu, Haiyun; "Recommendations Based on Purchase Patterns;"

(56) References Cited

OTHER PUBLICATIONS

International Journal of Machine Learning and Computing; vol. 4, No. 6; Dec. 2014; pp. 501-504.
Neo4j; "Walmart uses Neo4j to optimize customer experience with personal recommendations"; http://info.neo4j.com/rs/neotechnology/images/neo4j-casestudy-walmart.pdf; available at least as early as Mar. 29, 2016; pp. 1-2.
VENDHQ; "Retail Trends and Predictions 2016"; https://www.vendhq.com/us/university/retail-trends-and-predictions-2016; available at least as early as Apr. 2016; pp. 1-19.
U.S. Appl. No. 15/655,339, filed Jul. 20, 2017, Bruce W. Wilkinson.
U.S. Appl. No. 15/669,546, filed Aug. 4, 2017, Todd D. Mattingly.
U.S. Appl. No. 15/678,608, filed Aug. 16, 2017, Nicholaus A. Jones.
U.S. Appl. No. 15/685,981, filed Aug. 24, 2017, Todd D. Mattingly.
U.S. Appl. No. 15/704,878, filed Sep. 14, 2017, Bruce W. Wilkinson.
U.S. Appl. No. 15/782,509, filed Oct. 12, 2017, Greg N. Vukin.
U.S. Appl. No. 15/782,555, filed Oct. 12, 2017, Todd D. Mattingly.
U.S. Appl. No. 15/782,559, filed Oct. 12, 2017, Bruce W. Wilkinson.
U.S. Appl. No. 15/783,551, filed Oct. 13, 2017, Bruce W. Wilkinson.
U.S. Appl. No. 15/783,645, filed Oct. 13, 2017, Bruce W. Wilkinson.
U.S. Appl. No. 15/783,668, filed Oct. 13, 2017, Brian G. McHale.
U.S. Appl. No. 15/783,787, filed Oct. 13, 2017, Robert L. Cantrell.
U.S. Appl. No. 15/783,825, filed Oct. 13, 2017, Bruce W. Wilkinson.
U.S. Appl. No. 15/783,929, filed Oct. 13, 2017, Bruce W. Wilkinson.
U.S. Appl. No. 15/783,960, filed Oct. 13, 2017, Bruce W. Wilkinson.
Khan, Sal; "The dot product"; https://www.khanacademy.org/science/physics/magnetic-forces-and-magnetic-fields/electric-motors/v/the-dot-product; uploaded on Aug. 8, 2008, pp. 1-10.
PCT; App. No. PCT/US2017/027641; International Search Report and Written Opinion dated Aug. 28, 2017.
U.S. Appl. No. 15/921,540, filed Mar. 14, 2018, Robert L. Cantrell.
U.S. Appl. No. 15/939,788, filed Mar. 29, 2018, Mattingly.
U.S. Appl. No. 15/947,380, filed Apr. 6, 2018, Bruce W. Wilkinson.
U.S. Appl. No. 15/952,494, filed Apr. 13, 2018, Bruce W. Wilkinson.
Anagnostopoulos, Aris, et al.; "The Importance of Being Expert: Efficient Max-Finding in Crowdsourcing"; SIGMOD'15; ACM; May 31-Jun. 4, 2015; pp. 983-998.
Aung, Myo Min, et al.; "Quality Monitoring and Dynamic Pricing in Cold Chain Management"; World Academy of Science, Engineering and Technology International Journal of Mechanical, Aerospace, Industrial, Mechatronic and Manufacturing Engineering; vol. 6, No. 2; published 2012; pp. 454-458.
Bergen, Jennifer; "Korea's Tesco reinvents grocery shopping with QR-code 'stores'"; https://www.geek.com/mobile/koreas-tesco-reinvents-grocery-shopping-with-qr-code-stores-1396025/; Jun. 28, 2011; pp. 1-8.
Bid and Barter; "Bid and Barter"; http://www.bidandbarter.com/about.html; Retrieved on Nov. 24, 2016; pp. 1-2.
Borowski, Craig; "6 Tips to Shift from Reactive to Proactive Customer Service"; https://www.softwareadvice.com/resources/6-tips-shift-reactive-proactive-customer-service/; Retrieved on Nov. 22, 2016; pp. 1-9.
Cognizant; "Omnichannel Retailing | The Ditial Sotre of the Future | Cognizant"; http://www.youtube.com/watch?v=CRaiadNn_nw; published on Sep. 1, 2015; pp. 1-5.
Erlibird; "Recommendation System that Uses Big Data to Help People Find Gifts for their Facebook Friends"; https://erlibird.com/go/giftri-com; retrieved on May 30, 2016; pp. 1-4.
Ernst & Young LLP and the Retailers Association of India; "Movement of Goods in India"; rasci.in/downloads/2013/Movement_Goods_India.pdf; published on Dec. 5, 2013; pp. 1-28.
Giering, Michael; "Retail Sales Prediction and Item Recommendations Using Customer Demographics at Store Level"; ACM SIGKDD Explorations Newsletter; vol. 10, Issue 2, Dec. 2008; pp. 84-89.
He, Jianming et al.; "A Social Network-Based Recommender System (SNRS)"; Annals of Information Systems book series; vol. 12; May 20, 2010; pp. 47-74.

Hewlett-Packard; "HP C350B 8 GB USB Pen Drive With 1 Year Norton"; Amazon.com, http://www.amazon.in/HP-C350B-DRIVE-NORTON-ANTIVIRUS/dp/B00GZHE9KO; retrieved on Apr. 18, 2016, pp. 1.
Home Chef; "Home Chef Meal Delivery Service, Fresh Ingredients to Cook at Home"; https://web.archive.org/web/20160705144946/https://www.homechef.com/; available at least as early as Jul. 5, 2016; pp. 1-4.
IGoDigital; "iGoDigital: Creating a Personalized Multi-Channel Shopping Experience with Product Recommendations"; http://www.youtube.com/watch?v=Zvnd4RLnV5I; published on Aug. 15, 2012; pp. 1-4.
ip.com; "Intelligent Online Shopping Cart Which Can Automatically Pre-Load a Shopping List;" Prior Art Database; http://priorart.ip.com/IPCOM/00236206; Apr. 11, 2016; pp. 1-11.
Jakkula, V. et al.; "Detecting Anomalous Sensor Events in Smart Home Data for Enhancing the Living Experience"; Proceedings AAAIWS'11-07 Proceedings of the 7th AAAI Conference on Artificial Intelligence and Smarter Living: The Conquest of Complexity; 2011; pp. 33-37.
Jank, Wolfgang, et al.; "Understanding Geographical Markets of Online Firms Using Spatial Models of Customer Choice"; Marketing Science; vol. 24, No. 4; Fall 2005; pp. 623-634.
Kelso, Alicia; "Pizza Hut Serves Up Custom Pies on Interactive Tabletops"; http://www.kioskmarketplace.com/articles/pizza-hut-serves-up-custom-pies-on-interactive-tabletops/; Jun. 28, 2016; pp. 1-2.
Keng, Brian; "Beyond Collaborative Filtering (Part 1)"; http://rubikloud.com/labs/data-science/beyond-collaborative-filtering/; May 18, 2016; pp. 1-5.
Kiosk; "Vending Kiosk Software"; http://kiosk.com/market-solutions/vending-rental; Retrieved on Jun. 28, 2016; pp. 1-8.
Kohn, David, et al.; "A New Social Proof Application for Online Retailers that Drives Conversions"; http://www.barilliance.com/social-proof-application-for-ecommerce-sites/; Retrieved on Feb. 17, 2016; pp. 1-6.
Listonic SP. Z O.O.; "Smart Shopping List—Listonic"; https://play.google.com/store/apps/details?id=com.I; Retrieved on Nov. 24, 2016; pp. 1-3.
Maras, Elliot; "RFID: A Tool for Tracking Products, Assets and More"; http://www.foodlogistics.com/article/12141721/rfid-a-tool-for-tracking-products-assets-and-more; Dec. 17, 2015; pp. 1-9.
Mathisfun; "Dot Product"; https://web.archive.org/web/20140320190422/https://www.mathsisfun.com/algebra/vectors-dot-product.html; available at least Femeralas early as Mar. 20, 2014; pp. 1-5.
McDonald, Heath; "Who are "innovators" and do they matter?"; Marketing Intelligence & Planning; vol. 25, No. 5; 2007; pp. 1-18.
Menczer, Filippo, et al.; "Adaptive Assistants for Customized E-Shopping;" IEEE Intelligent Systems; vol. 17, Issue 6; Nov./Dec. 2002; https://www.computer.org/csdl/mags/ex/2002/06/x6012-abs.html; pp. 12-19.
Miles, Stephanie; "8 Tools for the In-Store Delivery of Mobile Coupons"; http://streetfightmag.com/2013/07/30/8-tools-for-the-in-store-delivery-of-mobile-coupons-2/; Jul. 30, 2013; pp. 1-6.
Organizy Ltd.; "Organizy Grocery Shopping List"; https://play.google.com/store/apps/details?id=com.organizy.shopping.list; Retrieved on Nov. 24, 2016; pp. 1-3.
Prassas, George, et al.; "Dynamic Recommendations in Internet Retailing"; Global Co-Operation in the New Millennium: The 9th European Conference on Information Systems; Athens University of Economics and Business; Jun. 27-29, 2001; pp. 368-379.
Shoukas, Denise; "The Future of Food Shopping Is Here"; https://www.specialtyfood.com/news/article/future-food-shopping-here/; Jun. 24, 2013; pp. 1-8.
study.com; "Classes of Adopters: Innovators, Early, Late and Laggards"; http://study.com/academy/lesson/classes-of-adopters-innovators-early-late-and-laggards.html; retrieved on Oct. 13, 2016; pp. 1-4.
Tan, Soo-Jiuan; "Predicting Innovation Adoption: a Choice-Based Approach"; In AP—Asia Pacific Advances in Consumer Research; vol. 1; National University of Singapore; 1994; pp. 72-78.

(56) References Cited

OTHER PUBLICATIONS

Uhler, David, et al.; "Mobile Computing, Applications, and Services"; Lecture Notes of the Institute for Computer Science, Social Informatics and Telecommunications Engineering; Feb. 5, 2013; pp. 380.

Vasal, Ityam; "Gift Recommender System for Amazon;" 583 Term Paper; retrieved on May 30, 2016; pp. 1-9.

Wikipedia; "Dot Product"; https://web.archive.org/web/20140815031517/https://en.wikipedia.org/wiki/Dot_product; available at least as early as Aug. 15, 2014; pp. 1-8.

Wylie, Jonathan; "How to Read QR Codes With a Smartphone"; https://www.pcworld.com/article/242873/how_to_read_qr_codes_with_a_smartphone.html; Nov. 1, 2011; pp. 1-3.

Yin, J. et al; "Sensor-Based Abnormal Human-Activity Detection"; IEEE Transactions on Knowledge and Data Engineering; vol. 20, Issue: 8, Aug. 2008; Jun. 27, 2008; pp. 1-25.

Zhu, Wei, et al.; "Personalized In-Store E-Commerce with the PromoPad: An Augmented Reality Shopping Assistant"; https://www.researchgate.net/publication/228786852_Personalized_In-store_E-Commerce_with_the_PromoPad_an_Augmented_Reality_Shopping_Assistant; Jan. 2004; pp. 1-19.

\* cited by examiner

PARTIALITY VECTOR REFINEMENT SYSTEMS AND METHODS THROUGH SAMPLE PROBING

CROSS-REFERENCE TO RELATED APPLICATION

This application claims the benefit of each of the following U.S. Provisional applications, each of which is incorporated herein by reference in its entirety: 62/323,026 filed Apr. 15, 2016; 62/348,444 filed Jun. 10, 2016; 62/436,842 filed Dec. 20, 2016; 62/485,045, filed Apr. 13, 2017; 62/467,546, filed Mar. 6, 2017; and 62/482,863, filed Apr. 7, 2017.

TECHNICAL FIELD

These teachings relate generally to providing products and services to individuals.

BACKGROUND

Various shopping paradigms are known in the art. One approach of long-standing use essentially comprises displaying a variety of different goods at a shared physical location and allowing consumers to view/experience those offerings as they wish to thereby make their purchasing selections. This model is being increasingly challenged due at least in part to the logistical and temporal inefficiencies that accompany this approach and also because this approach does not assure that a product best suited to a particular consumer will in fact be available for that consumer to purchase at the time of their visit.

Increasing efforts are being made to present a given consumer with one or more purchasing options that are selected based upon some preference of the consumer. Existing preference-based approaches leave much to be desired. Information regarding preferences, for example, may tend to be very product specific and accordingly may have little value apart from use with a very specific product or product category. As a result, while helpful, a preferences-based approach is inherently very limited in scope and offers only a very weak platform by which to assess a wide variety of product and service categories.

BRIEF DESCRIPTION OF THE DRAWINGS

Disclosed herein are embodiments of systems, apparatuses and methods pertaining to vector-based characterizations of products and individuals with respect to personal partialities. This description includes drawings, wherein.

Figure 1:
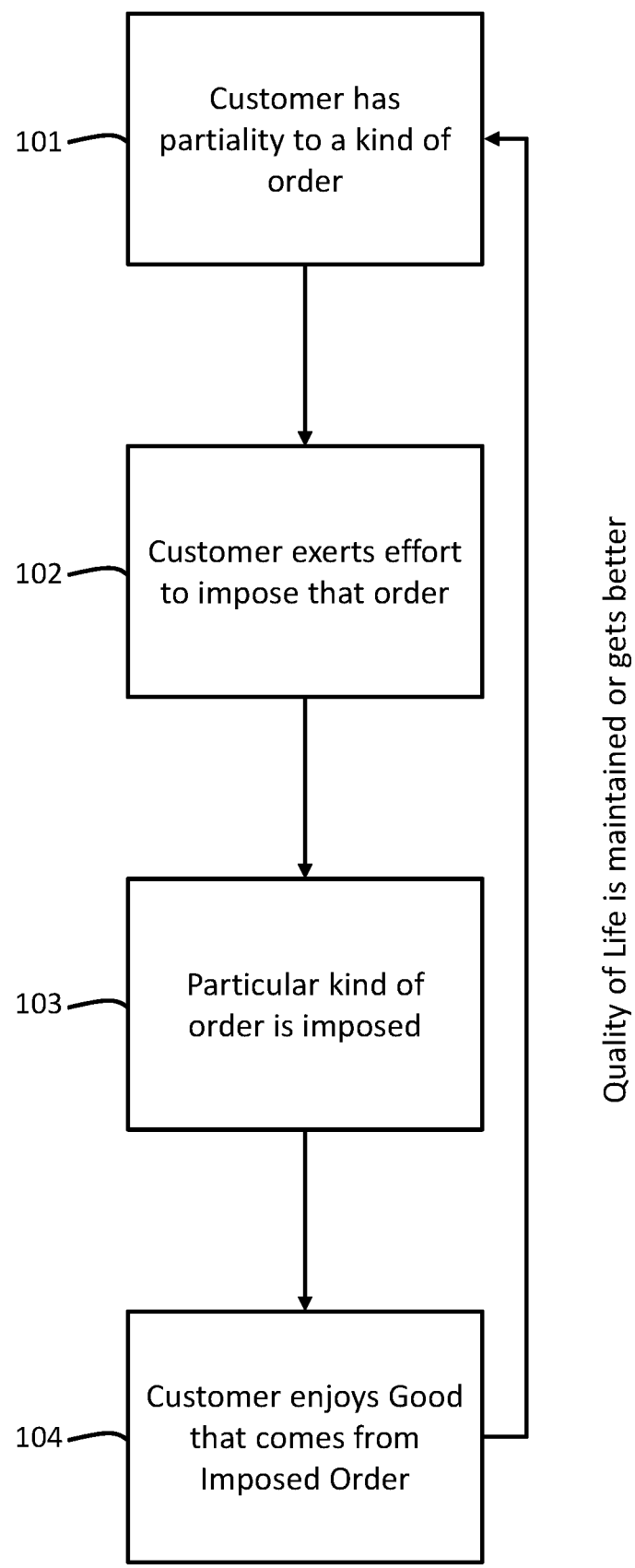
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, many of these embodiments provide for a memory having information stored therein that includes partiality information for each of a plurality of persons in the form of a plurality of partiality vectors for each of the persons wherein each partiality vector has at least one of a magnitude and an angle that corresponds to a magnitude of the person's belief in an amount of good that comes from an order associated with that partiality. This memory can also contain vectorized characterizations for each of a plurality of products, wherein each of the vectorized characterizations includes a measure regarding an extent to which a corresponding one of the products accords with a corresponding one of the plurality of partiality vectors.

Rules can then be provided that use the aforementioned information in support of a wide variety of activities and results. Although the described vector-based approaches bear little resemblance (if any) (conceptually or in practice) to prior approaches to understanding and/or metricizing a given person's product/service requirements, these approaches yield numerous benefits including, at least in some cases, reduced memory requirements, an ability to accommodate (both initially and dynamically over time) an essentially endless number and variety of partialities and/or product attributes, and processing/comparison capabilities that greatly ease computational resource requirements and/or greatly reduced time-to-solution results.

People tend to be partial to ordering various aspects of their lives, which is to say, people are partial to having things well arranged per their own personal view of how things should be. As a result, anything that contributes to the proper ordering of things regarding which a person has partialities represents value to that person. Quite literally, improving order reduces entropy for the corresponding person (i.e., a reduction in the measure of disorder present in that particular aspect of that person's life) and that improvement in order/reduction in disorder is typically viewed with favor by the affected person.

Generally speaking a value proposition must be coherent (logically sound) and have "force." Here, force takes the form of an imperative. When the parties to the imperative have a reputation of being trustworthy and the value proposition is perceived to yield a good outcome, then the imperative becomes anchored in the center of a belief that "this is something that I must do because the results will be good for me." With the imperative so anchored, the corresponding material space can be viewed as conforming to the order specified in the proposition that will result in the good outcome.

Pursuant to these teachings a belief in the good that comes from imposing a certain order takes the form of a value proposition. It is a set of coherent logical propositions by a trusted source that, when taken together, coalesce to form an imperative that a person has a personal obligation to order their lives because it will return a good outcome which improves their quality of life. This imperative is a value force that exerts the physical force (effort) to impose the desired order. The inertial effects come from the strength of the belief. The strength of the belief comes from the force of the value argument (proposition). And the force of the value proposition is a function of the perceived good and trust in the source that convinced the person's belief system to order material space accordingly. A belief remains constant until acted upon by a new force of a trusted value argument. This is at least a significant reason why the routine in people's lives remains relatively constant.

Newton's three laws of motion have a very strong bearing on the present teachings. Stated summarily, Newton's first law holds that an object either remains at rest or continues to move at a constant velocity unless acted upon by a force, the second law holds that the vector sum of the forces F on an object equal the mass m of that object multiplied by the acceleration a of the object (i.e., F=ma), and the third law holds that when one body exerts a force on a second body, the second body simultaneously exerts a force equal in magnitude and opposite in direction on the first body.

Relevant to both the present teachings and Newton's first law, beliefs can be viewed as having inertia. In particular, once a person believes that a particular order is good, they tend to persist in maintaining that belief and resist moving away from that belief. The stronger that belief the more force an argument and/or fact will need to move that person away from that belief to a new belief.

Relevant to both the present teachings and Newton's second law, the "force" of a coherent argument can be viewed as equaling the "mass" which is the perceived Newtonian effort to impose the order that achieves the aforementioned belief in the good which an imposed order brings multiplied by the change in the belief of the good which comes from the imposition of that order. Consider that when a change in the value of a particular order is observed then there must have been a compelling value claim influencing that change. There is a proportionality in that the greater the change the stronger the value argument. If a person values a particular activity and is very diligent to do that activity even when facing great opposition, we say they are dedicated, passionate, and so forth. If they stop doing the activity, it begs the question, what made them stop? The answer to that question needs to carry enough force to account for the change.

And relevant to both the present teachings and Newton's third law, for every effort to impose good order there is an equal and opposite good reaction.

FIG. 1 provides a simple illustrative example in these regards. At block 101 it is understood that a particular person has a partiality (to a greater or lesser extent) to a particular kind of order. At block 102 that person willingly exerts effort to impose that order to thereby, at block 103, achieve an arrangement to which they are partial. And at block 104, this person appreciates the "good" that comes from successfully imposing the order to which they are partial, in effect establishing a positive feedback loop.

Figure 2:
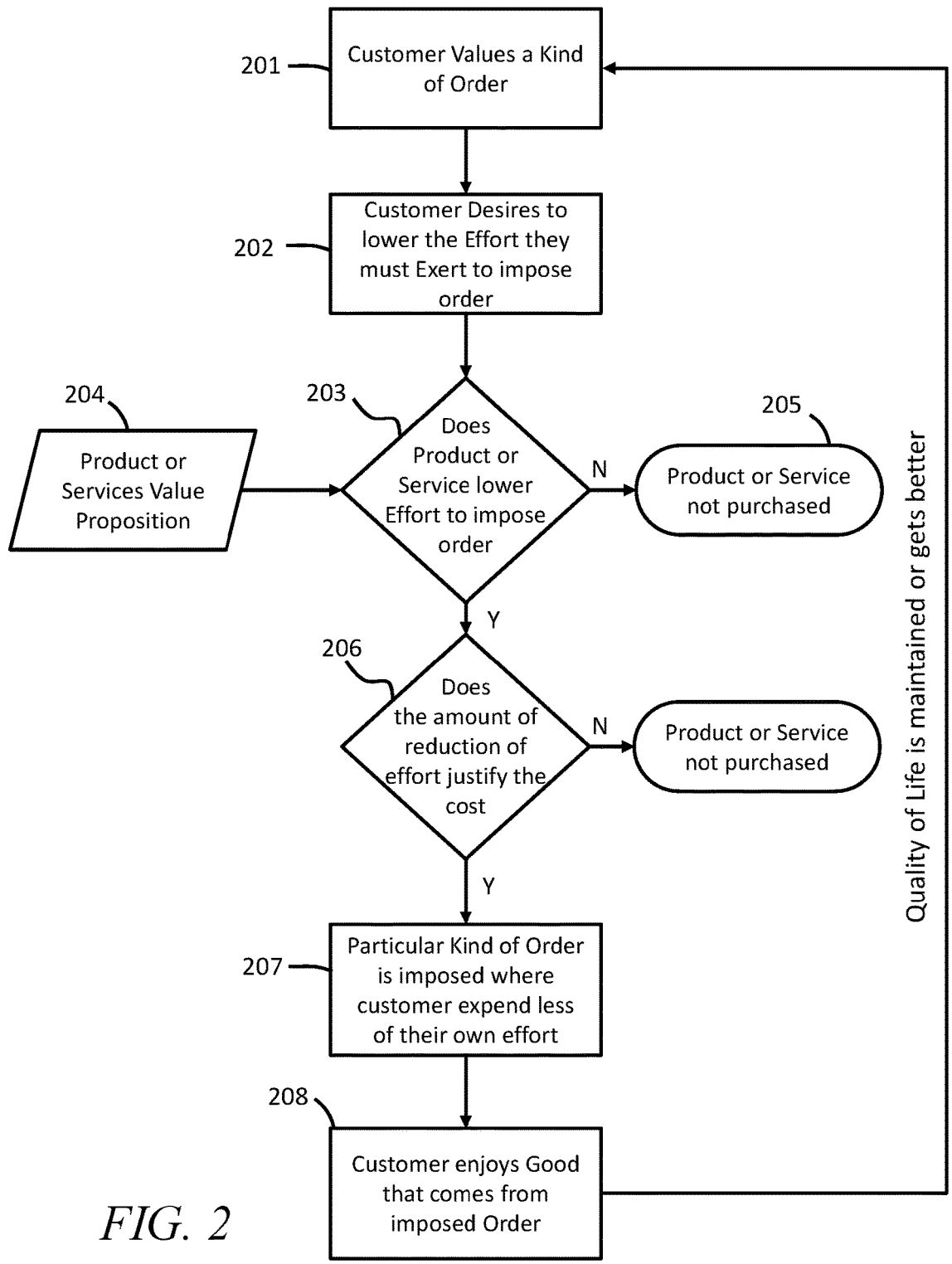
FIG. 2 comprises a flow diagram as configured in accordance with various embodiments of these teachings.

Understanding these partialities to particular kinds of order can be helpful to understanding how receptive a particular person may be to purchasing a given product or service. FIG. 2 provides a simple illustrative example in these regards. At block 201 it is understood that a particular person values a particular kind of order. At block 202 it is understood (or at least presumed) that this person wishes to lower the effort (or is at least receptive to lowering the effort) that they must personally exert to impose that order. At decision block 203 (and with access to information 204 regarding relevant products and or services) a determination can be made whether a particular product or service lowers the effort required by this person to impose the desired order. When such is not the case, it can be concluded that the person will not likely purchase such a product/service 205 (presuming better choices are available).

When the product or service does lower the effort required to impose the desired order, however, at block 206 a determination can be made as to whether the amount of the reduction of effort justifies the cost of purchasing and/or using the proffered product/service. If the cost does not justify the reduction of effort, it can again be concluded that the person will not likely purchase such a product/service 205. When the reduction of effort does justify the cost, however, this person may be presumed to want to purchase the product/service and thereby achieve the desired order (or at least an improvement with respect to that order) with less expenditure of their own personal effort (block 207) and thereby achieve, at block 208, corresponding enjoyment or appreciation of that result.

To facilitate such an analysis, the applicant has determined that factors pertaining to a person's partialities can be quantified and otherwise represented as corresponding vectors (where "vector" will be understood to refer to a geometric object/quantity having both an angle and a length/magnitude). These teachings will accommodate a variety of differing bases for such partialities including, for example, a person's values, affinities, aspirations, and preferences.

A value is a person's principle or standard of behavior, their judgment of what is important in life. A person's values represent their ethics, moral code, or morals and not a mere unprincipled liking or disliking of something. A person's value might be a belief in kind treatment of animals, a belief in cleanliness, a belief in the importance of personal care, and so forth.

An affinity is an attraction (or even a feeling of kinship) to a particular thing or activity. Examples including such a feeling towards a participatory sport such as golf or a spectator sport (including perhaps especially a particular team such as a particular professional or college football team), a hobby (such as quilting, model railroading, and so forth), one or more components of popular culture (such as a particular movie or television series, a genre of music or a particular musical performance group, or a given celebrity, for example), and so forth.

"Aspirations" refer to longer-range goals that require months or even years to reasonably achieve. As used herein "aspirations" does not include mere short term goals (such as making a particular meal tonight or driving to the store and back without a vehicular incident). The aspired-to goals, in turn, are goals pertaining to a marked elevation in one's core competencies (such as an aspiration to master a particular game such as chess, to achieve a particular articulated and recognized level of martial arts proficiency, or to attain a particular articulated and recognized level of cooking proficiency), professional status (such as an aspiration to receive a particular advanced education degree, to pass a professional examination such as a state Bar examination of a Certified Public Accountants examination, or to become Board certified in a particular area of medical practice), or life experience milestone (such as an aspiration to climb Mount Everest, to visit every state capital, or to attend a game at every major league baseball park in the United States). It will further be understood that the goal(s) of an aspiration is not something that can likely merely simply happen of its own accord; achieving an aspiration requires an intelligent effort to order one's life in a way that increases the likelihood of actually achieving the corresponding goal or goals to which that person aspires. One aspires to one day run their own business as versus, for example, merely hoping to one day win the state lottery.

A preference is a greater liking for one alternative over another or others. A person can prefer, for example, that their steak is cooked "medium" rather than other alternatives such as "rare" or "well done" or a person can prefer to play golf in the morning rather than in the afternoon or evening. Preferences can and do come into play when a given person makes purchasing decisions at a retail shopping facility. Preferences in these regards can take the form of a preference for a particular brand over other available brands or a preference for economy-sized packaging as versus, say, individual serving-sized packaging.

Values, affinities, aspirations, and preferences are not necessarily wholly unrelated. It is possible for a person's values, affinities, or aspirations to influence or even dictate their preferences in specific regards. For example, a person's moral code that values non-exploitive treatment of animals may lead them to prefer foods that include no animal-based ingredients and hence to prefer fruits and vegetables over beef and chicken offerings. As another example, a person's affinity for a particular musical group may lead them to prefer clothing that directly or indirectly references or otherwise represents their affinity for that group. As yet another example, a person's aspirations to become a Certified Public Accountant may lead them to prefer business-related media content.

While a value, affinity, or aspiration may give rise to or otherwise influence one or more corresponding preferences, however, is not to say that these things are all one and the same; they are not. For example, a preference may represent either a principled or an unprincipled liking for one thing over another, while a value is the principle itself. Accordingly, as used herein it will be understood that a partiality can include, in context, any one or more of a value-based, affinity-based, aspiration-based, and/or preference-based partiality unless one or more such features is specifically excluded per the needs of a given application setting.

Information regarding a given person's partialities can be acquired using any one or more of a variety of information-gathering and/or analytical approaches. By one simple approach, a person may voluntarily disclose information regarding their partialities (for example, in response to an online questionnaire or survey or as part of their social media presence). By another approach, the purchasing history for a given person can be analyzed to intuit the partialities that led to at least some of those purchases. By yet another approach demographic information regarding a particular person can serve as yet another source that sheds light on their partialities. Other ways that people reveal how they order their lives include but are not limited to: (1) their social networking profiles and behaviors (such as the things they "like" via Facebook, the images they post via Pinterest, informal and formal comments they initiate or otherwise provide in response to third-party postings including statements regarding their own personal long-term goals, the persons/topics they follow via Twitter, the photographs they publish via Picasso, and so forth); (2) their Internet surfing history; (3) their on-line or otherwise-published affinity-based memberships; (4) real-time (or delayed) information (such as steps walked, calories burned, geographic location, activities experienced, and so forth) from any of a variety of personal sensors (such as smart phones, tablet/pad-styled computers, fitness wearables, Global Positioning System devices, and so forth) and the so-called Internet of Things (such as smart refrigerators and pantries, entertainment and information platforms, exercise and sporting equipment, and so forth); (5) instructions, selections, and other inputs (including inputs that occur within augmented-reality user environments) made by a person via any of a variety of interactive interfaces (such as keyboards and cursor control devices, voice recognition, gesture-based controls, and eye tracking-based controls), and so forth.

The present teachings employ a vector-based approach to facilitate characterizing, representing, understanding, and leveraging such partialities to thereby identify products (and/or services) that will, for a particular corresponding consumer, provide for an improved or at least a favorable corresponding ordering for that consumer. Vectors are directed quantities that each have both a magnitude and a direction. Per the applicant's approach these vectors have a real, as versus a metaphorical, meaning in the sense of Newtonian physics. Generally speaking, each vector represents order imposed upon material space-time by a particular partiality.

Figure 3:
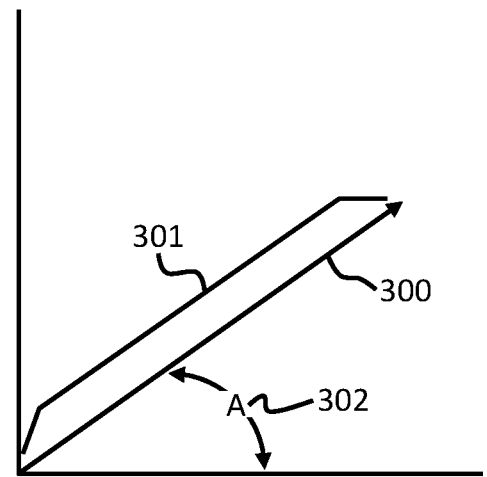
FIG. 3 comprises a graphic representation as configured in accordance with various embodiments of these teachings.

FIG. 3 provides some illustrative examples in these regards. By one approach the vector 300 has a corresponding magnitude 301 (i.e., length) that represents the magnitude of the strength of the belief in the good that comes from that imposed order (which belief, in turn, can be a function, relatively speaking, of the extent to which the order for this particular partiality is enabled and/or achieved). In this case, the greater the magnitude 301, the greater the strength of that belief and vice versa. Per another example, the vector 300 has a corresponding angle A 302 that instead represents the foregoing magnitude of the strength of the belief (and where, for example, an angle of 0° represents no such belief and an angle of 90° represents a highest magnitude in these regards, with other ranges being possible as desired).

Accordingly, a vector serving as a partiality vector can have at least one of a magnitude and an angle that corresponds to a magnitude of a particular person's belief in an amount of good that comes from an order associated with a particular partiality.

Applying force to displace an object with mass in the direction of a certain partiality-based order creates worth for a person who has that partiality. The resultant work (i.e., that force multiplied by the distance the object moves) can be viewed as a worth vector having a magnitude equal to the accomplished work and having a direction that represents the corresponding imposed order. If the resultant displacement results in more order of the kind that the person is partial to then the net result is a notion of "good." This "good" is a real quantity that exists in meta-physical space much like work is a real quantity in material space. The link between the "good" in meta-physical space and the work in material space is that it takes work to impose order that has value.

In the context of a person, this effort can represent, quite literally, the effort that the person is willing to exert to be compliant with (or to otherwise serve) this particular partiality. For example, a person who values animal rights would have a large magnitude worth vector for this value if they exerted considerable physical effort towards this cause by, for example, volunteering at animal shelters or by attending protests of animal cruelty.

While these teachings will readily employ a direct measurement of effort such as work done or time spent, these teachings will also accommodate using an indirect measurement of effort such as expense; in particular, money. In many cases people trade their direct labor for payment. The labor may be manual or intellectual. While salaries and payments can vary significantly from one person to another, a same sense of effort applies at least in a relative sense.

As a very specific example in these regards, there are wristwatches that require a skilled craftsman over a year to make. The actual aggregated amount of force applied to displace the small components that comprise the wristwatch would be relatively very small. That said, the skilled craftsman acquired the necessary skill to so assemble the wristwatch over many years of applying force to displace thousands of little parts when assembly previous wristwatches. That experience, based upon a much larger aggregation of previously-exerted effort, represents a genuine part of the "effort" to make this particular wristwatch and hence is fairly considered as part of the wristwatch's worth.

The conventional forces working in each person's mind are typically more-or-less constantly evaluating the value propositions that correspond to a path of least effort to thereby order their lives towards the things they value. A key reason that happens is because the actual ordering occurs in material space and people must exert real energy in pursuit of their desired ordering. People therefore naturally try to find the path with the least real energy expended that still moves them to the valued order. Accordingly, a trusted value proposition that offers a reduction of real energy will be embraced as being "good" because people will tend to be partial to anything that lowers the real energy they are required to exert while remaining consistent with their partialities.

Figure 4:
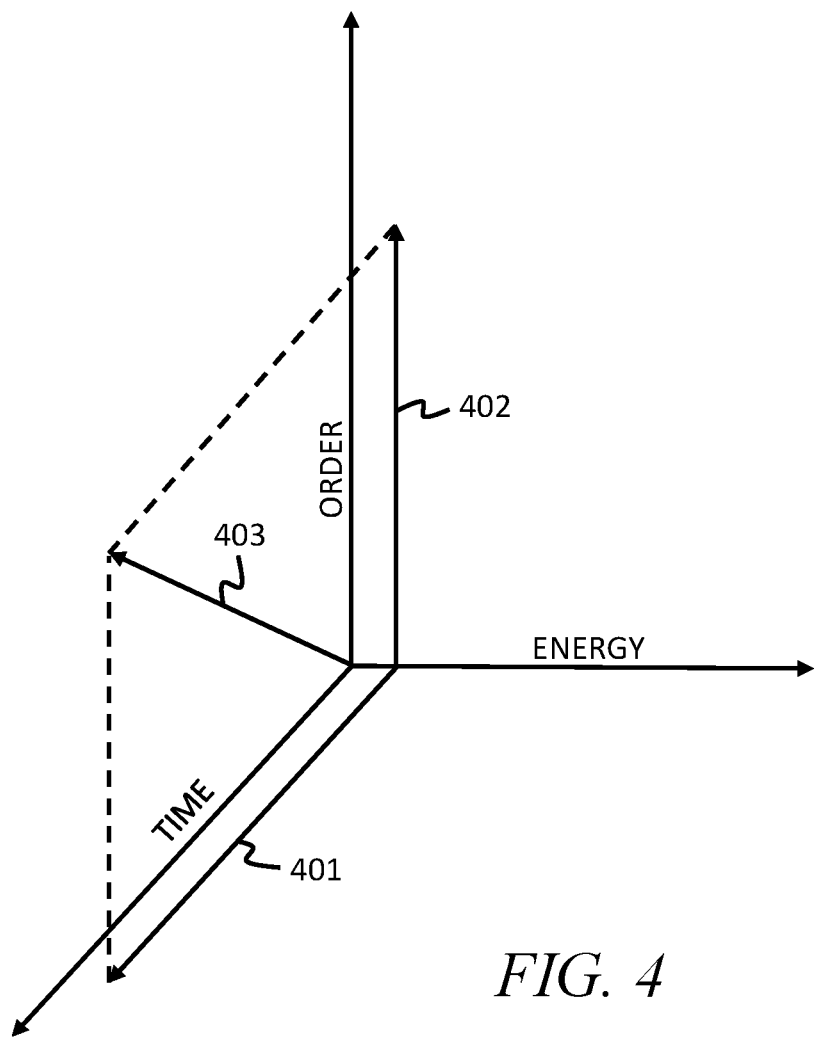
FIG. 4 comprises a graph as configured in accordance with various embodiments of these teachings.

FIG. 4 presents a space graph that illustrates many of the foregoing points. A first vector 401 represents the time required to make such a wristwatch while a second vector 402 represents the order associated with such a device (in this case, that order essentially represents the skill of the craftsman). These two vectors 401 and 402 in turn sum to form a third vector 403 that constitutes a value vector for this wristwatch. This value vector 403, in turn, is offset with respect to energy (i.e., the energy associated with manufacturing the wristwatch).

A person partial to precision and/or to physically presenting an appearance of success and status (and who presumably has the wherewithal) may, in turn, be willing to spend $100,000 for such a wristwatch. A person able to afford such a price, of course, may themselves be skilled at imposing a certain kind of order that other persons are partial to such that the amount of physical work represented by each spent dollar is small relative to an amount of dollars they receive when exercising their skill(s). (Viewed another way, wearing an expensive wristwatch may lower the effort required for such a person to communicate that their own personal success comes from being highly skilled in a certain order of high worth.)

Generally speaking, all worth comes from imposing order on the material space-time. The worth of a particular order generally increases as the skill required to impose the order increases. Accordingly, unskilled labor may exchange $10 for every hour worked where the work has a high content of unskilled physical labor while a highly-skilled data scientist may exchange $75 for every hour worked with very little accompanying physical effort.

Consider a simple example where both of these laborers are partial to a well-ordered lawn and both have a corresponding partiality vector in those regards with a same magnitude. To observe that partiality the unskilled laborer may own an inexpensive push power lawn mower that this person utilizes for an hour to mow their lawn. The data scientist, on the other hand, pays someone else $75 in this example to mow their lawn. In both cases these two individuals traded one hour of worth creation to gain the same worth (to them) in the form of a well-ordered lawn; the unskilled laborer in the form of direct physical labor and the data scientist in the form of money that required one hour of their specialized effort to earn.

This same vector-based approach can also represent various products and services. This is because products and services have worth (or not) because they can remove effort (or fail to remove effort) out of the customer's life in the direction of the order to which the customer is partial. In particular, a product has a perceived effort embedded into each dollar of cost in the same way that the customer has an amount of perceived effort embedded into each dollar earned. A customer has an increased likelihood of responding to an exchange of value if the vectors for the product and the customer's partiality are directionally aligned and where the magnitude of the vector as represented in monetary cost is somewhat greater than the worth embedded in the customer's dollar.

Put simply, the magnitude (and/or angle) of a partiality vector for a person can represent, directly or indirectly, a corresponding effort the person is willing to exert to pursue that partiality. There are various ways by which that value can be determined. As but one non-limiting example in these regards, the magnitude/angle V of a particular partiality vector can be expressed as:

$$V = \begin{bmatrix} X_1 \\ \vdots \\ X_n \end{bmatrix} [W_1 \ldots W_n]$$

where X refers to any of a variety of inputs (such as those described above) that can impact the characterization of a particular partiality (and where these teachings will accommodate either or both subjective and objective inputs as desired) and W refers to weighting factors that are appropriately applied the foregoing input values (and where, for example, these weighting factors can have values that themselves reflect a particular person's consumer personality or otherwise as desired and can be static or dynamically valued in practice as desired).

In the context of a product (or service) the magnitude/angle of the corresponding vector can represent the reduction of effort that must be exerted when making use of this product to pursue that partiality, the effort that was expended in order to create the product/service, the effort that the person perceives can be personally saved while nevertheless promoting the desired order, and/or some other corresponding effort. Taken as a whole the sum of all the vectors must be perceived to increase the overall order to be considered a good product/service.

It may be noted that while reducing effort provides a very useful metric in these regards, it does not necessarily follow that a given person will always gravitate to that which most reduces effort in their life. This is at least because a given person's values (for example) will establish a baseline against which a person may eschew some goods/services that might in fact lead to a greater overall reduction of effort but which would conflict, perhaps fundamentally, with their values. As a simple illustrative example, a given person might value physical activity. Such a person could experience reduced effort (including effort represented via monetary costs) by simply sitting on their couch, but instead will pursue activities that involve that valued physical activity. That said, however, the goods and services that such a person might acquire in support of their physical activities are still likely to represent increased order in the form of reduced effort where that makes sense. For example, a person who favors rock climbing might also favor rock climbing clothing and supplies that render that activity safer to thereby reduce the effort required to prevent disorder as a consequence of a fall (and consequently increasing the good outcome of the rock climber's quality experience).

By forming reliable partiality vectors for various individuals and corresponding product characterization vectors for a variety of products and/or services, these teachings provide a useful and reliable way to identify products/services that accord with a given person's own partialities (whether those partialities are based on their values, their affinities, their preferences, or otherwise).

It is of course possible that partiality vectors may not be available yet for a given person due to a lack of sufficient specific source information from or regarding that person. In this case it may nevertheless be possible to use one or more partiality vector templates that generally represent certain groups of people that fairly include this particular person. For example, if the person's gender, age, academic status/achievements, and/or postal code are known it may be useful to utilize a template that includes one or more partiality vectors that represent some statistical average or norm of other persons matching those same characterizing parameters. (Of course, while it may be useful to at least begin to employ these teachings with certain individuals by using one or more such templates, these teachings will also accommodate modifying (perhaps significantly and perhaps quickly) such a starting point over time as part of developing a more personal set of partiality vectors that are specific to the individual.) A variety of templates could be developed based, for example, on professions, academic pursuits and achievements, nationalities and/or ethnicities, characterizing hobbies, and the like.

Figure 5:
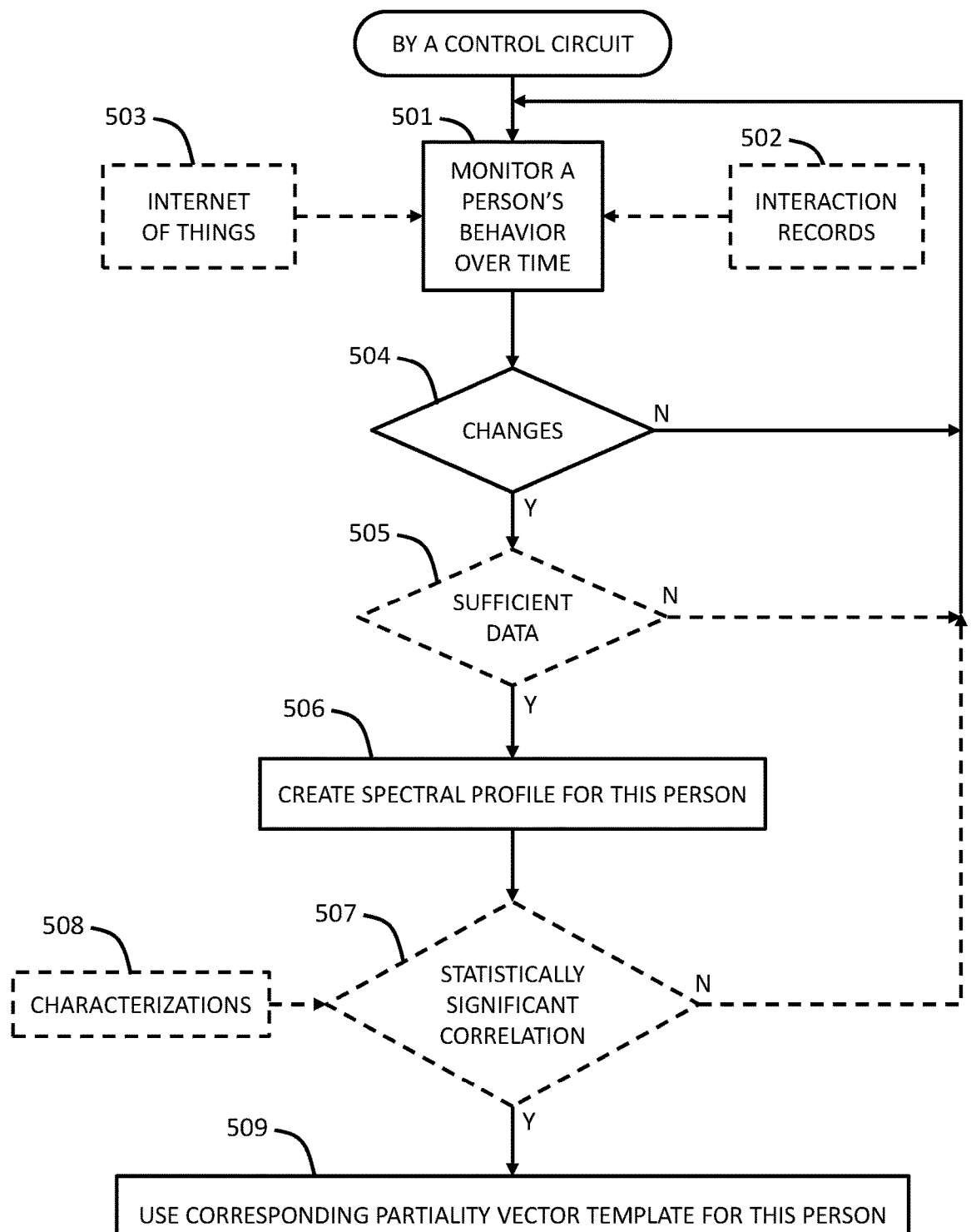
FIG. 5 comprises a flow diagram as configured in accordance with various embodiments of these teachings.

FIG. 5 presents a process 500 that illustrates yet another approach in these regards. For the sake of an illustrative example it will be presumed here that a control circuit of choice (with useful examples in these regards being presented further below) carries out one or more of the described steps/actions.

At block 501 the control circuit monitors a person's behavior over time. The range of monitored behaviors can vary with the individual and the application setting. By one approach, only behaviors that the person has specifically approved for monitoring are so monitored.

As one example in these regards, this monitoring can be based, in whole or in part, upon interaction records 502 that reflect or otherwise track, for example, the monitored person's purchases. This can include specific items purchased by the person, from whom the items were purchased, where the items were purchased, how the items were purchased (for example, at a bricks-and-mortar physical retail shopping facility or via an on-line shopping opportunity), the price paid for the items, and/or which items were returned and when), and so forth.

As another example in these regards the interaction records 502 can pertain to the social networking behaviors of the monitored person including such things as their "likes," their posted comments, images, and tweets, affinity group affiliations, their on-line profiles, their playlists and other indicated "favorites," and so forth. Such information can sometimes comprise a direct indication of a particular partiality or, in other cases, can indirectly point towards a particular partiality and/or indicate a relative strength of the person's partiality.

Other interaction records of potential interest include but are not limited to registered political affiliations and activities, credit reports, military-service history, educational and employment history, and so forth.

As another example, in lieu of the foregoing or in combination therewith, this monitoring can be based, in whole or in part, upon sensor inputs from the Internet of Things (IOT) 503. The Internet of Things refers to the Internet-based inter-working of a wide variety of physical devices including but not limited to wearable or carriable devices, vehicles, buildings, and other items that are embedded with electronics, software, sensors, network connectivity, and sometimes actuators that enable these objects to collect and exchange data via the Internet. In particular, the Internet of Things allows people and objects pertaining to people to be sensed and corresponding information to be transferred to remote locations via intervening network infrastructure. Some experts estimate that the Internet of Things will consist of almost 50 billion such objects by 2020. (Further description in these regards appears further herein.)

Depending upon what sensors a person encounters, information can be available regarding a person's travels, lifestyle, calorie expenditure over time, diet, habits, interests and affinities, choices and assumed risks, and so forth. This process 500 will accommodate either or both real-time or non-real time access to such information as well as either or both push and pull-based paradigms.

By monitoring a person's behavior over time a general sense of that person's daily routine can be established (sometimes referred to herein as a routine experiential base state). As a very simple illustrative example, a routine experiential base state can include a typical daily event timeline for the person that represents typical locations that the person visits and/or typical activities in which the person engages. The timeline can indicate those activities that tend to be scheduled (such as the person's time at their place of employment or their time spent at their child's sports practices) as well as visits/activities that are normal for the person though not necessarily undertaken with strict observance to a corresponding schedule (such as visits to local stores, movie theaters, and the homes of nearby friends and relatives).

At block 504 this process 500 provides for detecting changes to that established routine. These teachings are highly flexible in these regards and will accommodate a wide variety of "changes." Some illustrative examples include but are not limited to changes with respect to a person's travel schedule, destinations visited or time spent at a particular destination, the purchase and/or use of new and/or different products or services, a subscription to a new magazine, a new Rich Site Summary (RSS) feed or a subscription to a new blog, a new "friend" or "connection" on a social networking site, a new person, entity, or cause to follow on a Twitter-like social networking service, enrollment in an academic program, and so forth.

Upon detecting a change, at optional block 505 this process 500 will accommodate assessing whether the detected change constitutes a sufficient amount of data to warrant proceeding further with the process. This assessment can comprise, for example, assessing whether a sufficient number (i.e., a predetermined number) of instances of this particular detected change have occurred over some predetermined period of time. As another example, this assessment can comprise assessing whether the specific details of the detected change are sufficient in quantity and/or quality to warrant further processing. For example, merely detecting that the person has not arrived at their usual 6 PM-Wednesday dance class may not be enough information, in and of itself, to warrant further processing, in which case the information regarding the detected change may be discarded or, in the alternative, cached for further consideration and use in conjunction or aggregation with other, later-detected changes.

Figure 6:
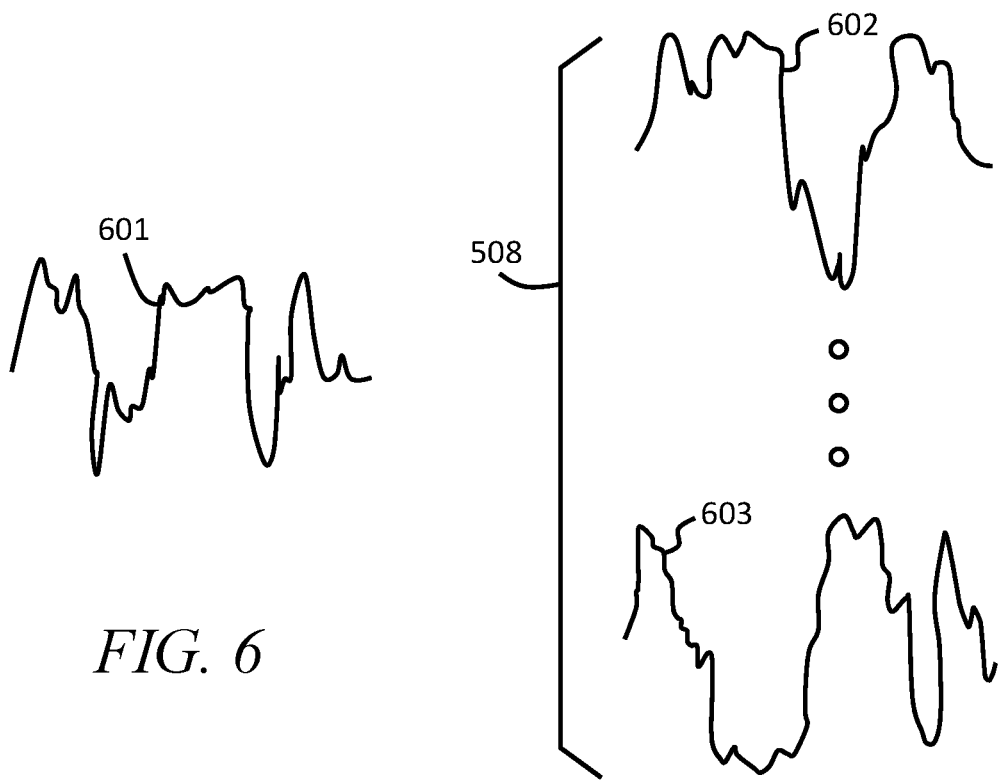
FIG. 6 comprises a graphic representation as configured in accordance with various embodiments of these teachings.

At block 507 this process 500 uses these detected changes to create a spectral profile for the monitored person. FIG. 6 provides an illustrative example in these regards with the spectral profile denoted by reference numeral 601. In this illustrative example the spectral profile 601 represents changes to the person's behavior over a given period of time (such as an hour, a day, a week, or some other temporal window of choice). Such a spectral profile can be as multidimensional as may suit the needs of a given application setting.

At optional block 507 this process 500 then provides for determining whether there is a statistically significant correlation between the aforementioned spectral profile and any of a plurality of like characterizations 508. The like characterizations 508 can comprise, for example, spectral profiles that represent an average of groupings of people who share many of the same (or all of the same) identified partialities. As a very simple illustrative example in these regards, a first such characterization 602 might represent a composite view of a first group of people who have three similar partialities but a dissimilar fourth partiality while another of the characterizations 603 might represent a composite view of a different group of people who share all four partialities.

The aforementioned "statistically significant" standard can be selected and/or adjusted to suit the needs of a given application setting. The scale or units by which this measurement can be assessed can be any known, relevant scale/unit including, but not limited to, scales such as standard deviations, cumulative percentages, percentile equivalents, Z-scores, T-scores, standard nines, and percentages in standard nines. Similarly, the threshold by which the level of statistical significance is measured/assessed can be set and selected as desired. By one approach the threshold is static such that the same threshold is employed regardless of the circumstances. By another approach the threshold is dynamic and can vary with such things as the relative size of the population of people upon which each of the characterizations 508 are based and/or the amount of data and/or the duration of time over which data is available for the monitored person.

Figure 7:
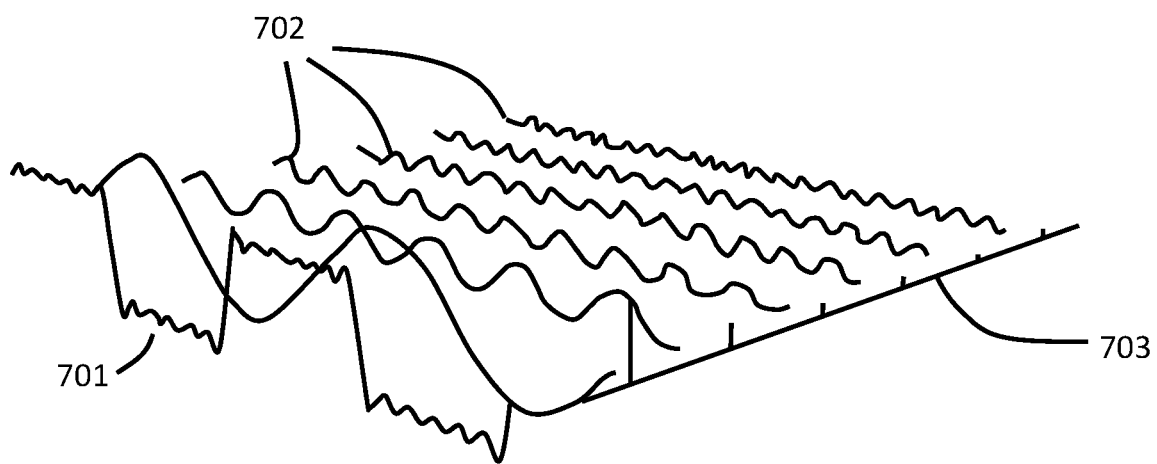
FIG. 7 comprises a graphic representation as configured in accordance with various embodiments of these teachings.

Referring now to FIG. 7, by one approach the selected characterization (denoted by reference numeral 701 in this figure) comprises an activity profile over time of one or more human behaviors. Examples of behaviors include but are not limited to such things as repeated purchases over time of particular commodities, repeated visits over time to particular locales such as certain restaurants, retail outlets, athletic or entertainment facilities, and so forth, and repeated activities over time such as floor cleaning, dish washing, car cleaning, cooking, volunteering, and so forth. Those skilled in the art will understand and appreciate, however, that the selected characterization is not, in and of itself, demographic data (as described elsewhere herein).

More particularly, the characterization 701 can represent (in this example, for a plurality of different behaviors) each instance over the monitored/sampled period of time when the monitored/represented person engages in a particular represented behavior (such as visiting a neighborhood gym, purchasing a particular product (such as a consumable perishable or a cleaning product), interacts with a particular affinity group via social networking, and so forth). The relevant overall time frame can be chosen as desired and can range in a typical application setting from a few hours or one day to many days, weeks, or even months or years. (It will be understood by those skilled in the art that the particular characterization shown in FIG. 7 is intended to serve an illustrative purpose and does not necessarily represent or mimic any particular behavior or set of behaviors).

Generally speaking it is anticipated that many behaviors of interest will occur at regular or somewhat regular intervals and hence will have a corresponding frequency or periodicity of occurrence. For some behaviors that frequency of occurrence may be relatively often (for example, oral hygiene events that occur at least once, and often multiple times each day) while other behaviors (such as the preparation of a holiday meal) may occur much less frequently (such as only once, or only a few times, each year). For at least some behaviors of interest that general (or specific) frequency of occurrence can serve as a significant indication of a person's corresponding partialities.

By one approach, these teachings will accommodate detecting and timestamping each and every event/activity/behavior or interest as it happens. Such an approach can be memory intensive and require considerable supporting infrastructure.

The present teachings will also accommodate, however, using any of a variety of sampling periods in these regards. In some cases, for example, the sampling period per se may be one week in duration. In that case, it may be sufficient to know that the monitored person engaged in a particular activity (such as cleaning their car) a certain number of times during that week without known precisely when, during that week, the activity occurred. In other cases it may be appropriate or even desirable, to provide greater granularity in these regards. For example, it may be better to know which days the person engaged in the particular activity or even the particular hour of the day. Depending upon the selected granularity/resolution, selecting an appropriate sampling window can help reduce data storage requirements (and/or corresponding analysis/processing overhead requirements).

Although a given person's behaviors may not, strictly speaking, be continuous waves (as shown in FIG. 7) in the same sense as, for example, a radio or acoustic wave, it will nevertheless be understood that such a behavioral characterization 701 can itself be broken down into a plurality of sub-waves 702 that, when summed together, equal or at least approximate to some satisfactory degree the behavioral characterization 701 itself (The more-discrete and sometimes less-rigidly periodic nature of the monitored behaviors may introduce a certain amount of error into the corresponding sub-waves. There are various mathematically satisfactory ways by which such error can be accommodated including by use of weighting factors and/or expressed tolerances that correspond to the resultant sub-waves.)

It should also be understood that each such sub-wave can often itself be associated with one or more corresponding discrete partialities. For example, a partiality reflecting concern for the environment may, in turn, influence many of the included behavioral events (whether they are similar or dissimilar behaviors or not) and accordingly may, as a sub-wave, comprise a relatively significant contributing factor to the overall set of behaviors as monitored over time. These sub-waves (partialities) can in turn be clearly revealed and presented by employing a transform (such as a Fourier transform) of choice to yield a spectral profile 703 wherein the X axis represents frequency and the Y axis represents the magnitude of the response of the monitored person at each frequency/sub-wave of interest.

Figure 8:
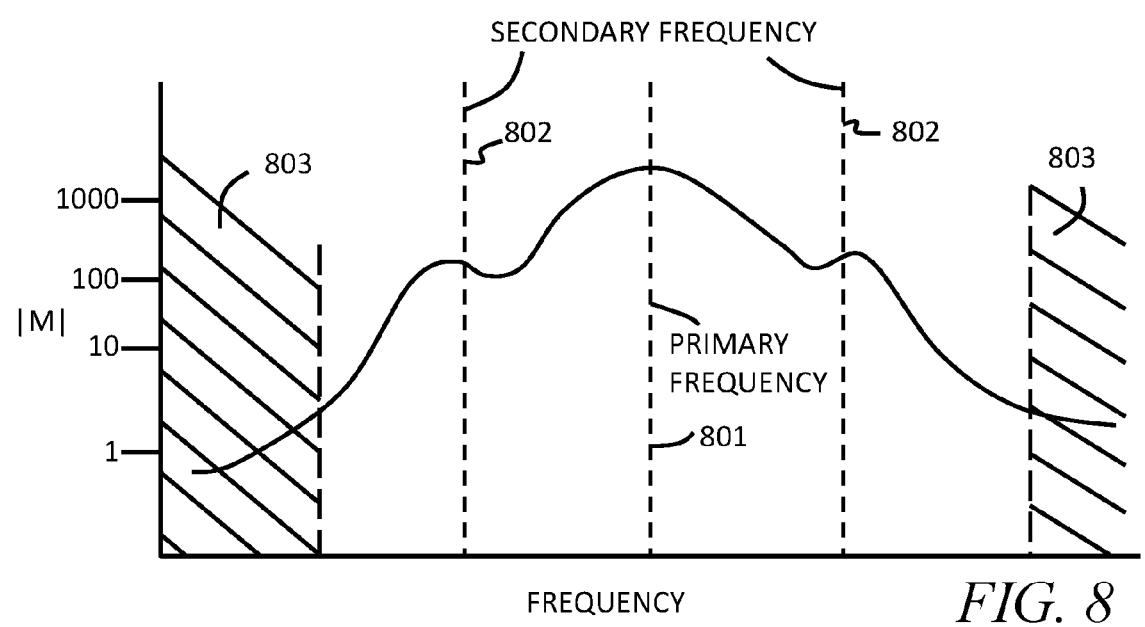
FIG. 8 comprises a graphic representation as configured in accordance with various embodiments of these teachings.

This spectral response of a given individual—which is generated from a time series of events that reflect/track that person's behavior—yields frequency response characteristics for that person that are analogous to the frequency response characteristics of physical systems such as, for example, an analog or digital filter or a second order electrical or mechanical system. Referring to FIG. 8, for many people the spectral profile of the individual person will exhibit a primary frequency 801 for which the greatest response (perhaps many orders of magnitude greater than other evident frequencies) to life is exhibited and apparent.

In addition, the spectral profile may also possibly identify one or more secondary frequencies 802 above and/or below that primary frequency 801. (It may be useful in many application settings to filter out more distant frequencies 803 having considerably lower magnitudes because of a reduced likelihood of relevance and/or because of a possibility of error in those regards; in effect, these lower-magnitude signals constitute noise that such filtering can remove from consideration.)

As noted above, the present teachings will accommodate using sampling windows of varying size. By one approach the frequency of events that correspond to a particular partiality can serve as a basis for selecting a particular sampling rate to use when monitoring for such events. For example, Nyquist-based sampling rules (which dictate sampling at a rate at least twice that of the frequency of the signal of interest) can lead one to choose a particular sampling rate (and the resultant corresponding sampling window size).

As a simple illustration, if the activity of interest occurs only once a week, then using a sampling of half-a-week and sampling twice during the course of a given week will adequately capture the monitored event. If the monitored person's behavior should change, a corresponding change can be automatically made. For example, if the person in the foregoing example begins to engage in the specified activity three times a week, the sampling rate can be switched to six times per week (in conjunction with a sampling window that is resized accordingly).

By one approach, the sampling rate can be selected and used on a partiality-by-partiality basis. This approach can be especially useful when different monitoring modalities are employed to monitor events that correspond to different partialities. If desired, however, a single sampling rate can be employed and used for a plurality (or even all) partialities/behaviors. In that case, it can be useful to identify the behavior that is exemplified most often (i.e., that behavior which has the highest frequency) and then select a sampling rate that is at least twice that rate of behavioral realization, as that sampling rate will serve well and suffice for both that highest-frequency behavior and all lower-frequency behaviors as well.

It can be useful in many application settings to assume that the foregoing spectral profile of a given person is an inherent and inertial characteristic of that person and that this spectral profile, in essence, provides a personality profile of that person that reflects not only how but why this person responds to a variety of life experiences. More importantly, the partialities expressed by the spectral profile for a given person will tend to persist going forward and will not typically change significantly in the absence of some powerful external influence (including but not limited to significant life events such as, for example, marriage, children, loss of job, promotion, and so forth).

In any event, by knowing a priori the particular partialities (and corresponding strengths) that underlie the particular characterization 701, those partialities can be used as an initial template for a person whose own behaviors permit the selection of that particular characterization 701. In particular, those particularities can be used, at least initially, for a person for whom an amount of data is not otherwise available to construct a similarly rich set of partiality information.

As a very specific and non-limiting example, per these teachings the choice to make a particular product can include consideration of one or more value systems of potential customers. When considering persons who value animal rights, a product conceived to cater to that value proposition may require a corresponding exertion of additional effort to order material space-time such that the product is made in a way that (A) does not harm animals and/or (even better) (B) improves life for animals (for example, eggs obtained from free range chickens). The reason a person exerts effort to order material space-time is because they believe it is good to do and/or not good to not do so. When a person exerts effort to do good (per their personal standard of "good") and if that person believes that a particular order in material space-time (that includes the purchase of a particular product) is good to achieve, then that person will also believe that it is good to buy as much of that particular product (in order to achieve that good order) as their finances and needs reasonably permit (all other things being equal).

The aforementioned additional effort to provide such a product can (typically) convert to a premium that adds to the price of that product. A customer who puts out extra effort in their life to value animal rights will typically be willing to pay that extra premium to cover that additional effort exerted by the company. By one approach a magnitude that corresponds to the additional effort exerted by the company can be added to the person's corresponding value vector because a product or service has worth to the extent that the product/service allows a person to order material space-time in accordance with their own personal value system while allowing that person to exert less of their own effort in direct support of that value (since money is a scalar form of effort).

By one approach there can be hundreds or even thousands of identified partialities. In this case, if desired, each product/service of interest can be assessed with respect to each and every one of these partialities and a corresponding partiality vector formed to thereby build a collection of partiality vectors that collectively characterize the product/service. As a very simple example in these regards, a given laundry detergent might have a cleanliness partiality vector with a relatively high magnitude (representing the effectiveness of the detergent), a ecology partiality vector that might be relatively low or possibly even having a negative magnitude (representing an ecologically disadvantageous effect of the detergent post usage due to increased disorder in the environment), and a simple-life partiality vector with only a modest magnitude (representing the relative ease of use of the detergent but also that the detergent presupposes that the user has a modern washing machine). Other partiality vectors for this detergent, representing such things as nutrition or mental acuity, might have magnitudes of zero.

As mentioned above, these teachings can accommodate partiality vectors having a negative magnitude. Consider, for example, a partiality vector representing a desire to order things to reduce one's so-called carbon footprint. A magnitude of zero for this vector would indicate a completely neutral effect with respect to carbon emissions while any positive-valued magnitudes would represent a net reduction in the amount of carbon in the atmosphere, hence increasing the ability of the environment to be ordered. Negative magnitudes would represent the introduction of carbon emissions that increases disorder of the environment (for example, as a result of manufacturing the product, transporting the product, and/or using the product).

Figure 9:
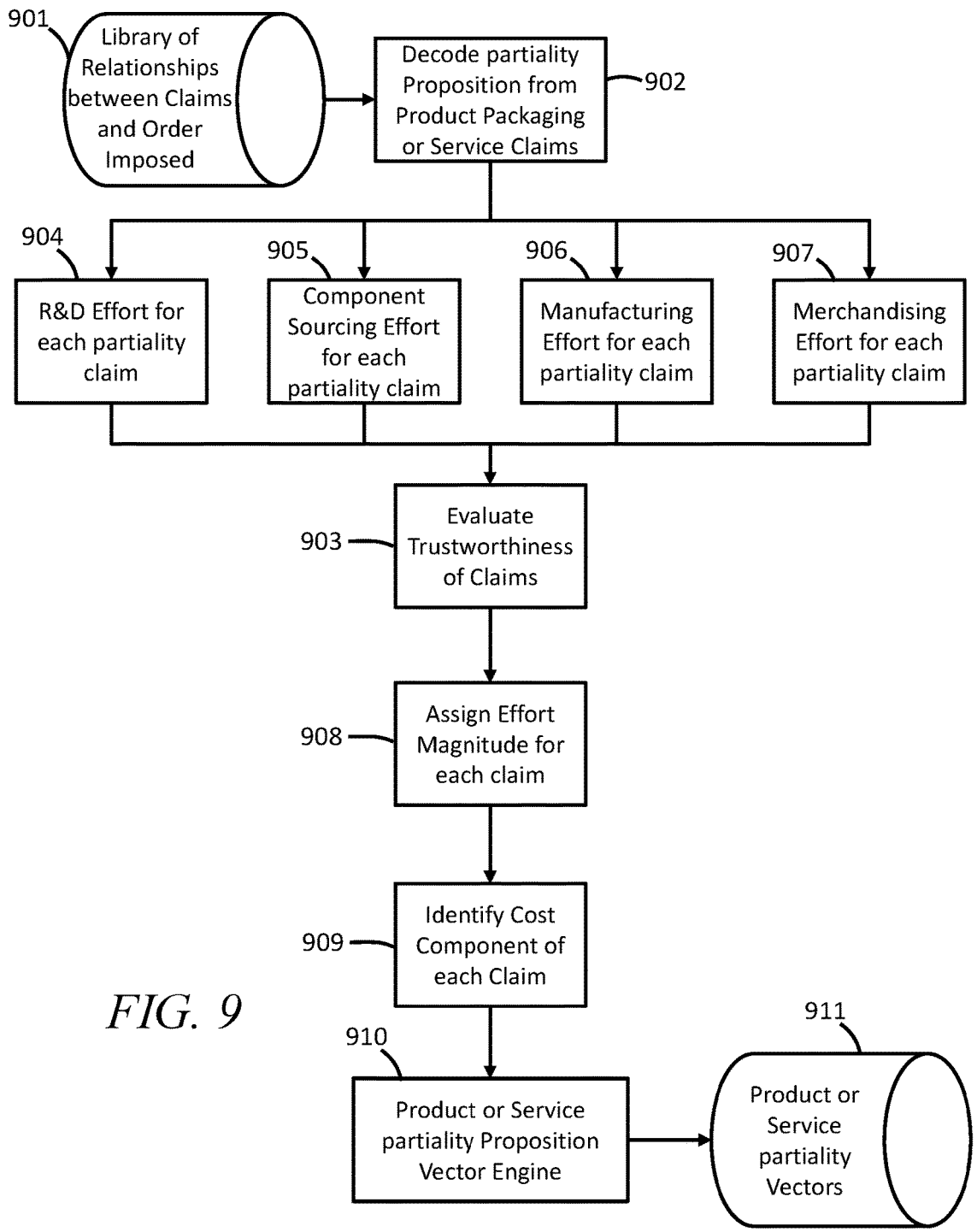
FIG. 9 comprises a flow diagram as configured in accordance with various embodiments of these teachings.

FIG. 9 presents one non-limiting illustrative example in these regards. The illustrated process presumes the availability of a library 901 of correlated relationships between product/service claims and particular imposed orders. Examples of product/service claims include such things as claims that a particular product results in cleaner laundry or household surfaces, or that a particular product is made in a particular political region (such as a particular state or country), or that a particular product is better for the environment, and so forth. The imposed orders to which such claims are correlated can reflect orders as described above that pertain to corresponding partialities.

At block 902 this process provides for decoding one or more partiality propositions from specific product packaging (or service claims). For example, the particular textual/graphics-based claims presented on the packaging of a given product can be used to access the aforementioned library 901 to identify one or more corresponding imposed orders from which one or more corresponding partialities can then be identified.

At block 903 this process provides for evaluating the trustworthiness of the aforementioned claims. This evaluation can be based upon any one or more of a variety of data points as desired. FIG. 9 illustrates four significant possibilities in these regards. For example, at block 904 an actual or estimated research and development effort can be quantified for each claim pertaining to a partiality. At block 905 an actual or estimated component sourcing effort for the product in question can be quantified for each claim pertaining to a partiality. At block 906 an actual or estimated manufacturing effort for the product in question can be quantified for each claim pertaining to a partiality. And at block 907 an actual or estimated merchandising effort for the product in question can be quantified for each claim pertaining to a partiality.

If desired, a product claim lacking sufficient trustworthiness may simply be excluded from further consideration. By another approach the product claim can remain in play but a lack of trustworthiness can be reflected, for example, in a corresponding partiality vector direction or magnitude for this particular product.

At block 908 this process provides for assigning an effort magnitude for each evaluated product/service claim. That effort can constitute a one-dimensional effort (reflecting, for example, only the manufacturing effort) or can constitute a multidimensional effort that reflects, for example, various categories of effort such as the aforementioned research and development effort, component sourcing effort, manufacturing effort, and so forth.

At block 909 this process provides for identifying a cost component of each claim, this cost component representing a monetary value. At block 910 this process can use the foregoing information with a product/service partiality propositions vector engine to generate a library 911 of one or more corresponding partiality vectors for the processed products/services. Such a library can then be used as described herein in conjunction with partiality vector information for various persons to identify, for example, products/services that are well aligned with the partialities of specific individuals.

Figure 10:
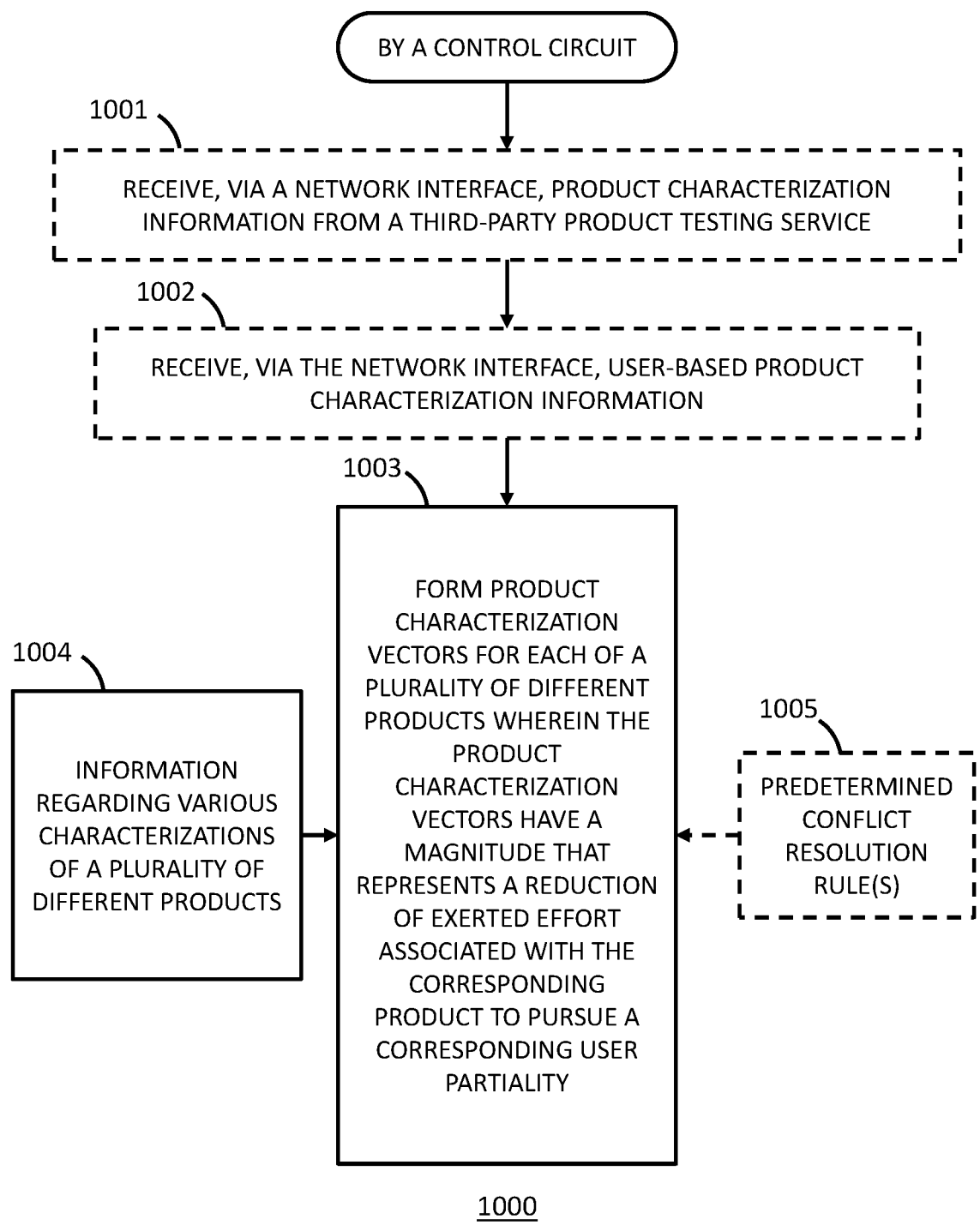
FIG. 10 comprises a flow diagram as configured in accordance with various embodiments of these teachings.

FIG. 10 provides another illustrative example in these same regards and may be employed in lieu of the foregoing or in total or partial combination therewith. Generally speaking, this process 1000 serves to facilitate the formation of product characterization vectors for each of a plurality of different products where the magnitude of the vector length (and/or the vector angle) has a magnitude that represents a reduction of exerted effort associated with the corresponding product to pursue a corresponding user partiality.

By one approach, and as illustrated in FIG. 10, this process 1000 can be carried out by a control circuit of choice. Specific examples of control circuits are provided elsewhere herein.

As described further herein in detail, this process 1000 makes use of information regarding various characterizations of a plurality of different products. These teachings are highly flexible in practice and will accommodate a wide variety of possible information sources and types of information. By one optional approach, and as shown at optional block 1001, the control circuit can receive (for example, via a corresponding network interface of choice) product characterization information from a third-party product testing service. The magazine/web resource Consumers Report provides one useful example in these regards. Such a resource provides objective content based upon testing, evaluation, and comparisons (and sometimes also provides subjective content regarding such things as aesthetics, ease of use, and so forth) and this content, provided as-is or pre-processed as desired, can readily serve as useful third-party product testing service product characterization information.

As another example, any of a variety of product-testing blogs that are published on the Internet can be similarly accessed and the product characterization information available at such resources harvested and received by the control circuit. (The expression "third party" will be understood to refer to an entity other than the entity that operates/controls the control circuit and other than the entity that provides the corresponding product itself.)

As another example, and as illustrated at optional block 1002, the control circuit can receive (again, for example, via a network interface of choice) user-based product characterization information. Examples in these regards include but are not limited to user reviews provided on-line at various retail sites for products offered for sale at such sites. The reviews can comprise metricized content (for example, a rating expressed as a certain number of stars out of a total available number of stars, such as 3 stars out of 5 possible stars) and/or text where the reviewers can enter their objective and subjective information regarding their observations and experiences with the reviewed products. In this case, "user-based" will be understood to refer to users who are not necessarily professional reviewers (though it is possible that content from such persons may be included with the information provided at such a resource) but who presumably purchased the product being reviewed and who have personal experience with that product that forms the basis of their review. By one approach the resource that offers such content may constitute a third party as defined above, but these teachings will also accommodate obtaining such content from a resource operated or sponsored by the enterprise that controls/operates this control circuit.

In any event, this process 1000 provides for accessing (see block 1004) information regarding various characterizations of each of a plurality of different products. This information 1004 can be gleaned as described above and/or can be obtained and/or developed using other resources as desired. As one illustrative example in these regards, the manufacturer and/or distributor of certain products may source useful content in these regards.

These teachings will accommodate a wide variety of information sources and types including both objective characterizing and/or subjective characterizing information for the aforementioned products.

Examples of objective characterizing information include, but are not limited to, ingredients information (i.e., specific components/materials from which the product is made), manufacturing locale information (such as country of origin, state of origin, municipality of origin, region of origin, and so forth), efficacy information (such as metrics regarding the relative effectiveness of the product to achieve a particular end-use result), cost information (such as per product, per ounce, per application or use, and so forth), availability information (such as present in-store availability, on-hand inventory availability at a relevant distribution center, likely or estimated shipping date, and so forth), environmental impact information (regarding, for example, the materials from which the product is made, one or more manufacturing processes by which the product is made, environmental impact associated with use of the product, and so forth), and so forth.

Examples of subjective characterizing information include but are not limited to user sensory perception information (regarding, for example, heaviness or lightness, speed of use, effort associated with use, smell, and so forth), aesthetics information (regarding, for example, how attractive or unattractive the product is in appearance, how well the product matches or accords with a particular design paradigm or theme, and so forth), trustworthiness information (regarding, for example, user perceptions regarding how likely the product is perceived to accomplish a particular purpose or to avoid causing a particular collateral harm), trendiness information, and so forth.

This information 1004 can be curated (or not), filtered, sorted, weighted (in accordance with a relative degree of trust, for example, accorded to a particular source of particular information), and otherwise categorized and utilized as desired. As one simple example in these regards, for some products it may be desirable to only use relatively fresh information (i.e., information not older than some specific cut-off date) while for other products it may be acceptable (or even desirable) to use, in lieu of fresh information or in combination therewith, relatively older information. As another simple example, it may be useful to use only information from one particular geographic region to characterize a particular product and to therefore not use information from other geographic regions.

At block 1003 the control circuit uses the foregoing information 1004 to form product characterization vectors for each of the plurality of different products. By one approach these product characterization vectors have a magnitude (for the length of the vector and/or the angle of the vector) that represents a reduction of exerted effort associated with the corresponding product to pursue a corresponding user partiality (as is otherwise discussed herein).

It is possible that a conflict will become evident as between various ones of the aforementioned items of information 1004. In particular, the available characterizations for a given product may not all be the same or otherwise in accord with one another. In some cases it may be appropriate to literally or effectively calculate and use an average to accommodate such a conflict. In other cases it may be useful to use one or more other predetermined conflict resolution rules 1005 to automatically resolve such conflicts when forming the aforementioned product characterization vectors.

These teachings will accommodate any of a variety of rules in these regards. By one approach, for example, the rule can be based upon the age of the information (where, for example the older (or newer, if desired) data is preferred or weighted more heavily than the newer (or older, if desired) data. By another approach, the rule can be based upon a number of user reviews upon which the user-based product characterization information is based (where, for example, the rule specifies that whichever user-based product characterization information is based upon a larger number of user reviews will prevail in the event of a conflict). By another approach, the rule can be based upon information regarding historical accuracy of information from a particular information source (where, for example, the rule specifies that information from a source with a better historical record of accuracy shall prevail over information from a source with a poorer historical record of accuracy in the event of a conflict).

By yet another approach, the rule can be based upon social media. For example, social media-posted reviews may be used as a tie-breaker in the event of a conflict between other more-favored sources. By another approach, the rule can be based upon a trending analysis. And by yet another approach the rule can be based upon the relative strength of brand awareness for the product at issue (where, for example, the rule specifies resolving a conflict in favor of a more favorable characterization when dealing with a product from a strong brand that evidences considerable consumer goodwill and trust).

It will be understood that the foregoing examples are intended to serve an illustrative purpose and are not offered as an exhaustive listing in these regards. It will also be understood that any two or more of the foregoing rules can be used in combination with one another to resolve the aforementioned conflicts.

By one approach the aforementioned product characterization vectors are formed to serve as a universal characterization of a given product. By another approach, however, the aforementioned information 1004 can be used to form product characterization vectors for a same characterization factor for a same product to thereby correspond to different usage circumstances of that same product. Those different usage circumstances might comprise, for example, different geographic regions of usage, different levels of user expertise (where, for example, a skilled, professional user might have different needs and expectations for the product than a casual, lay user), different levels of expected use, and so forth. In particular, the different vectorized results for a same characterization factor for a same product may have differing magnitudes from one another to correspond to different amounts of reduction of the exerted effort associated with that product under the different usage circumstances.

Figure 11:
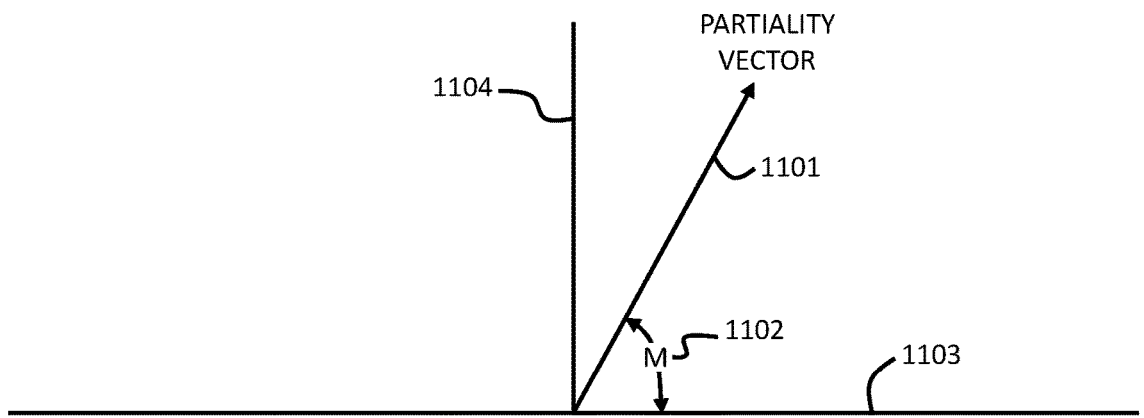
FIG. 11 comprises a graphic representation as configured in accordance with various embodiments of these teachings.

As noted above, the magnitude corresponding to a particular partiality vector for a particular person can be expressed by the angle of that partiality vector. FIG. 11 provides an illustrative example in these regards. In this example the partiality vector 1101 has an angle M 1102 (and where the range of available positive magnitudes range from a minimal magnitude represented by 0° (as denoted by reference numeral 1103) to a maximum magnitude represented by 90° (as denoted by reference numeral 1104)). Accordingly, the person to whom this partiality vector 1001 pertains has a relatively strong (but not absolute) belief in an amount of good that comes from an order associated with that partiality.

Figure 12:
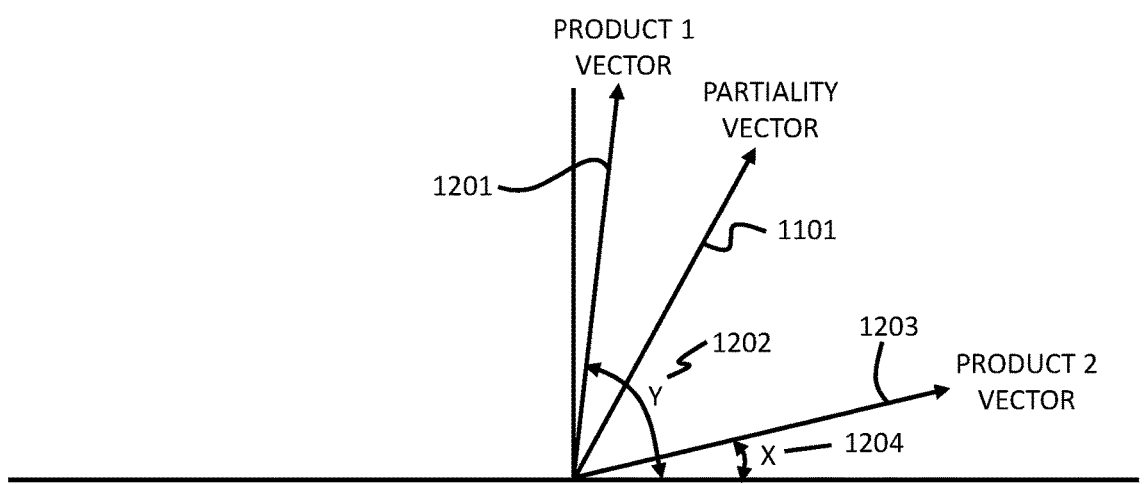
FIG. 12 comprises a graphic representation as configured in accordance with various embodiments of these teachings.

FIG. 12, in turn, presents that partiality vector 1101 in context with the product characterization vectors 1201 and 1203 for a first product and a second product, respectively. In this example the product characterization vector 1201 for the first product has an angle Y 1202 that is greater than the angle M 1102 for the aforementioned partiality vector 1101 by a relatively small amount while the product characterization vector 1203 for the second product has an angle X 1204 that is considerably smaller than the angle M 1102 for the partiality vector 1101.

Since, in this example, the angles of the various vectors represent the magnitude of the person's specified partiality or the extent to which the product aligns with that partiality, respectively, vector dot product calculations can serve to help identify which product best aligns with this partiality. Such an approach can be particularly useful when the lengths of the vectors are allowed to vary as a function of one or more parameters of interest. As those skilled in the art will understand, a vector dot product is an algebraic operation that takes two equal-length sequences of numbers (in this case, coordinate vectors) and returns a single number.

This operation can be defined either algebraically or geometrically. Algebraically, it is the sum of the products of the corresponding entries of the two sequences of numbers. Geometrically, it is the product of the Euclidean magnitudes of the two vectors and the cosine of the angle between them. The result is a scalar rather than a vector. As regards the present illustrative example, the resultant scaler value for the vector dot product of the product 1 vector 1201 with the partiality vector 1101 will be larger than the resultant scaler value for the vector dot product of the product 2 vector 1203 with the partiality vector 1101. Accordingly, when using vector angles to impart this magnitude information, the vector dot product operation provides a simple and convenient way to determine proximity between a particular partiality and the performance/properties of a particular product to thereby greatly facilitate identifying a best product amongst a plurality of candidate products.

By way of further illustration, consider an example where a particular consumer as a strong partiality for organic produce and is financially able to afford to pay to observe that partiality. A dot product result for that person with respect to a product characterization vector(s) for organic apples that represent a cost of $10 on a weekly basis (i.e., Cv·P1v) might equal (1,1), hence yielding a scalar result of $\|1\|$ (where Cv refers to the corresponding partiality vector for this person and P1v represents the corresponding product characterization vector for these organic apples). Conversely, a dot product result for this same person with respect to a product characterization vector(s) for non-organic apples that represent a cost of $5 on a weekly basis (i.e., Cv·P2v) might instead equal (1,0), hence yielding a scalar result of $\|½\|$. Accordingly, although the organic apples cost more than the non-organic apples, the dot product result for the organic apples exceeds the dot product result for the non-organic apples and therefore identifies the more expensive organic apples as being the best choice for this person.

To continue with the foregoing example, consider now what happens when this person subsequently experiences some financial misfortune (for example, they lose their job and have not yet found substitute employment). Such an event can present the "force" necessary to alter the previously-established "inertia" of this person's steady-state partialities; in particular, these negatively-changed financial circumstances (in this example) alter this person's budget sensitivities (though not, of course their partiality for organic produce as compared to non-organic produce). The scalar result of the dot product for the $5/week non-organic apples may remain the same (i.e., in this example, $\|½\|$), but the dot product for the $10/week organic apples may now drop (for example, to $\|½\|$ as well). Dropping the quantity of organic apples purchased, however, to reflect the tightened financial circumstances for this person may yield a better dot product result. For example, purchasing only $5 (per week) of organic apples may produce a dot product result of $\|1\|$. The best result for this person, then, under these circumstances, is a lesser quantity of organic apples rather than a larger quantity of non-organic apples.

In a typical application setting, it is possible that this person's loss of employment is not, in fact, known to the system. Instead, however, this person's change of behavior (i.e., reducing the quantity of the organic apples that are purchased each week) might well be tracked and processed to adjust one or more partialities (either through an addition or deletion of one or more partialities and/or by adjusting the corresponding partiality magnitude) to thereby yield this new result as a preferred result.

The foregoing simple examples clearly illustrate that vector dot product approaches can be a simple yet powerful way to quickly eliminate some product options while simultaneously quickly highlighting one or more product options as being especially suitable for a given person.

Such vector dot product calculations and results, in turn, help illustrate another point as well. As noted above, sine waves can serve as a potentially useful way to characterize and view partiality information for both people and products/services. In those regards, it is worth noting that a vector dot product result can be a positive, zero, or even negative value. That, in turn, suggests representing a particular solution as a normalization of the dot product value relative to the maximum possible value of the dot product. Approached this way, the maximum amplitude of a particular sine wave will typically represent a best solution.

Taking this approach further, by one approach the frequency (or, if desired, phase) of the sine wave solution can provide an indication of the sensitivity of the person to product choices (for example, a higher frequency can indicate a relatively highly reactive sensitivity while a lower frequency can indicate the opposite). A highly sensitive person is likely to be less receptive to solutions that are less than fully optimum and hence can help to narrow the field of candidate products while, conversely, a less sensitive person is likely to be more receptive to solutions that are less than fully optimum and can help to expand the field of candidate products.

Figure 13:
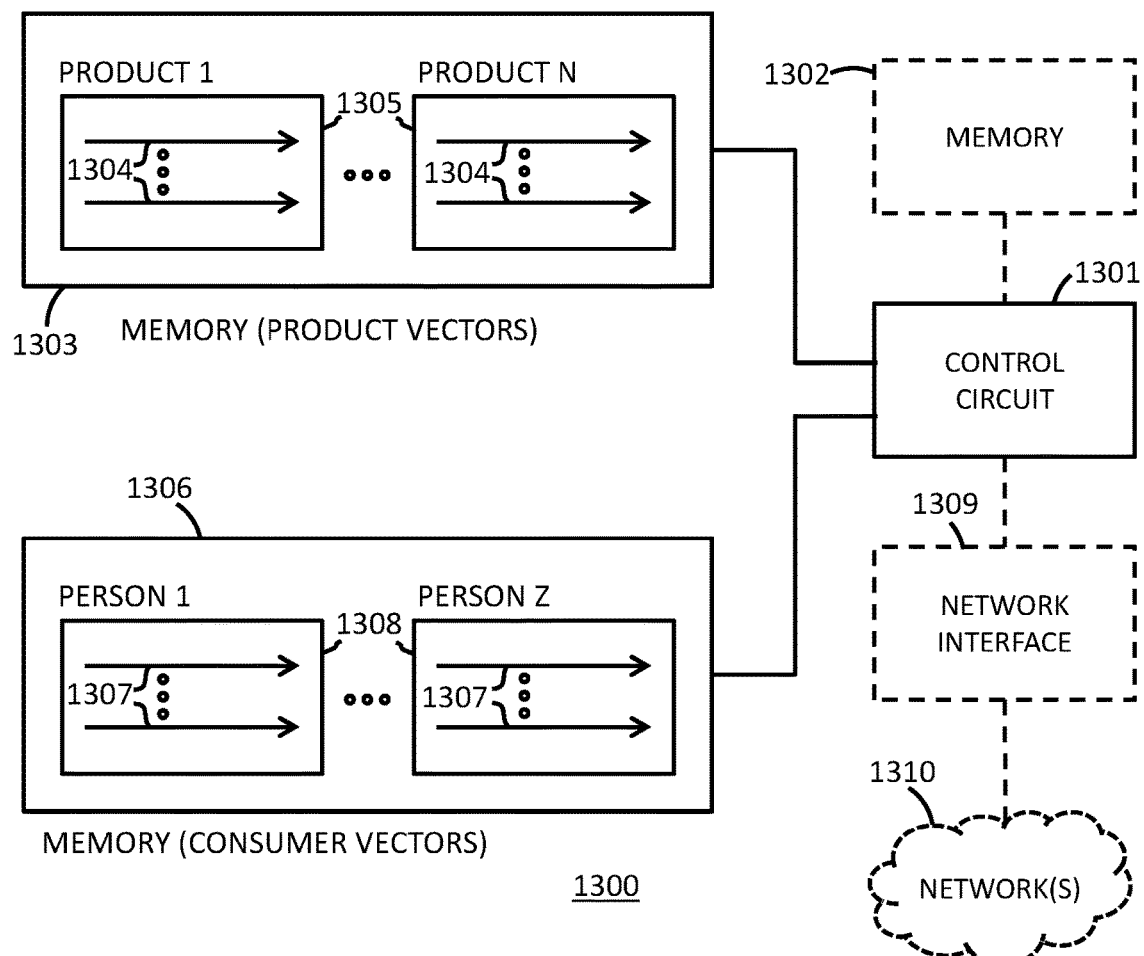
FIG. 13 comprises a block diagram as configured in accordance with various embodiments of these teachings.

FIG. 13 presents an illustrative apparatus 1300 for conducting, containing, and utilizing the foregoing content and capabilities. In this particular example, the enabling apparatus 1300 includes a control circuit 1301. Being a "circuit," the control circuit 1301 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 1301 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 1301 is configured (for example, by using corresponding programming as will be well understood by those skilled in the art) to carry out one or more of the steps, actions, and/or functions described herein.

By one optional approach the control circuit 1301 operably couples to a memory 1302. This memory 1302 may be integral to the control circuit 1301 or can be physically discrete (in whole or in part) from the control circuit 1301 as desired. This memory 1302 can also be local with respect to the control circuit 1301 (where, for example, both share a common circuit board, chassis, power supply, and/or housing) or can be partially or wholly remote with respect to the control circuit 1301 (where, for example, the memory 1302 is physically located in another facility, metropolitan area, or even country as compared to the control circuit 1301).

This memory 1302 can serve, for example, to non-transitorily store the computer instructions that, when executed by the control circuit 1301, cause the control circuit 1301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Either stored in this memory 1302 or, as illustrated, in a separate memory 1303 are the vectorized characterizations 1304 for each of a plurality of products 1305 (represented here by a first product through an Nth product where "N" is an integer greater than "1"). In addition, and again either stored in this memory 1302 or, as illustrated, in a separate memory 1306 are the vectorized characterizations 1307 for each of a plurality of individual persons 1308 (represented here by a first person through a Zth person wherein "Z" is also an integer greater than "1"). It will be appreciated that the number of persons and products for whom such information is stored can be large. Storing partiality-based information in a vectorized format can greatly ease both digital storage requirements and computational resource requirements. Those skilled in the art will appreciate these improvements to the technical capabilities of both the memory and computer capabilities of such a platform.

In this example the control circuit 1301 also operably couples to a network interface 1309. So configured the control circuit 1301 can communicate with other elements (both within the apparatus 1300 and external thereto) via the network interface 1309. Network interfaces, including both wireless and non-wireless platforms, are well understood in the art and require no particular elaboration here. This network interface 1309 can compatibly communicate via whatever network or networks 1310 may be appropriate to suit the particular needs of a given application setting. Both communication networks and network interfaces are well understood areas of prior art endeavor and therefore no further elaboration will be provided here in those regards for the sake of brevity.

Figure 14:
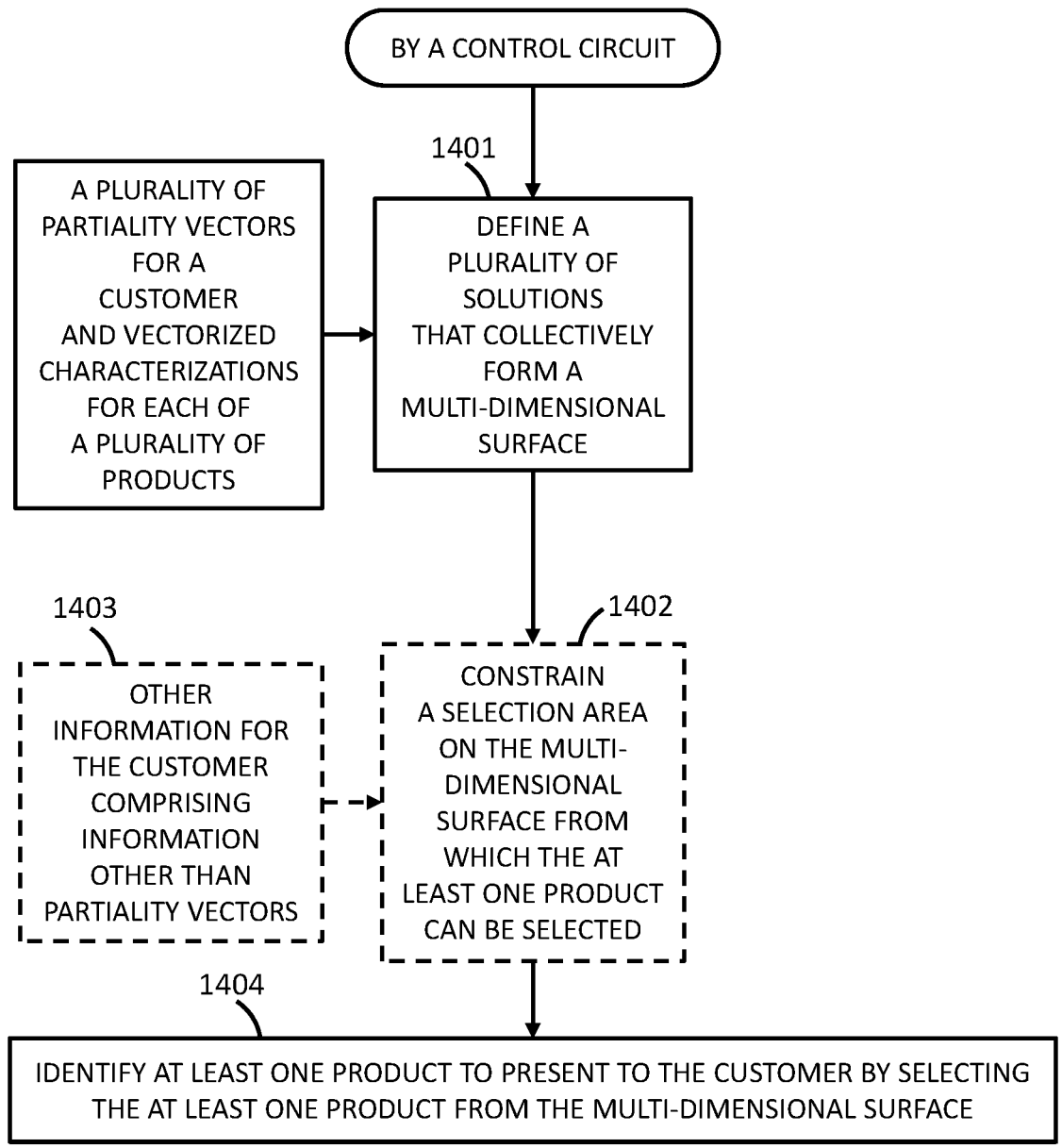
FIG. 14 comprises a flow diagram as configured in accordance with various embodiments of these teachings.
Figure 15:
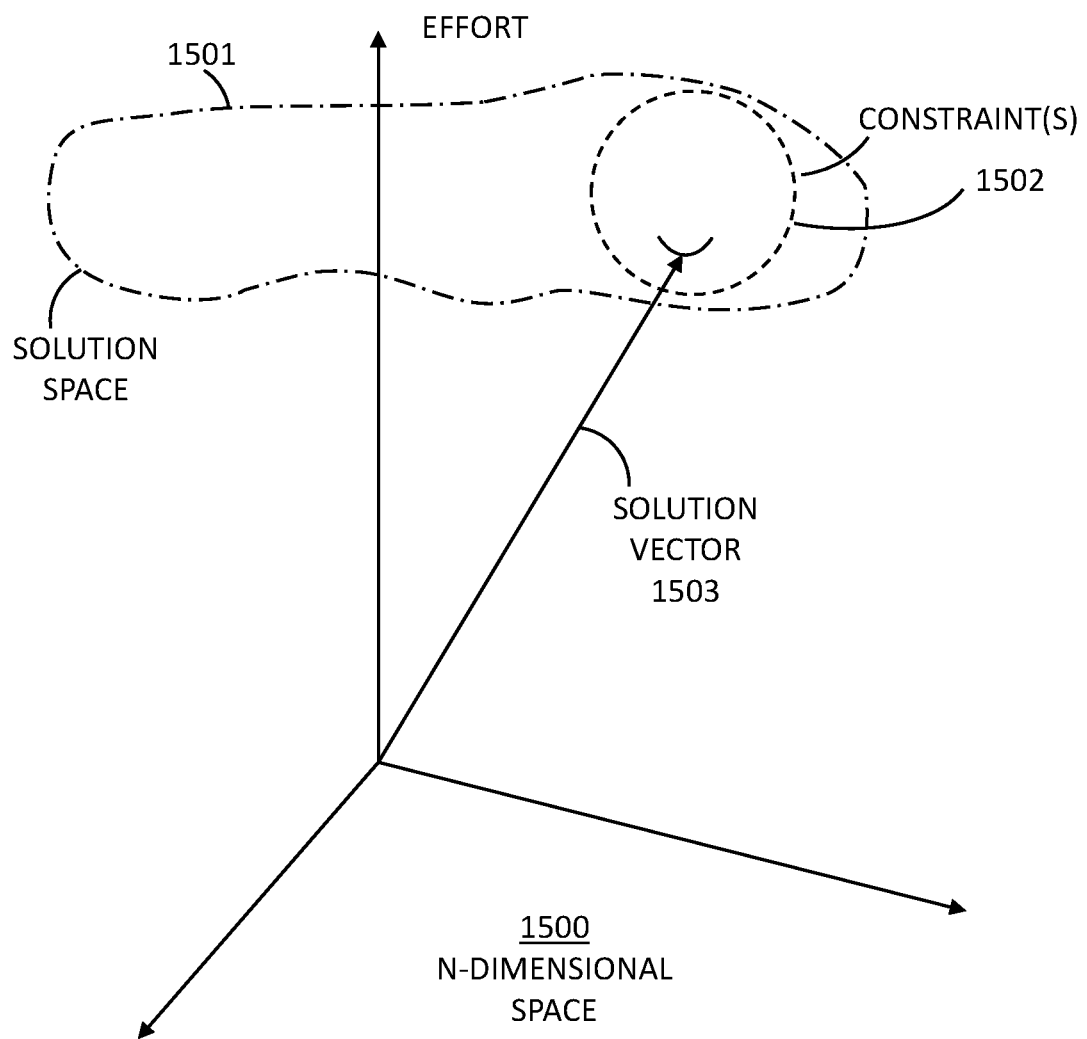
FIG. 15 comprises a graph as configured in accordance with various embodiments of these teachings.

By one approach, and referring now to FIG. 14, the control circuit 1301 is configured to use the aforementioned partiality vectors 1307 and the vectorized product characterizations 1304 to define a plurality of solutions that collectively form a multidimensional surface (per block 1401). FIG. 15 provides an illustrative example in these regards. FIG. 15 represents an N-dimensional space 1500 and where the aforementioned information for a particular customer yielded a multi-dimensional surface denoted by reference numeral 1501. (The relevant value space is an N-dimensional space where the belief in the value of a particular ordering of one's life only acts on value propositions in that space as a function of a least-effort functional relationship.)

Generally speaking, this surface 1501 represents all possible solutions based upon the foregoing information. Accordingly, in a typical application setting this surface 1501 will contain/represent a plurality of discrete solutions.

That said, and also in a typical application setting, not all of those solutions will be similarly preferable. Instead, one or more of those solutions may be particularly useful/appropriate at a given time, in a given place, for a given customer.

With continued reference to FIGS. 14 and 15, at optional block 1402 the control circuit 1301 can be configured to use information for the customer 1403 (other than the aforementioned partiality vectors 1307) to constrain a selection area 1502 on the multi-dimensional surface 1501 from which at least one product can be selected for this particular customer. By one approach, for example, the constraints can be selected such that the resultant selection area 1502 represents the best 95th percentile of the solution space. Other target sizes for the selection area 1502 are of course possible and may be useful in a given application setting.

The aforementioned other information 1403 can comprise any of a variety of information types. By one approach, for example, this other information comprises objective information. (As used herein, "objective information" will be understood to constitute information that is not influenced by personal feelings or opinions and hence constitutes unbiased, neutral facts.)

One particularly useful category of objective information comprises objective information regarding the customer. Examples in these regards include, but are not limited to, location information regarding a past, present, or planned/scheduled future location of the customer, budget information for the customer or regarding which the customer must strive to adhere (such that, by way of example, a particular product/solution area may align extremely well with the customer's partialities but is well beyond that which the customer can afford and hence can be reasonably excluded from the selection area 1502), age information for the customer, and gender information for the customer. Another example in these regards is information comprising objective logistical information regarding providing particular products to the customer. Examples in these regards include but are not limited to current or predicted product availability, shipping limitations (such as restrictions or other conditions that pertain to shipping a particular product to this particular customer at a particular location), and other applicable legal limitations (pertaining, for example, to the legality of a customer possessing or using a particular product at a particular location).

At block 1404 the control circuit 1301 can then identify at least one product to present to the customer by selecting that product from the multi-dimensional surface 1501. In the example of FIG. 15, where constraints have been used to define a reduced selection area 1502, the control circuit 1301 is constrained to select that product from within that selection area 1502. For example, and in accordance with the description provided herein, the control circuit 1301 can select that product via solution vector 1503 by identifying a particular product that requires a minimal expenditure of customer effort while also remaining compliant with one or more of the applied objective constraints based, for example, upon objective information regarding the customer and/or objective logistical information regarding providing particular products to the customer.

So configured, and as a simple example, the control circuit 1301 may respond per these teachings to learning that the customer is planning a party that will include seven other invited individuals. The control circuit 1301 may therefore be looking to identify one or more particular beverages to present to the customer for consideration in those regards. The aforementioned partiality vectors 1307 and vectorized product characterizations 1304 can serve to define a corresponding multi-dimensional surface 1501 that identifies various beverages that might be suitable to consider in these regards.

Objective information regarding the customer and/or the other invited persons, however, might indicate that all or most of the participants are not of legal drinking age. In that case, that objective information may be utilized to constrain the available selection area 1502 to beverages that contain no alcohol. As another example in these regards, the control circuit 1301 may have objective information that the party is to be held in a state park that prohibits alcohol and may therefore similarly constrain the available selection area 1502 to beverages that contain no alcohol.

Figure 16:
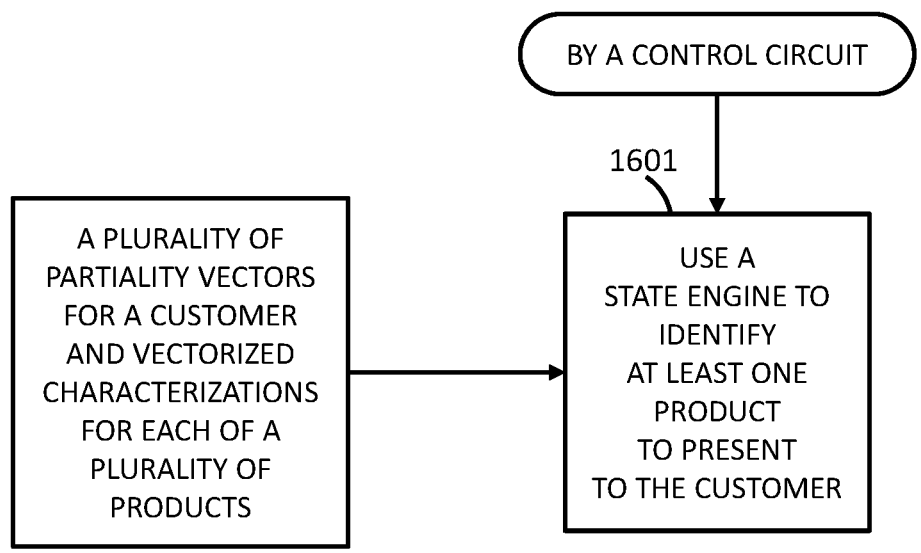
FIG. 16 comprises a flow diagram as configured in accordance with various embodiments of these teachings.

As described above, the aforementioned control circuit 1301 can utilize information including a plurality of partiality vectors for a particular customer along with vectorized product characterizations for each of a plurality of products to identify at least one product to present to a customer. By one approach 1600, and referring to FIG. 16, the control circuit 1301 can be configured as (or to use) a state engine to identify such a product (as indicated at block 1601). As used herein, the expression "state engine" will be understood to refer to a finite-state machine, also sometimes known as a finite-state automaton or simply as a state machine.

Generally speaking, a state engine is a basic approach to designing both computer programs and sequential logic circuits. A state engine has only a finite number of states and can only be in one state at a time. A state engine can change from one state to another when initiated by a triggering event or condition often referred to as a transition. Accordingly, a particular state engine is defined by a list of its states, its initial state, and the triggering condition for each transition.

Figure 17:
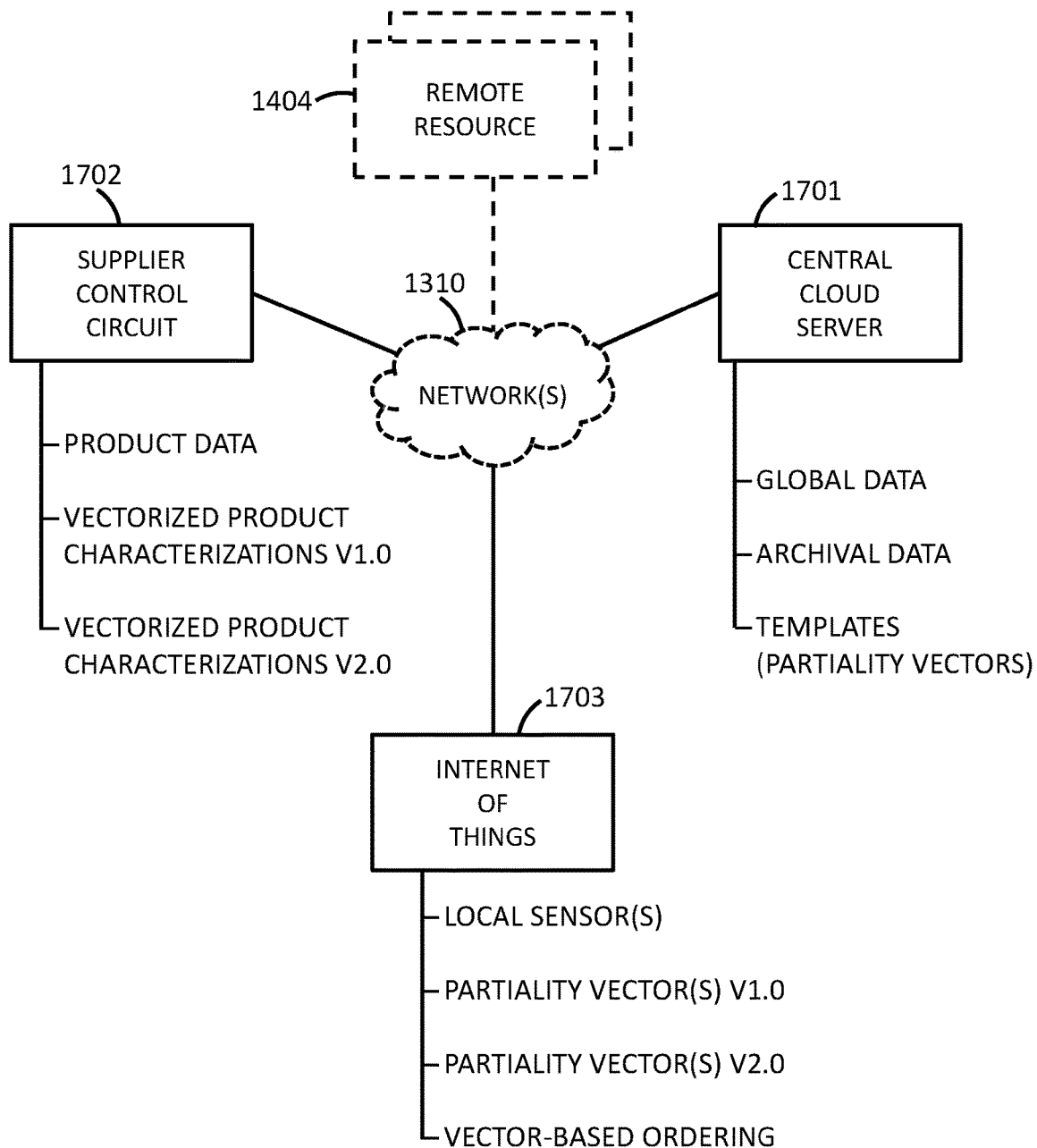
FIG. 17 comprises a block diagram as configured in accordance with various embodiments of these teachings.

It will be appreciated that the apparatus 1300 described above can be viewed as a literal physical architecture or, if desired, as a logical construct. For example, these teachings can be enabled and operated in a highly centralized manner (as might be suggested when viewing that apparatus 1300 as a physical construct) or, conversely, can be enabled and operated in a highly decentralized manner. FIG. 17 provides an example as regards the latter.

In this illustrative example a central cloud server 1701, a supplier control circuit 1702, and the aforementioned Internet of Things 1703 communicate via the aforementioned network 1310.

The central cloud server 1701 can receive, store, and/or provide various kinds of global data (including, for example, general demographic information regarding people and places, profile information for individuals, product descriptions and reviews, and so forth), various kinds of archival data (including, for example, historical information regarding the aforementioned demographic and profile information and/or product descriptions and reviews), and partiality vector templates as described herein that can serve as starting point general characterizations for particular individuals as regards their partialities. Such information may constitute a public resource and/or a privately-curated and accessed resource as desired. (It will also be understood that there may be more than one such central cloud server 1701 that store identical, overlapping, or wholly distinct content.)

The supplier control circuit 1702 can comprise a resource that is owned and/or operated on behalf of the suppliers of one or more products (including but not limited to manufacturers, wholesalers, retailers, and even resellers of previously-owned products). This resource can receive, process and/or analyze, store, and/or provide various kinds of information. Examples include but are not limited to product data such as marketing and packaging content (including textual materials, still images, and audio-video content), operators and installers manuals, recall information, professional and non-professional reviews, and so forth.

Another example comprises vectorized product characterizations as described herein. More particularly, the stored and/or available information can include both prior vectorized product characterizations (denoted in FIG. 17 by the expression "vectorized product characterizations V1.0") for a given product as well as subsequent, updated vectorized product characterizations (denoted in FIG. 17 by the expression "vectorized product characterizations V2.0") for the same product. Such modifications may have been made by the supplier control circuit 1702 itself or may have been made in conjunction with or wholly by an external resource as desired.

The Internet of Things 1703 can comprise any of a variety of devices and components that may include local sensors that can provide information regarding a corresponding user's circumstances, behaviors, and reactions back to, for example, the aforementioned central cloud server 1701 and the supplier control circuit 1702 to facilitate the development of corresponding partiality vectors for that corresponding user. Again, however, these teachings will also support a decentralized approach. In many cases devices that are fairly considered to be members of the Internet of Things 1703 constitute network edge elements (i.e., network elements deployed at the edge of a network). In some case the network edge element is configured to be personally carried by the person when operating in a deployed state. Examples include but are not limited to so-called smart phones, smart watches, fitness monitors that are worn on the body, and so forth. In other cases, the network edge element may be configured to not be personally carried by the person when operating in a deployed state. This can occur when, for example, the network edge element is too large and/or too heavy to be reasonably carried by an ordinary average person. This can also occur when, for example, the network edge element has operating requirements ill-suited to the mobile environment that typifies the average person.

For example, a so-called smart phone can itself include a suite of partiality vectors for a corresponding user (i.e., a person that is associated with the smart phone which itself serves as a network edge element) and employ those partiality vectors to facilitate vector-based ordering (either automated or to supplement the ordering being undertaken by the user) as is otherwise described herein. In that case, the smart phone can obtain corresponding vectorized product characterizations from a remote resource such as, for example, the aforementioned supplier control circuit 1702 and use that information in conjunction with local partiality vector information to facilitate the vector-based ordering.

Also, if desired, the smart phone in this example can itself modify and update partiality vectors for the corresponding user. To illustrate this idea in FIG. 17, this device can utilize, for example, information gained at least in part from local sensors to update a locally-stored partiality vector (represented in FIG. 17 by the expression "partiality vector V1.0") to obtain an updated locally-stored partiality vector (represented in FIG. 17 by the expression "partiality vector V2.0"). Using this approach, a user's partiality vectors can be locally stored and utilized. Such an approach may better comport with a particular user's privacy concerns.

It will be understood that the smart phone employed in the immediate example is intended to serve in an illustrative capacity and is not intended to suggest any particular limitations in these regards. In fact, any of a wide variety of Internet of Things devices/components could be readily configured in the same regards. As one simple example in these regards, a computationally-capable networked refrigerator could be configured to order appropriate perishable items for a corresponding user as a function of that user's partialities.

Presuming a decentralized approach, these teachings will accommodate any of a variety of other remote resources 1704. These remote resources 1704 can, in turn, provide static or dynamic information and/or interaction opportunities or analytical capabilities that can be called upon by any of the above-described network elements. Examples include but are not limited to voice recognition, pattern and image recognition, facial recognition, statistical analysis, computational resources, encryption and decryption services, fraud and misrepresentation detection and prevention services, digital currency support, and so forth.

As already suggested above, these approaches provide powerful ways for identifying products and/or services that a given person, or a given group of persons, may likely wish to buy to the exclusion of other options. When the magnitude and direction of the relevant/required meta-force vector that comes from the perceived effort to impose order is known, these teachings will facilitate, for example, engineering a product or service containing potential energy in the precise ordering direction to provide a total reduction of effort. Since people generally take the path of least effort (consistent with their partialities) they will typically accept such a solution.

As one simple illustrative example, a person who exhibits a partiality for food products that emphasize health, natural ingredients, and a concern to minimize sugars and fats may be presumed to have a similar partiality for pet foods because such partialities may be based on a value system that extends beyond themselves to other living creatures within their sphere of concern. If other data is available to indicate that this person in fact has, for example, two pet dogs, these partialities can be used to identify dog food products having well-aligned vectors in these same regards. This person could then be solicited to purchase such dog food products using any of a variety of solicitation approaches (including but not limited to general informational advertisements, discount coupons or rebate offers, sales calls, free samples, and so forth).

As another simple example, the approaches described herein can be used to filter out products/services that are not likely to accord well with a given person's partiality vectors. In particular, rather than emphasizing one particular product over another, a given person can be presented with a group of products that are available to purchase where all of the vectors for the presented products align to at least some predetermined degree of alignment/accord and where products that do not meet this criterion are simply not presented.

And as yet another simple example, a particular person may have a strong partiality towards both cleanliness and orderliness. The strength of this partiality might be measured in part, for example, by the physical effort they exert by consistently and promptly cleaning their kitchen following meal preparation activities. If this person were looking for lawn care services, their partiality vector(s) in these regards could be used to identify lawn care services who make representations and/or who have a trustworthy reputation or record for doing a good job of cleaning up the debris that results when mowing a lawn. This person, in turn, will likely appreciate the reduced effort on their part required to locate such a service that can meaningfully contribute to their desired order.

These teachings can be leveraged in any number of other useful ways. As one example in these regards, various sensors and other inputs can serve to provide automatic updates regarding the events of a given person's day. By one approach, at least some of this information can serve to help inform the development of the aforementioned partiality vectors for such a person. At the same time, such information can help to build a view of a normal day for this particular person. That baseline information can then help detect when this person's day is going experientially awry (i.e., when their desired "order" is off track). Upon detecting such circumstances these teachings will accommodate employing the partiality and product vectors for such a person to help make suggestions (for example, for particular products or services) to help correct the day's order and/or to even effect automatically-engaged actions to correct the person's experienced order.

When this person's partiality (or relevant partialities) are based upon a particular aspiration, restoring (or otherwise contributing to) order to their situation could include, for example, identifying the order that would be needed for this person to achieve that aspiration. Upon detecting, (for example, based upon purchases, social media, or other relevant inputs) that this person is aspiring to be a gourmet chef, these teachings can provide for plotting a solution that would begin providing/offering additional products/services that would help this person move along a path of increasing how they order their lives towards being a gourmet chef.

By one approach, these teachings will accommodate presenting the consumer with choices that correspond to solutions that are intended and serve to test the true conviction of the consumer as to a particular aspiration. The reaction of the consumer to such test solutions can then further inform the system as to the confidence level that this consumer holds a particular aspiration with some genuine conviction. In particular, and as one example, that confidence can in turn influence the degree and/or direction of the consumer value vector(s) in the direction of that confirmed aspiration.

All the above approaches are informed by the constraints the value space places on individuals so that they follow the path of least perceived effort to order their lives to accord with their values which results in partialities. People generally order their lives consistently unless and until their belief system is acted upon by the force of a new trusted value proposition. The present teachings are uniquely able to identify, quantify, and leverage the many aspects that collectively inform and define such belief systems.

A person's preferences can emerge from a perception that a product or service removes effort to order their lives according to their values. The present teachings acknowledge and even leverage that it is possible to have a preference for a product or service that a person has never heard of before in that, as soon as the person perceives how it will make their lives easier they will prefer it. Most predictive analytics that use preferences are trying to predict a decision the customer is likely to make. The present teachings are directed to calculating a reduced effort solution that can/will inherently and innately be something to which the person is partial.

Pursuant to various embodiments, systems, apparatuses and methods are provided herein useful to provide retail customers with products that the customers likely will continue to purchase. Some embodiments provide a retail shopping customer partiality vectorization refinement system that includes a vectorized refinement control circuit. Further, the system includes and/or accesses one or more customer databases that store at least a different set of multiple customer partiality vectors for each of multiple different customers, and one or more product databases that store at least a different set of multiple product partiality vectors for each of multiple different products. The vectorized refinement control circuit operably couples with the customer database and the product database, and is configured to identify, for a first customer of the multiple customers, a multi-dimensional partiality vector target area defined within a multi-dimensional representative volume defined by a limited range of partiality magnitudes and limited range of representative partiality directions for a first customer partiality vector. In some implementations, the partiality vector target area represents a multi-dimensional representation of an area in which an unknown actual magnitude and direction for the first customer partiality vector are predicted to lie. The refinement control circuit further selects a product from the multiple different products having at least a first product partiality vector that is within a threshold alignment with the partiality vector target area, and causes the selected product to be presented to the first customer. Feedback can be received, following the first product being presented to the first customer, that is associated with the first customer and corresponding to the first product. In some instances, the refinement control circuit can adjust the partiality vector target area based on the feedback.

Figure 18:
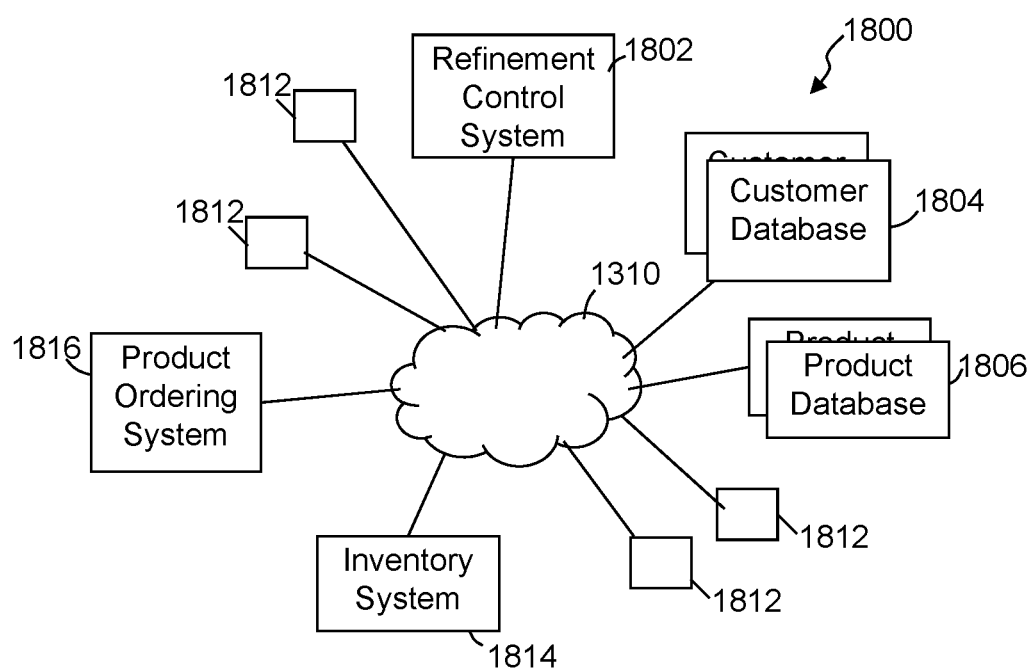
FIG. 18 illustrates a simplified block diagram of an exemplary retail shopping customer partiality vectorization refinement system, in accordance with some embodiments.

FIG. 18 illustrates a simplified block diagram of an exemplary retail shopping customer partiality vectorization refinement system 1800, in accordance with some embodiments. The vectorization refinement system, in some embodiments, includes one or more refinement control systems 1802, one or more customer databases 1804 and one or more product databases 1806. The refinement control system is communicatively coupled over one or more communication and/or computer networks 1310 (e.g., wide area network (WAN), local area network (LAN), Internet, etc.). In some embodiments, the customer database 1804 and/or the product database 1806 can be implemented through multiple different memory storage devices that are geographically distributed over the network 1310. Some embodiments further utilize customer computing devices 1812 (e.g., internet of things devices or systems 1703, which may include for example smart phones, smart watches, fitness monitors that are worn on the body, computers, laptops, tablets, and so forth) to implement distributed database storage and/or distributed processing. Similarly, in some implementations, the refinement control system 1802 may partially or fully be implemented through the central cloud server 1701, the internet of things devices and/or systems 1703, a combination thereof, or through a separate system. In some embodiments, at least some of the customer database 1804 includes a distributed database maintained across at least multiple different customer computing devices 1812. The refinement control system 1802 is configured to receive processing of at least the distributed database from a plurality of customer computing device control circuits located in the multiple different customer computing devices 1812 that are geographically distributed over a geographic area. For example, customers' smartphones may implement a software application that accumulates information that can be used in determining customer partiality vectors and/or the smartphone control circuits determine customer partiality vectors based on such information (e.g., sensor input information, transactions performed through the smartphone or other customer computing device associated with the customer computing device and/or a local area network with which the customer computing devices are associated, social media inputs and/or communications, response to queries and/or questionnaires, other such information, or typically a combination of two or more of such information.

Some embodiments include one or more inventory systems 1814 that track inventory of multiple different products available for purchase, that have been purchased, and/or that are being delivered to customers. The inventory system may further track locations of products, track pricing, initiate ordering of further products from suppliers (e.g., based on quantities reaching threshold levels), and the like. The inventory system is typically communicatively coupled with the refinement control system 1802 via direct coupling and/or over the distributed network 1310. Further, some embodiments may include one or more product ordering systems 1816 that is configured to receive customers' orders and/or purchases of products. The product ordering system can be communicatively coupled with the refinement control system and/or the inventory system 1814 through direct coupling and/or the network 1310.

As described above, the partiality vectors at least in part represent a particular person's belief in an amount of good that comes from an order associated with a particular partiality, and that the partiality vectors can have at least one of a magnitude and an angle that corresponds to a magnitude of that particular person's belief in an amount of good that comes from the order associated with a particular partiality. Further, a partiality vector is one representation within multiple potential representations that can indicate the person's beliefs in the amount of good. This potential set of partiality vectors can be represented as a multi-dimensional partiality vector area (e.g., a representative volume) defined within a multi-dimensional representative surface or volume defined by a limited range of partiality magnitudes and limited range of representative partiality directions for a particular first customer partiality vector.

Figure 19A:
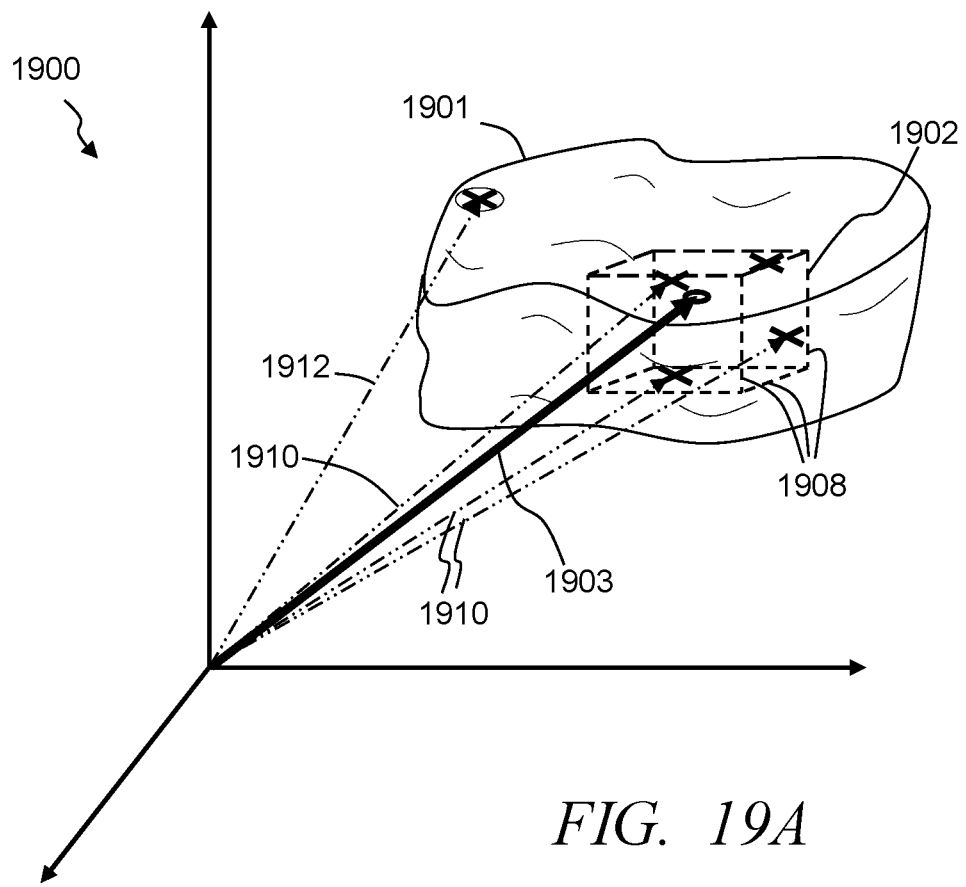
FIG. 19A provides an illustrative graphical representation of an N-dimensional space, in accordance with some embodiments.

The vectorization refinement system 1800 in part determines and refines customers' customer partiality vectors. Further, the system refines customers' partiality vectors that typically cannot be determined in other ways or that would take significant time and/or resources to narrow and/or identify. Over time customer partiality vectors are evaluated and estimated. The representative magnitudes and directions, however, in some instances can be unclear and general. FIG. 19A provides an illustrative graphical representation example in these regards.

FIG. 19A represents an N-dimensional space 1900 and where the aforementioned information corresponding to a first partiality vector for a particular customer yielded a multi-dimensional volume or area denoted by reference numeral 1901. Generally speaking, this area or volume 1901 represents a possible solution space of a representative first partiality vector based upon the foregoing information. Accordingly, in a typical application setting this space 1901 contains/represents a plurality of discrete solutions. That said, and also in a typical application setting, not all of those solutions will be similarly preferable. Instead, one or more of those solutions may be particularly useful/appropriate at a given time, in a given place, for a given customer.

In some embodiments, the refinement control system 1802 is configured to use the aforementioned customer partiality vectors 1307 and the product partiality vectors or vectorized characterizations 1304 to more accurately identify a customer's partiality vectors and/or narrow the multi-dimensional solution space 1901 for one or more partiality vectors. In some implementations and at a given time, there is an actual or optimum magnitude and/or direction that define the actual or "bullseye" customer partiality vector 1903 for the partiality vector of interest. With many partiality vectors, this actual customer partiality vector 1903 can be difficult to accurately determine or can take a relatively long time to identify. Further, as described above, this actual partiality vector 1903 may vary over time. Accordingly, with at least some partiality vectors, the system often determines an estimated or presumed partiality vector or set of partiality vectors (e.g., which may be represented as a target area or volume 1902) within which it is presumed the actual partiality vector 1903 is located. In some implementations, the partiality vector target area 1902 represents a multi-dimensional representation of an area in which an unknown actual magnitude and direction for the customer's actual partiality vector 1903 of interest is predicted to lie. In some embodiments, the refinement control system 1802 attempts to take one or more actions in attempts to more accurately identify a presumed actual partiality vector and/or narrow the partiality vector target area 1902 in which the actual partiality vector is located.

Figure 19B:
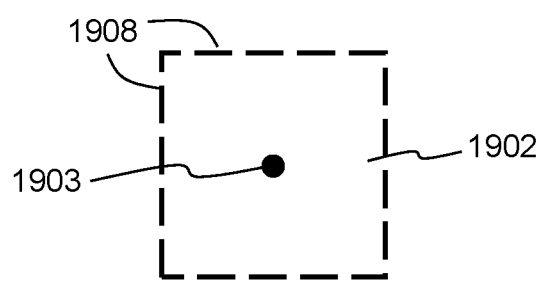
FIG. 19B illustrates an exemplary overhead two-dimensional representation of an actual customer partiality vector within a partiality vector target area, in accordance with some embodiments.

FIG. 19B illustrates an exemplary overhead two-dimensional representation of the actual or "bullseye" customer partiality vector 1903 within the partiality vector target area 1902. (It is noted that the partiality vector target area 1902 is represented as a cubic configuration; however, it will be appreciated that the target area is not limited to a cubic shape and instead is defined according to the estimated boundaries determined over time.) Referring to FIGS. 19A-19B, in some embodiments the refinement control system 1802 is configured to identify the target area or volume 1902 in which the actual partiality vector 1903 lies. This target area and/or boundaries may be identified based on continued determinations of variations over time of the magnitudes and/or angles of the particular partiality vector (e.g., a historic set of partiality vectors determined over time), one or more threshold variations from a determined magnitude and/or angle of the particular partiality vector (e.g., a standard deviation from an average partiality vector determined from multiple determined instances of the particular partiality vector for the particular customer or a set of multiple different customers, a fixed threshold variation of magnitude and/or angle, other such thresholds, or a combination of two or more of such thresholds), threshold variations from the partiality vector determined for one or more other customers (who may be associated with the customer of interest (e.g., spouse, friend, etc.), have threshold set of similar partiality vectors, etc.), or the like. Some embodiments use other information for the customer to identify the partiality vector target area 1902 of the multi-dimensional space 1901 and/or other information to constrain the target area. By one approach, for example, the constraints can be selected based on other information, partiality vectors, other customers, limits (e.g., legal, geographic, logistic, etc.), and the like.

The aforementioned other information can comprise any of a variety of information types. By one approach, for example, this other information comprises objective information. (As used herein, "objective information" will be understood to constitute information that is not influenced by personal feelings or opinions and hence constitutes unbiased, neutral facts.) One particularly useful category of objective information comprises objective information regarding the customer. Examples in these regards include, but are not limited to, location information regarding a past, present, or planned/scheduled future location of the customer, budget information for the customer or regarding which the customer must strive to adhere (such that, by way of example, a particular product/solution area may align extremely well with the customer's partialities but is well beyond that which the customer can afford and hence can be reasonably excluded from the target area 1902), age information for the customer, and gender information for the customer. Another example in these regards is information comprising objective logistical information regarding providing particular products to the customer. Examples in these regards include but are not limited to current or predicted product availability, shipping limitations (such as restrictions or other conditions that pertain to shipping a particular product to this particular customer at a particular location), and other applicable legal limitations (pertaining, for example, to the legality of a customer possessing or using a particular product at a particular location).

The refinement control system 1802 further identifies and initiates actions to be implemented in order to determine, or perhaps more accurately, attempt to determine the actual customer partiality vector 1903 by probing and testing the customer relative to the partiality vector. Again, the refinement control system can identify, for a customer of the multiple customers or potential customers, a multi-dimensional partiality vector target area 1902 defined within a multi-dimensional representative volume 1901 defined by a limited range of representative partiality magnitudes and limited range of representative partiality directions or angles for a customer partiality vector of interest. The partiality vector target area 1902 represents a multi-dimensional representation of an area in which an unknown actual magnitude and direction for the customer partiality vector are predicted to lie. Again, the partiality vector target area may be determined based on historic variations in determined magnitudes and/or directions of the partiality vector for the customer, based on determined partiality vectors for other customers, based on determined other partiality vectors for the customer and/or other customers, one or more threshold variation margins from a determined partiality vector magnitude and/or direction (e.g., a predefined threshold determined based on other customer, one or more standard deviations from a determined mean of the partiality vector determined for the customer over time and/or other customers), other such information, or a combination of such information. In some implementations, the refinement control system 1802 applies a set of rules to identify a group of customers with which the customer of interest is associated (e.g., based on threshold number of partiality vectors that are within a threshold difference, identifying associations with the customer (e.g., spouse, child, friend, neighbor, etc.), customers with similar purchase histories, etc.), and applies one or more other sets of rules to determine a partiality vector target area 1902 based on the similarity and/or difference between the magnitudes and/or directions of the partiality vector of interest for the group (e.g., statistical evaluation to determine one or more averages, standard deviations, threshold margins of differences, etc.).

In some embodiments, the refinement control system identifies a set of one or more test products and selects a test product from the multiple different products that have at least a product partiality vector that is within a threshold alignment with the partiality vector target area, and use the selected test product to test and/or confirm the partiality vector target area 1902 and/or in identifying a presumed actual partiality vector 1903. For example, the refinement control system 1802 can use the target area 1902 to select one or more representative partiality vectors 1910 from the target area and/or corresponding to the target area. In some embodiments, the refinement control system applies a set of rules to: identify and select one or more representative partiality vectors 1910 from the target area 1902, which may include what the system currently has determined is the presumed customer's current partiality vector, apply intended differences from the customer's presumed current partiality vector, select one or more partiality vectors on one or more boundaries 1908 of the target area 1902, select one or more partiality vectors that are a threshold difference from one or more boundaries 1908, select one or more partiality vectors that are a threshold difference from the currently presumed customer partiality vector, select one or more partiality vector that is a statistical variance from one or more boundaries, apexes or other references of the target area 1902, and the like. Such rules can include applying one or more thresholds (e.g., predefined variations from a customer's currently determined partiality vector; a threshold variation from one or more partiality vectors on one or more boundaries of the target area 1902, a threshold variation from a previously selected partiality vector within or outside of the target area, and/or other such thresholds), applying one or more constraints (e.g., cannot vary by one or more thresholds, cannot consider partiality vectors from one or more sets of one or more other customers, etc.); using detected changes over time (e.g., identify a detected change over time in magnitude (e.g., an increase or decrease) of the partiality vector of interest and/or other related partiality vectors, changes over time in the direction of the partiality vector of interest and/or other related partiality vectors, changes of partiality vectors of over other customers, etc.), and the like. In some embodiments, the sample partiality vector selection rule(s) may intentionally cause a selection of a partiality vector 1912 that is outside of the target area 1902. This further can be used to test the boundaries 1908 of the target area 1902 and the actual partiality vector 1903.

Typically, the product is selected with the intent to test the customer and/or customer's partialities, and obtain further information that is subsequently used to refine, adjust and/or confirm the system's determine current partiality vector target area 1902 and/or currently determined partiality vector for the customer. Accordingly, the product may be selected to be very consistent with the partiality vector target area 1902 and/or the system's determined current partiality vector. In other instances, the product is selected to intentionally deviate from the target area and/or the currently determined partiality vector. By selecting products that are consistent with the target area the refinement control system 1802 can confirm and make minor adjustments to the partiality vector target area 1902 and/or the determined current partiality vector. Similarly, by selecting products that deviate from the target area and/or determined current partiality vector the system can confirm the target area 1902 and/or identify inaccuracies in the target area.

As described above, products can be identified that correspond with and/or align with a customer based on a degree or level of alignment between one or more product partiality vectors of the product and one or more customer partiality vectors associated with the customer. In some embodiments, this alignment is determined based at least in part on one or more vector dot product calculations to help identify which product best aligns with customer's partialities. The refinement control system applies one or more rules to determine levels of alignment between different products and the target area 1902 and/or the one or more representative vectors from the target area 1902 or related to the target area. The rules can include, but are not limited to, rules that apply one or more thresholds relative to alignment values (e.g., threshold differences, threshold alignments, etc.), one or more thresholds relative to variations in alignment values, threshold numbers of customer partiality vectors and product partiality vectors that are to be individually and/or cooperatively considered, other such rules, or combination of two or more of such rules. For example, in some instances, a product is intentionally selected that has a corresponding product partiality vector that corresponds to the customer partiality vector of interest, and that the product partiality vector does not align with the partiality vector target area 1902 and/or is outside of the partiality vector target area by at least a threshold. Selecting one or more products allows the refinement control system to test an accuracy of the partiality vector target area 1902 and/or the currently determined customer partiality vector by selecting the product having a product partiality vector that has an alignment that has the intended relationship to the partiality target area and/or the currently determined customer partiality vector of interest (e.g., alignment is a threshold variation outside of the partiality vector target area, alignment is a threshold variation from the currently determined customer partiality vector of interest, alignment is at a boundary 1908 of the partiality vector target area, etc.). Further, some embodiments consider more than one customer and/or product partiality vector and/or the alignment between multiple partiality vectors when selecting a product. The selected product may be a product that the customer has never been exposed to, while in other instances, may be a product with which the customer is familiar.

Based on the selected product, the refinement control system 1802 can cause the selected product to be presented to the customer being considered. The presentation of the selected product to the customer can include, but is not limited to, sending a sample of the selected product to the customer, communicating a discount offer (e.g., a coupon, a notification of a reduced price, offer of a discount of one or more of the selected product upon the purchase of one of the selected product, and the like), presenting the product to the customer through a demonstration (e.g., while the customer is at the retail shopping facility, based on a scheduled appointment, directing the customer to a neighbor or acquaintance that has purchased the product, and the like), communicating information about the product, communicating a video of the product in use and/or a link to a website to view a video of the product in use, other such methods, or a combination of two or more of such methods. The refinement control system in selecting a method of causing the selected product to be present to the customer can take into consideration one or more factors such as but not limited to historic effectiveness of methods of presenting product information for other products to the customer of interest, effectiveness of methods of providing the customer of interest with other products (e.g., samples, demonstrations, etc.), historic effectiveness of methods of presenting product information of the selected product to other customers, historic effectiveness of methods of providing the selected product to other customers, product manufacturer's and/or supplier's preferred methods of presenting the selected product, cost associated with presenting the product of interest to the customer of interest (e.g., cost to the retailer, the supplier, the manufacturer, the customer, etc.), other such factors, or combination of such factors. For example, in some instances, the refinement control system causes a sample of the selected product to be provided to the customer. This may include initiating a packaging and mailing of the sample to the customer, notifying a worker at a point-of-sale system to give the sample to the customer while the customer is making purchases of other products while at the shopping facility (e.g., based on identifying the customer through a customer rewards program, facial recognition, etc.), notifying a third party (e.g., a manufacturer or supplier of the selected product) to mail a sample, causing an email with a coupon offer to be communicated to the customer, causing a link to a video showing the selected product to be texted to the customer's smart phone, other such actions, or combination of two or more actions.

The refinement control system 1802 further receives feedback associated with the customer and corresponding to the selected product following the product being presented to the customer. This feedback can be obtained based on subsequent purchases by the customer (e.g., received through the product ordering system 1816, the inventory system 1814 (e.g., based on customer ordering the selected product or making purchases of the product (e.g., on-line purchases, at a retail shopping facility, etc.), customer's response to a questionnaire, customer's rating of the selected product, customer's social media actions, other such information, and typically a combination of two or more of such information. For example, the system can use information about a subsequent purchase of the selected product following the presentation of the information to the customer about the selected product, timing of the subsequent purchase, sequential purchases of the selected product, quantities of purchases of the selected product, the subsequent purchase of one or more competing products, a lack of change in purchase patterns by the customer, changes in purchase patterns of the customer, changes in purchase patterns of other customers associated with the customer (e.g., spouse, children, parents, siblings, friends, etc.), and other such information. As another example, a customer may submit a high positive rating of the product, but does not subsequently purchase the product. Accordingly, the relevance of the customer's rating may be discounted based on the lack of change in customer purchase patterns.

Using the feedback information, the refinement control system can confirm or adjust the partiality vector target area 1902, and/or the presumed partiality vector (i.e., change one or both of the magnitude and direction) in an attempt to focus in on the customer's actual partiality vector 1903. The feedback, for example, may include at least one subsequent purchase of the selected product by the customer. The refinement control system can detect and/or receive a notification of one or more subsequent purchases (e.g., from the inventory system 1814, the product ordering system 1816, or other source) of the selected product.

Based on the feedback, the refinement control system can make adjustments to the partiality vector target area 1902 (e.g., enlarging, reducing, shifting, etc.), and/or to a previously determine customer partiality vector. In some embodiments, the refinement control system can use the feedback to confirm a level of accuracy of the partiality vector target area 1902 and/or confirm a presumed corresponding partiality vector. The confirmation can be a positive confirmation in that the selected product may include a product partiality vector that strongly aligns with a customer partiality vector within the target area. Similarly, the confirmation can be a confirmation based on a negative reaction to the selected product, including when the product is selected because it has a product partiality vector that does not have a strong or threshold alignment with any customer partiality vectors within the target area 1902 and instead has a strong or threshold alignment with a partiality vector 1912 outside of the target area. Because of the confirmation of accuracy, the refinement control system can adjust the partiality vector target area by, in some instances, narrowing or reducing the partiality vector target area 1902. The level or degree of reduction can be dependent on one or more factors, such as but not limited to, the degree of alignment between the corresponding product partiality vector and the customer partiality vector of interest, the duration of time between presenting the information to the customer and the subsequent one or more purchases, the number of subsequent purchases, the quantities of the selected product purchased in the one or more subsequent purchases, durations of time between subsequent purchases, and other such factors and information.

In applying adjustments to the partiality vector target area 1902, the refinement control system can reduce or increase the range of partiality magnitudes of the customer partiality vector target area, adjust (e.g., reduce or increase) a range of representative partiality directions corresponding to the partiality vector target area, adjust the magnitude and/or direction of the customer's presumed partiality vector, make other such adjustments, or a combination of two or more of such adjustments. For example, the refinement control system, in adjusting the partiality vector target area, may adjust the range of representative partiality directions define the partiality target area associated with the customer and corresponding to the partiality vector of interest. In some implementations, a single selected product may be used to confirm and/or adjust multiple partiality vector target areas and/or presumed corresponding partiality vectors associated with a customer. Again, in some embodiments, the selected test product is intentionally selected outside of the partiality vector target area 1902 in attempts to test the customer's partialities.

In some embodiments, the refinement control system attempts to confirm and/or more accurately determine a magnitude of the actual customer partiality vector 1903 associated with the customer of interest and/or the partiality vector target area 1902 corresponding to the customer partiality vector of interest. The refinement control system, in some applications, selects a test product where the customer has to pay a premium or other added expense in order to subsequently purchase or otherwise acquire the product following the selected test product being presented to the customer. This further identifies or confirms at least a magnitude of the customer's actual partiality vector and/or the partiality vector target area 1902 when the customer is willing to pay the premium. As such, in some embodiments, the refinement control system may select the test product to test an accuracy of the partiality vector target area by selecting the test product that has having the product partiality vector that has that threshold alignment with the partiality vector target area and further costs the customer a premium to purchase or otherwise acquire the product following the test product being presented to the customer (e.g., through one or more samples, one or more links to video content, customer ratings information, coupon, etc.).

The premium that the customer is to pay to subsequently purchase or otherwise acquire the product can be a financial cost that is in excess of another related product (e.g., a competing product), an additional financial cost in excess of a product the customer has purchased in the past, a reduction in alignment between one or more other product partiality vectors and one or more customer partiality vectors that are different than the customer partiality vector of interest, an increase in complexity and/or time to acquire the product, an added cost of shipment, more frequent purchases, other such premiums, or a combination of two or more of such premiums. For example, in some embodiments, the premium cost comprises a magnitude of another product partiality vector of the test product that is a premium threshold less than a magnitude of another corresponding customer partiality vector of the customers.

As described above, the aforementioned refinement control system 1802 and/or control circuit 1301 can utilize information including a plurality of partiality vectors for a particular customer along with vectorized product characterizations for each of a plurality of products to identify at least one product to present to a customer in attempts to more accurately identify a partiality vector target area 1902 and/or the customer's actual partiality vector 1903.

As already suggested above, these approaches provide powerful ways for identifying products and/or services that a given person, or a given group of persons, may likely wish to buy to the exclusion of other options. As one simple illustrative example, a person who exhibits a partiality for food products that emphasize health, natural ingredients, and a concern to minimize sugars and fats may be presumed to have a similar partiality for pet foods because such partialities may be based on a value system that extends beyond themselves to other living creatures within their sphere of concern. If other data is available to indicate that this person in fact has, for example, two pet dogs, these partialities can be used to identify dog food products having well-aligned vectors in these same regards. This person could then be solicited to purchase such dog food products using any of a variety of solicitation approaches (including but not limited to general informational advertisements, discount coupons or rebate offers, sales calls, free samples, and so forth).

Figure 20:
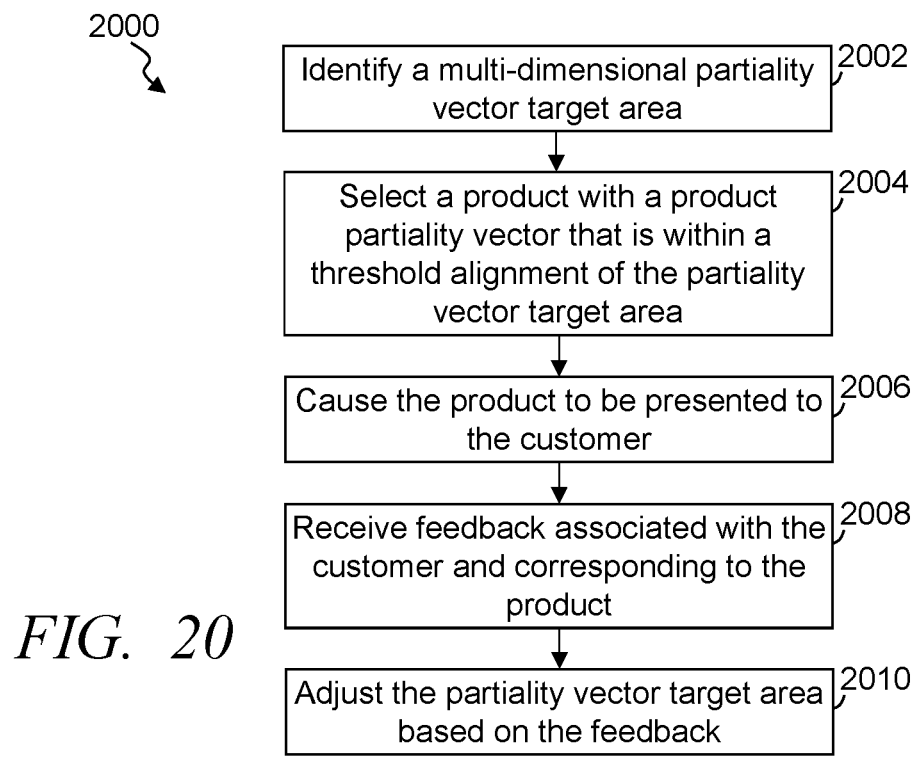
FIG. 20 illustrates a simplified flow diagram of an exemplary process of probing customers' target partiality vectors, in accordance with some embodiments.

FIG. 20 illustrates a simplified flow diagram of an exemplary process 2000 of probing customers' target partiality vectors and refining retail shopping customer partiality vectors, in accordance with some embodiments. In step 2002, a multi-dimensional partiality vector target area 1902 is identified for at least one customer of multiple customers and/or potential customers. The partiality vector target area, in some embodiments, is defined with a multi-dimensional representative volume defined by a limited range of partiality magnitudes and limited range of representative partiality directions for a customer partiality vector. The partiality vector target area represents a multi-dimensional representation of an area in which an unknown actual magnitude and direction for the customer partiality vector are predicted to lie.

In step 2004, a product is selected from the multiple different products having at least a product partiality vector that is within a threshold alignment with the partiality vector target area. In step 2006, the selected product is caused to be presented to the customer. Again, this can include causing a sample to be given to the customer while at the shopping facility, mailed to the customer, information can be emailed or texted to the customer, a link to information can be emailed or texted to the customer, other such methods can be additionally or alternatively provided to the customer, or a combination of two or more of such methods can be utilized to cause the selected product to be presented to the customer. For example, in causing the selected product to be presented to the customer some embodiments cause a sample of the product to be provided to the customer.

In step 2008, feedback is received, following the product being presented to the customer, that is associated with the customer and corresponds to the product. In step 2010, the partiality vector target area 1902 is adjusted based on the feedback. Some embodiments confirm, based on the feedback comprising at least one subsequent purchase of the selected product by the customer, a level of accuracy of the partiality vector target area. The adjustment to the partiality vector target area, may in some implementations include reducing the partiality vector target area. The quantity of reduction can be predefined (e.g., a preset adjustment), an adjustment based on a variation between the alignment between the product partiality vector and one or more customer partiality vectors defined by the target area 1902 (e.g., an average of the difference, a percentage of the difference, a percentage of the average, etc.). In some instances, for example, adjustment can include reducing the range of partiality magnitudes of the customer partiality vector. Additionally or alternatively, the adjustment to the partiality vector target area can include adjusting the range of representative partiality directions of the customer partiality vector.

Some embodiments further test an accuracy of the partiality vector target area implementing the selecting of the product such that the product partiality vector associated with the product has the alignment with the customer partiality vector that is a threshold vector outside of the partiality vector target area 1902. Additionally or alternatively, an accuracy of the partiality vector target area can be tested by selecting the product such that the product has the product partiality vector and costs the customer a premium. In some implementations, the premium may be accepting the product even though the product has a second partiality vector that is less than a corresponding second customer partiality vector. Accordingly, some embodiments select the test product having the premium cost comprising a magnitude of a second product partiality vector of the product being a premium threshold less than a magnitude of a second customer partiality vector of the customer.

Further, some embodiments implement distributed data storage and/or processing, which may include utilizing customer computing devices 1812. This can include implementing a distributed customer database maintained across multiple different customer computing devices. Processing of at least the customer partiality vectors can be performed through a plurality of customer computing device control circuits located in the multiple different customer computing devices that are geographically distributed over a geographic area and/or the distributed network 1310. The process 2000 can be implemented for one or more customer partiality vectors and/or product partiality vectors. In some embodiments, the testing of the customer partiality vectors and/or the partiality vector target area tempt to target a future state of the target area and/or the customer's partiality vector due to shifts based on positive reactions to one or more samples, demonstrations, and/or exposing the customer to other information. The evaluation, testing and adjustment of the target areas and/or the customer partiality vectors can continue to be performed over time to maintain presumed accurate customer partiality vectors and/or partiality vector target areas. Some embodiments in testing the and/or confirm the determined, confirmed and/or adjusted partiality vector target area and/or presumed partiality vector by automatically forwarding a product that has a threshold alignment with the determined customer partiality vector and charging the customer for that product. Feedback based on the forwarding of the product can be used to confirm and/or make further adjustments (e.g., customer returns the product for a refund, customer keeps the product, customer responses to a questionnaire and/or submits a customer rating, detecting information from social media, etc.).

Overtime, the apparatus 1300 and/or the refinement control system 1802 can define a mapping of customers' partiality vectors. In some instances, these mappings can be represented as a multi-dimensional mapping. Typically, however, the mapping is not 100% accurate, and/or is incomplete. Accordingly, some embodiments identify one or more test products that can be presented to the customer (e.g., through samples, demonstrates, distribution of information, etc.). Based on feedback to the product being presented to the customer, the system can try to confirm the accuracy of the mapping of one or more partiality vectors and/or corresponding partiality vector target areas, further fill in the mapping, and/or make adjustments to the mapping. The partiality vector target areas may be defined and tested in attempts to obtain a threshold confidence level (e.g., 80% confidence) that the actual partiality vector is within the target area, while further testing may be applied in attempts to obtain a second threshold level of confidence (e.g., 95% confidence) corresponding to the actual or "bullseye" partiality vector.

Again, some embodiments select one or more test products that are on the boundaries or within a threshold of the boundaries or margins of the target area. Feedback from these products can confirm the target area and in some instances allow a narrowing of the target area. For example, when a negative reaction is detected that is consistent with the customer having the presumed magnitude and/or direction of the partiality vector, the refinement control system can make adjustments to narrow the target area. Further, selecting products that are outside of the partiality vector target area can allow the system to further confirm the target area or in some instances identify that the target area should be shifted (e.g., in the representative magnitude and/or direction). Additionally, one or more of the test products can be selected based on a prediction that the customer will change her/his purchase patterns.

Some embodiments further select how the test product is to be presented to the customer based on level over confidence that the product partiality vector or a threshold number of product partiality vectors have a threshold alignment with one or more customer partiality vectors. For example, a sample may be sent to the customer when the confidence is a first threshold, while only information is sent to the customer when the confidence is at a second threshold level. As a further non-limiting example, the sample may be sent to the customer when the first threshold is less than 80% so that the customer can actually experience the product, while data may be sent when the confidence is greater than the second threshold of 90% because it may be anticipated that the customer would not need to actually experience the product before appreciating the alignment with the customer's partialities. Similarly, the selection of the method of presenting the product to the customer may depend on threshold alignments and/or the number of product partiality vectors that have one or more threshold alignments with corresponding customer partiality vectors (e.g., the greater number of product partiality vectors that align with corresponding customer partiality vectors and/or partiality vector target areas)

In some embodiments, a retail shopping customer partiality vectorization refinement system and corresponding method performed by the system, comprises: a customer database storing at least a different set of multiple customer partiality vectors for each of multiple different customers; a product database storing at least a different set of multiple product partiality vectors for each of multiple different products; and a vectorized refinement control circuit operably coupled with the customer database and the product database, wherein the refinement control circuit is configured to: identify, for a first customer of the multiple customers, a multi-dimensional partiality vector target area defined within a multi-dimensional representative volume defined by a limited range of partiality magnitudes and limited range of representative partiality directions for a first customer partiality vector, wherein the partiality vector target area represents a multi-dimensional representation of an area in which an unknown actual magnitude and direction for the first customer partiality vector are predicted to lie; select a first product from the multiple different products having at least a first product partiality vector that is within a threshold alignment with the partiality vector target area, and cause the first product to be presented to the first customer; receive, following the first product being presented to the first customer, feedback associated with the first customer and corresponding to the first product; and adjust the partiality vector target area based on the feedback.

Some embodiments provide methods of refining retail shopping customer partiality vectors, comprising: identifying, for a first customer of the multiple customers, a multi-dimensional partiality vector target area defined within a multi-dimensional representative volume defined by a limited range of partiality magnitudes and limited range of representative partiality directions for a first customer partiality vector, wherein the partiality vector target area represents a multi-dimensional representation of an area in which a unknown actual magnitude and direction for the first customer partiality vector are predicted to lie; selecting a first product from the multiple different products having at least a first product partiality vector that is within a threshold alignment with the partiality vector target area, and causing the first product to be presented to the first customer; receiving, following the first product being presented to the first customer, feedback associated with the first customer and corresponding to the first product; and adjusting the partiality vector target area based on the feedback.

Pursuant to various embodiments, systems, apparatuses and methods are provided herein useful to provide retail customers with products that the customers likely will continue to purchase. Some embodiments provide retail shopping customer partiality vectorization refinement systems having one or more vector probing control circuits, and further including or accessing one or more customer databases, and one or more product databases. The customer databases store, for each of multiple different customers, a set of multiple customer partiality vectors comprising customer objective partiality vectors and customer subjective partiality vectors. The product databases store, for each of multiple different products, a set of product objective partiality vectors and product subjective partiality vectors. The vector probing control circuit is operably coupled with the customer database and the product database, and configured to apply a vector selection rule set to identify a first subjective partiality vector associated with a customer to be probed, and identify a first subjective magnitude of the first subjective partiality vector and a first magnitude of a second partiality vector from a first set of customer partiality vectors associated with the customer. The vector probing control circuit further applies a product selection rule set to identify a first product having a second subjective magnitude of the first subjective partiality vector and a third magnitude of the second partiality vector from a first set of product partiality vectors associated with the first product. In some embodiments, the second subjective magnitude is a first subject threshold difference than the first subjective magnitude, and the third magnitude is further attributed with a first additional premium to be absorbed by the customer that is in excess of what the customer historically has absorbed relative to the first subjective partiality vector. A first probe is caused to be directed to the customer causing the first product to be directly marketed to the customer. The vector probing control circuit receives feedback regarding whether the customer subsequently purchased the first product and absorbed the first additional premium. Based on the feedback, the vector probing control circuit may adjust the first subjective magnitude of the first subjective partiality vector associated with the customer.

In some embodiments, the refinement system identifies, for a customer, a multi-dimensional partiality vector target area defined within a multi-dimensional representative volume defined by a limited range of partiality magnitudes and limited range of representative partiality directions for a first customer partiality vector. In some implementations, the partiality vector target area represents a multi-dimensional representation of an area in which an unknown actual magnitude and/or direction for the first customer partiality vector are predicted to lie. The refinement system can select a product from the multiple different products having at least a product partiality vector that is within a threshold alignment with the partiality vector target area, and cause the selected product to be presented to the customer. Feedback can be received, following the first product being presented to the customer, which is associated with the customer and corresponding to the first product. In some instances, the partiality vector target area can be adjusted based on the feedback.

Figure 21:
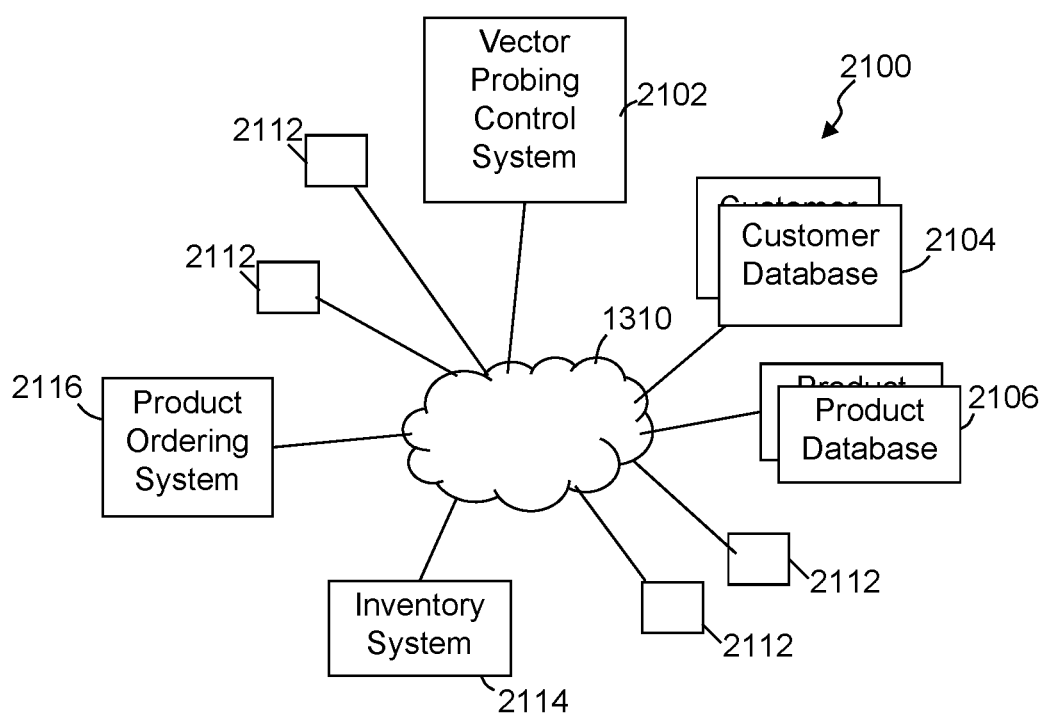
FIG. 21 illustrates a simplified block diagram of an exemplary retail shopping customer partiality vectorization refinement system, in accordance with some embodiments.

FIG. 21 illustrates a simplified block diagram of an exemplary retail shopping customer partiality vectorization refinement system 2100, in accordance with some embodiments. The vectorization refinement system, in some embodiments, includes one or more vector probing control systems 2102, one or more customer databases 2104 and one or more product databases 2106. The vector probing control system is operably and communicatively coupled over one or more communication and/or computer networks 1310 (e.g., wide area network (WAN), local area network (LAN), Internet, etc.) with the customer database and the product database. In some embodiments, the customer database 2104 and/or the product database 2106 can be implemented through multiple different memory storage devices that are geographically distributed over the network 1310. Some embodiments further utilize customer computing devices 2112 (e.g., Internet of things devices or systems 1703, which may include for example smart phones, smart watches, fitness monitors that are worn on the body, computers, laptops, tablets, and so forth) to implement distributed database storage and/or distributed processing. Similarly, in some implementations, the vector probing control system 2102 may partially or fully be implemented through the central cloud server 1701, the internet of things devices and/or systems 1703, customer computing devices 2112, a combination thereof, or through a separate system. For example, in some implementations, the vector probing control system may in part be implemented through multiple customer computing devices.

In some embodiments, at least some of the customer database 2104 includes a distributed database maintained across at least multiple different customer computing devices 2112, and the vector probing control system 2102 can be implemented at least in part on multiple customer computing devices 2112 and/or is configured to receive processing of at least the distributed database from a plurality of customer computing device control circuits located in the multiple different customer computing devices 2112 that are geographically distributed over a geographic area. For example, customers' smartphones may implement a software application that accumulates information that can be used in determining customer partiality vectors and adjust customer partiality vectors, and/or the smartphone control circuits determine customer partiality vectors and adjust customer partiality vectors based on such information (e.g., sensor input information, transactions performed through the smartphone or other customer computing device associated with the customer computing device and/or a local area network with which the customer computing devices are associated, social media inputs and/or communications, response to queries and/or questionnaires, other such information, or typically a combination of two or more of such information). Further, in some applications, some or all of the customer database 2104 comprises a distributed database maintained across at least multiple different customer computing devices 2112, and the vector probing control system 2102 executes software program modules causing the vector probing control system to be configured to receive processing of at least customer data, which can include customer partiality vectors, stored in the distributed database from a plurality of customer computing device control circuits executing one or more computer program modules and located in the multiple different customer computing devices that are geographically distributed over a geographic area.

Some embodiments include one or more inventory systems 2114 that track inventory of multiple different products available for purchase, that have been purchased, and/or that are being delivered to customers. The inventory system may further track locations of products, track pricing, initiate ordering of further products from suppliers (e.g., based on quantities reaching threshold levels), and the like. The inventory system is typically communicatively coupled with the vector probing control system 2102 via direct coupling and/or over the distributed network 1310. Further, some embodiments may include one or more product ordering systems 2116 that are configured to receive customers' orders and/or purchases of products. The product ordering system can be communicatively coupled with the vector probing control system and/or the inventory system 2114 through direct coupling and/or the network 1310.

Again, as described above, the partiality vectors at least in part represent a particular person's belief in an amount of good that comes from an order associated with a particular partiality, and that the partiality vectors can have at least one of a magnitude and an angle that corresponds to a magnitude of that particular person's belief in an amount of good that comes from the order associated with a particular partiality. Further, a partiality vector is one representation within multiple potential representations that can indicate the person's beliefs in the amount of good. This potential set of partiality vectors can be represented as a multi-dimensional partiality vector area (e.g., a representative volume) defined within a multi-dimensional representative surface or volume defined by a limited range of partiality magnitudes and limited range of representative partiality directions for a particular first customer partiality vector. The vectorization refinement system 2100 in part determines, probes and refines customers' customer partiality vectors. Further, the system probes customers' partiality vectors that typically cannot be determined in other ways or that would take significant time and/or resources to narrow and/or identify. Over time customer partiality vectors are evaluated and estimated. The representative magnitudes and directions, however, in some instances can be unclear and general, and further, such representative magnitudes and directions can vary over time.

Referring to at least FIGS. 13, 19A-B, and 21, in some embodiments the vector probing control system 2102 is configured to use the aforementioned customer partiality vectors 1307 and the product partiality vectors or vectorized characterizations 1304 to more accurately identify a customer's partiality vectors and/or narrow the multi-dimensional solution space 1901 for one or more partiality vectors. In some implementations and at a given time, there is an actual or optimum magnitude and/or direction that define the actual or "bullseye" customer partiality vector 1903 for the partiality vector of interest. With many partiality vectors, this actual customer partiality vector 1903 can be difficult to accurately determine or can take a relatively long time to identify. Further, as described above, this actual partiality vector 1903 may vary over time. Accordingly, with at least some partiality vectors, the system often determines an estimated or presumed partiality vector or set of partiality vectors (e.g., which may be represented as a target area or volume 1902) within which it is presumed the actual partiality vector 1903 is located. In some implementations, the partiality vector target area 1902 represents a multi-dimensional representation of an area in which an unknown actual magnitude and direction for the customer's actual partiality vector 1903 of interest is predicted to lie. In some embodiments, the vector probing control system 2102 probes a customer in attempts to more accurately identify a presumed actual partiality vector and/or narrow the partiality vector target area 1902 in which the actual partiality vector is located.

Referring to FIGS. 19A-19B and 21, in some embodiments the vector probing control system 2102 is configured to identify the target area or volume 1902 in which the actual partiality vector 1903 lies. This target area and/or boundaries may be identified based on continued determinations of variations over time of the magnitudes and/or directions of the particular partiality vector (e.g., a historic set of partiality vectors determined over time), one or more threshold variations from a determined magnitude and/or angle of the particular partiality vector (e.g., a standard deviation from an average partiality vector determined from multiple determined instances of the particular partiality vector for the particular customer or a set of multiple different customers, a fixed threshold variation of magnitude and/or angle, other such thresholds, or a combination of two or more of such thresholds), threshold variations from the partiality vector determined for one or more other customers (who may be associated with the customer of interest (e.g., spouse, friend, etc.), have threshold set of similar partiality vectors, etc.), or the like. Still further, some embodiments define a default target area, and make subsequent adjustments to the default target area based on continued evaluation of subsequent purchases. Some embodiments use other information associated with the customer to identify the partiality vector target area 1902 of the multi-dimensional space 1901 and/or other information to constrain the target area. By one approach, for example, the constraints can be selected based on other information, partiality vectors, other customers, limits (e.g., legal, geographic, logistic, etc.), and the like.

Again, the aforementioned other information can comprise any of a variety of information types. By one approach, for example, objective information, which may include objective information regarding the customer. Examples in these regards are described above.

The vector probing control system 2102 further identifies and initiates actions to be implemented in order to determine, or perhaps more accurately, attempt to determine the actual customer partiality vector 1903 or adjust a defined customer partiality vector and/or target area by probing and testing the customer relative to the partiality vector. Again, the vector probing control system can identify, for a customer of the multiple customers or potential customers, a multi-dimensional partiality vector target area 1902 defined within a multi-dimensional representative volume 1901 defined by a limited range of representative partiality magnitudes and limited range of representative partiality directions or angles for a customer partiality vector of interest. The partiality vector target area 1902 represents a multi-dimensional representation of an area in which an unknown actual magnitude and direction for the customer partiality vector are predicted to lie. Further, the size of the target area may be based on variations in different products purchased over time having variations and/or inconsistencies relative to the partiality vector.

Again, the partiality vector target area may be determined based on historic variations in determined magnitudes and/or directions of the partiality vector for the customer, based on determined partiality vectors for other customers, based on determined other partiality vectors for the customer and/or other customers, one or more threshold variation margins from a determined partiality vector magnitude and/or direction (e.g., a predefined threshold determined based on other customer, one or more standard deviations from a determined mean of the partiality vector determined for the customer over time and/or other customers), other such information, or a combination of such information. In some implementations, the vector probing control system 2102 applies a set of rules to identify a group of customers with which the customer of interest is associated (e.g., based on threshold number of partiality vectors that are within a threshold difference, identifying associations with the customer (e.g., spouse, child, friend, neighbor, etc.), customers with similar purchase histories, etc.), and applies one or more other sets of rules to determine a partiality vector target area 1902 based on the similarity and/or difference between the magnitudes and/or directions of the partiality vector of interest for the group (e.g., statistical evaluation to determine one or more averages, standard deviations, threshold margins of differences, etc.).

In some embodiments, the vector probing control system 2102 applies one or more vector selection rule sets of one or more rules to identify a first subjective partiality vector associated with a customer to be probed and at least the corresponding subjective magnitude of the first subjective partiality vector from a set of customer partiality vectors associated with the customer. The vector selection rule set may further be applied to identify a second partiality vector and at least a magnitude of the second partiality vector from the set of customer partiality vectors associated with the customer. The vector selection rules set can include one or more rules that are used to identify a customer partiality vector to be probed in attempts to subsequently more accurately define the representative magnitude and direction of that customer partiality vector. These rules can include identifying customer partiality vectors that corresponds to respective product vectorized characterizations having threshold variations or gaps in the vectorized characterizations between different products the customer purchases; identifying one or more customer partiality vectors that are newly defined within a threshold period of time; identifying one or more customer partiality vectors that have magnitudes and/or directions that are based on less than a threshold number of data points (e.g., less than a threshold numbers of products purchased that have corresponding product partiality vectors, less than a threshold number of products having at least a threshold magnitude of the corresponding product partiality vector, etc.); identifying customer partiality vectors that have a threshold relationship (e.g., a threshold number of previously purchased products have both first and second product partiality vectors, both having magnitudes greater that corresponding thresholds, etc.); identifying a customer partiality vector that has remained within a threshold for more than a threshold period of time; identifying a customer partiality vector that is subject to a threshold change within a threshold period of time; and other such rules.

For example, the vector probing control system 2102 can execute code of software modules to evaluate product vectorized characterizations of products that the customer of interest has purchased to identify threshold dispersions and/or gaps of a particular vectorized characterization between different products that the customer has or continues to purchase. Further, the vector probing control system can identify partiality vectors for which the customer is paying a premium (e.g., based on multiple different purchased products, the customer consistently pays a premium for products that are environmentally friendly, partiality vector emphasizing not harming or using animals in the making or testing of product, etc.). a consistency or common thread can be detected based on purchase history of one or more partiality vectors across multiple different products for which the customer is absorbing a premium. For example, a customer may buy multiple different products and paying a premium based on the partiality vector for saving the customer time. In further evaluation purchase history of the customer, the vector probing control system 2102 can identify one or more products that the customer is buying that does not correspond with the partiality vectors for which the customer is paying a premium in buying other products. In continuing the above example, the system may identify that the customer is not buying dishwasher soap that will save the customer time in doing dishes. Based on the current magnitude of the customer's partiality vector for saving time, the vector probing control system 2102 can identify that the customer will likely respond positively to a probe of a sample of dishwasher soap that has a high vectorized characterization for saving a user's time. Further, in some instances the product may be selected that also has a premium associated with that time saving vectorized characterization (e.g., added cost, does not claim to be animal cruelty-free, etc.). A probe of that product can be directed to the customer (e.g., sample, marketing material, alerts, other such probes, or combination of two or more of such probes).

The vector probing control system 2102 can evaluate the customer's subsequent actions relative to the probe. Over time, the resolution and/or accuracy improves for the magnitude of the time saving customer partiality vector corresponding to how important saving time is to the customer.

Further, the vector probing control system 2102 applies one or more rules of a product selection rule set to identify a first product having a second subjective magnitude of the first subjective partiality vector (i.e., a subjective magnitude of a first subjective product partiality vector that corresponds to the first subjective customer partiality vector) and also has a third magnitude of the second partiality vector (i.e., a second product partiality vector that corresponds to the second customer partiality vector) from a first set of product partiality vectors associated with the first product. Further, the product selection rule set directs the selection of the first product such that the second subjective magnitude is a first subject threshold difference than the first subjective magnitude, and the third magnitude of the second product partiality vector is further attributed with a first additional premium to be absorbed by the customer that is in excess of what the customer historically has absorbed relative to the first subjective partiality vector.

As one simple illustrative example, a first subjective customer partiality vector may be an aesthetic partiality vector with a first magnitude as defined in the presumed customer partiality vector target area 1902. The second customer partiality vector may correspond to a value per cost partiality vector corresponding to a customer's partiality to obtaining a presumed value in product per dollar spent. Applying the one or more product selection rules may direct the selection of a pair of exercise shoes (which is typically selected based on one or more additional partiality vectors and/or a knowledge of a need for the selected product) that has a threshold difference in a corresponding product aesthetic partiality vector from the customer aesthetic partiality vector in attempts to probe the customer's aesthetic partiality vector. The probing further attempts to determine a customer's value on aesthetics based on the difference in the second product partiality vector, which is the threshold difference from what the customer has historically absorbed. As a further example, the second product partiality vector may have a threshold difference in value per cost partiality vector such that the customer is getting less value (i.e., is paying more) for the pair of shoes than what the customer has historically accepted. This threshold difference in the second partiality vector is associated with the difference in the aesthetic partiality vector providing a ratio between the difference in magnitude of the aesthetic partiality vector and the difference in magnitude in the value per cost, and thus a measure of how much the customer is willing to absorb (e.g., pay) based on the difference in the first partiality vector, which in this example is the aesthetic partiality vector.

As another simple illustrative example, a customer may have a first magnitude of a desire to portray an image of success partiality vector. The product selection rule set can be applied to select a new watch for the customer. Again, the product selection rule set is typically applied in association with other parameters and/or partiality vectors (e.g., knowing the customer is in need of a new watch). The selection can identify a watch that has a product image of success partiality vector that has a magnitude that is a threshold different than the first magnitude of the customer's corresponding image of success partiality vector. Similarly, the customer can have a quality partiality vector with a second magnitude and corresponding to the presumed importance that the customer applies to the quality of products purchased. The selected watch is also selected in accordance with the product selection rule set to have a quality partiality vector with a third magnitude that is a threshold different from the second magnitude of the customer's quality partiality vector. Accordingly, the vectorization refinement system 2100 can determine a relative value or importance the customer places on the image of success partiality vector based on the ratio of the difference in magnitudes of the customer and product image of success partiality vector relative to the difference in magnitudes of the customer's historic quality partiality vector and the corresponding quality partiality vector of the selected product, in this example the watch. In some implementations, the relative value the customer places on the image of success partiality vector may be defined at least in part based on value=(customer image of success partiality vector–product image of success partiality vector)/(customer quality partiality vector–product quality partiality vector)). The above example describes determining a relative value of a single partiality vector based on a selected product. In some applications, however, a single product selected may allow the vectorization refinement system 2100 to probe more than one partiality vector, while in other instances, multiple different products may be selected to probe the single partiality vector or multiple different partiality vectors. For example, multiple different products may be selected in attempts to determine an importance or value of a first partiality vector relative to multiple different types of premiums (e.g., multiple other partiality vectors, cost, reduced quantity, etc.). Some embodiment alternatively or additionally consider and/or probe the representative directional aspect of one or more partiality vector.

In some embodiments, the vector probing control system 2102 identifies a set of one or more test products and selects a test product from the multiple different products that have at least a product partiality vector that is within a threshold alignment with the partiality vector target area while also being a threshold difference from the customer's corresponding partiality vector, and uses the selected probing product to probe and/or confirm the partiality vector target area 1902 and/or in identifying a presumed actual partiality vector 1903. For example, the vector probing control system 2102 can use the target area 1902 to select one or more products having a representative partiality vector 1910 from the target area and/or corresponding to the target area. In some embodiments, the vector probing control system applies a set of rules to: identify and select one or more representative partiality vectors 1910 from the target area 1902, which may include what the system currently has determined is the presumed customer's current partiality vector; apply intended differences from the customer's presumed current partiality vector; select one or more partiality vectors on one or more boundaries 1908 of the target area 1902; select one or more partiality vectors that are a threshold difference from one or more boundaries 1908; select one or more partiality vectors that are a threshold difference from the currently presumed customer partiality vector; select one or more partiality vectors that are a statistical variance from one or more boundaries, apexes or other references of the target area 1902; and the like. Such rules can include applying one or more thresholds (e.g., predefined variations from a customer's currently determined partiality vector; a threshold variation from one or more partiality vectors on one or more boundaries of the target area 1902; a threshold variation from a previously selected partiality vector within or outside of the target area, and/or other such thresholds); applying one or more constraints (e.g., cannot vary by one or more thresholds; cannot consider partiality vectors from one or more sets of one or more other customers, etc.); using detected changes over time (e.g., identify a detected change over time in magnitude (e.g., an increase or decrease) of the partiality vector of interest and/or other related partiality vectors, changes over time in the direction of the partiality vector of interest and/or other related partiality vectors, changes of partiality vectors of over other customers, etc.); and the like. In some embodiments, sample partiality vector selection rule(s) may intentionally cause a selection of a partiality vector 1912 that is outside of the target area 1902. The vector probing control circuit, in identifying and selecting a product, may execute one or more computer program modules to enable the selection the product that has the second subjective magnitude of the first subjective customer partiality vector that is a target threshold outside of the partiality vector target area 1902. This further can be used to test the boundaries 1908 of the target area 1902 and the actual partiality vector 1903. Using the selected partiality vector, one or more products may be identified that have a threshold alignment with the selected partiality vector. The vector probing control circuit, in identifying and selecting a product, may execute one or more computer program modules to enable the selection the product that has the second subjective magnitude of the first subjective customer partiality vector that is a target threshold outside of the partiality vector target area 1902.

In some embodiments, the product is selected with the intent to test the customer and/or customer's partialities, and obtain further information that is subsequently used to refine, adjust and/or confirm the system's determined current partiality vector target area 1902 and/or currently determined partiality vector for the customer. Accordingly, in some instances the threshold variation may be relatively small and consistent with the partiality vector target area 1902 and/or the system's determined current partiality vector. In other instances, the product is selected to intentionally deviate from the target area and/or the currently determined partiality vector. By selecting products that are consistent with the target area the vector probing control system 2102 can confirm and make minor adjustments to the partiality vector target area 1902 and/or the determined current partiality vector. Similarly, by selecting products that deviate from the target area and/or determined current partiality vector the system can confirm the target area 1902 and/or identify inaccuracies in the target area that the determined current partiality vector.

As described above, products can be selected that have at least the threshold variation from the customer's currently determined partiality vector based on a degree or level of alignment between one or more product partiality vectors of the product and the one or more threshold variations from one or more customer partiality vectors associated with the customer. In some embodiments, this alignment is determined based at least in part on one or more vector dot product calculations to identify which product to use in probing with customer's partialities. The vector probing control system applies one or more rules to determine levels of alignment between different products and the target area 1902 and/or the one or more threshold variations from representative vectors relative to the target area. The rules can include, but are not limited to, rules that apply one or more thresholds relative to alignment values (e.g., threshold differences, threshold alignments, etc.), one or more thresholds relative to variations in alignment values, threshold numbers of customer partiality vectors and product partiality vectors that are to be individually and/or cooperatively considered, other such rules, or combination of two or more of such rules. For example, in some instances, a product is intentionally selected that has a corresponding product partiality vector that corresponds to the customer partiality vector of interest, and that the product partiality vector does not align with the partiality vector target area 1902 and/or is outside of the partiality vector target area by at least a threshold. Selecting one or more products allows the vector probing control system 2102 to test an accuracy of the partiality vector target area 1902 and/or the currently determined customer partiality vector by selecting one or more products having a corresponding product partiality vector that has a threshold variation from the corresponding determined customer partiality vector, which may be an alignment that has the intended relationship to the partiality target area and/or the currently determined customer partiality vector of interest (e.g., alignment is a threshold variation outside of the partiality vector target area, alignment is a threshold variation from the currently determined customer partiality vector of interest, alignment is at a boundary 1908 of the partiality vector target area, etc.). Further, some embodiments consider more than one customer and/or product partiality vector and/or the alignment between multiple partiality vectors when selecting a product, relative to one or more premiums that are to be absorbed by the customer. The selected product may be a product that the customer has never been exposed to, while in other instances, may be a product with which the customer is familiar.

Further, in some implementations the vector probing control system 2102 may limit the threshold difference between customer and product partiality vectors and/or the difference in the second partiality vector (i.e., the premium to be absorbed) in an attempt to obtain feedback that is effective in obtaining a more accurate customer partiality vector magnitude and/or direction. For example, in some instances, with the magnitude of the product partiality vector is too different from the customer partiality vector the customer may disregard the selected product. This disregard for the selected product provides some feedback; however, may have limited feedback compared to when a customer takes action relative to the selected product. By one optional approach the vector probing control system 2102, in identifying the selected product, applies the product selection rule set to identify the selected product having the third magnitude of the product second partiality vector that is less than a threshold difference from the first magnitude of the corresponding customer second partiality vector of the first set of customer partiality vectors associated with the customer. Further, in some embodiments, the first partiality vector is a subjective partiality vector that is subject to change over a time period or periods, while the second partiality vector may be selected as an objective partiality vector, which often changes little or not at all over that same time period. The use of the objective partiality vector as the premium can allow for a more concrete understanding of the premium the customer is willing to accept in exchange for the difference in the first subjective partiality vector.

The vector probing control system, however, often selects a product that has at least a premium threshold difference in the second partiality vector to determine a measure of the premium the customer is willing to accept. As such, in some embodiments, the vector probing control system, in identifying the selected product, typically applies the product selection rule set to identify a product to be selected that has the third magnitude of the second partiality vector that is at least a premium threshold difference from the first magnitude of the corresponding customer second partiality vector. Accordingly, the additional premium comprises the difference in magnitudes between the third magnitude of the product's second partiality vector and the first magnitude of the corresponding customer's second partiality vector. Again, in some instances, the second partiality vector is selected as one of the objective partiality vectors, and accordingly, the premium threshold may be considered a premium objective threshold difference of objective magnitudes between the third objective magnitude of a second product objective partiality vector and the first objective magnitude of a second customer objective partiality vector.

By some approaches, the vector probing control system in identifying the selected product applies the product selection rule set to identify the selected product that has the third magnitude of the second partiality vector that is at least a premium objective threshold difference from historic objective magnitudes of the second partiality vector associated with a set of other products previously purchased by the customer. In such applications, the additional premium could include a difference in objective magnitudes between the third magnitude and the historic objective magnitudes.

Based on the selected product, the vector probing control system 2102 can cause a probe to be directed to the customer by causing the selected product to be directly marketed to the customer. The marketing may include emphasizing the partiality vector of interest that is being probed and/or emphasizing and/or illustrating the difference in magnitude and/or direction of the product partiality vector relative to the corresponding current customer partiality vector. The marketing to the customer can include, but is not limited to, sending a sample of the selected product to the customer, communicating a discount offer (e.g., a coupon, a notification of a reduced price, offer of a discount of one or more of the selected products upon the purchase of one of the selected product, and the like), presenting the product to the customer through a demonstration (e.g., while the customer is at the retail shopping facility, based on a scheduled appointment, directing the customer to a neighbor or acquaintance that has purchased the product, and the like), communicating information about the product, communicating a video of the product in use and/or a link to a website to view a video of the product in use, other such methods, or a combination of two or more of such methods. The communication of the marketing may be via email, text message, social media posting, advertising through one or more websites viewed by the customer, physical shipment, other such methods, or combination of such methods.

The vector probing control system in selecting a method of causing the selected product to be marketed to the customer can take into consideration one or more factors such as but not limited to historic effectiveness of methods of presenting product information for other products to the customer of interest, effectiveness of methods of providing the customer of interest with other products (e.g., samples, demonstrations, etc.), historic effectiveness of methods of presenting product information of the selected product to other customers, historic effectiveness of methods of providing the selected product to other customers, product manufacturer's and/or supplier's preferred methods of presenting the selected product, cost associated with presenting the product of interest to the customer of interest (e.g., cost to the retailer, the supplier, the manufacturer, the customer, etc.), other such factors, or combination of such factors. For example, in some instances, the vector probing control system causes a sample of the selected product to be provided to the customer. This may include initiating a packaging and mailing of the sample to the customer, notifying a worker at a point-of-sale system to give the sample to the customer while the customer is making purchases of other products while at the shopping facility (e.g., based on identifying the customer through a customer rewards program, facial recognition, etc.), notifying a third party (e.g., a manufacturer or supplier of the selected product) to mail a sample, causing an email with a coupon offer to be communicated to the customer, causing a link to a video showing the selected product to be texted to the customer's smart phone, other such actions, or combination of two or more actions.

The vector probing control system 2102 further receives feedback associated with the customer and corresponding to the selected product following the marketing of the product to the customer. This feedback can be obtained based on subsequent purchases by the customer and absorbed the additional premium (e.g., received through the product ordering system 2116, the inventory system 2114 (e.g., based on customer ordering the selected product or making purchases of the product (e.g., on-line purchases, at a retail shopping facility, etc.)), customer's response to a questionnaire, customer's rating of the selected product, customer's social media actions (e.g., social media posing may indicate discrepancy in the value proposition offered compared to the actual value received), other such information, and typically a combination of two or more of such information. For example, the system can use information about a subsequent purchase of the selected product and the absorption of the premium following the presentation of the information to the customer about the selected product, timing of the subsequent purchase, sequential purchases of the selected product, quantities of purchases of the selected product, the subsequent purchase of one or more competing products, a lack of change in purchase patterns by the customer, changes in purchase patterns of the customer, changes in purchase patterns of other customers associated with the customer (e.g., spouse, children, parents, siblings, friends, etc.), and other such information. As another example, a customer may submit a highly positive rating of the product, but does not subsequently purchase the product. Accordingly, the relevance of the customer's rating may be discounted based on the lack of change in customer purchase patterns. Different weightings may be applied to different types of feedback and/or the conditions associated with that feedback. For example, greater weighting may be applied to a subsequent purchase of a product when the customer has not previously purchased that product than when the customer has previously purchased that product. Similarly, greater weighting typically is applied to repeated subsequent purchases than a single purchase. Further, different weightings may be applied based on a timing of a purchase relative to the marketing of the product. As another example, different weightings may be applied to subsequent purchases of a product when a customer was previously purchasing a direct competing product than when the customer had not purchases a similar product in the past.

Using the feedback information and whether the customer was willing to absorb the premium, the vector probing control system can confirm or adjust the partiality vector target area 1902 and/or the presumed partiality vector (i.e., change one or both of the magnitude and direction) in an attempt to focus in on and more accurately define the customer's current actual partiality vector 1903. In some instances, the vector probing control system 2102 adjusts the subjective magnitude of a subjective partiality vector associated with the customer based on the feedback. The feedback, for example, may include at least one subsequent purchase of the selected product by the customer. The vector probing control system can detect and/or receive a notification of one or more subsequent purchases (e.g., from the inventory system 2114, the product ordering system 2116, or other source) of the selected product.

Based on the feedback, the vector probing control system can make adjustments to the partiality vector target area 1902 (e.g., enlarging, reducing, shifting, etc.), and/or to a previously determined customer partiality vector. In some embodiments, the vector probing control system can use the feedback to confirm a level of accuracy of the partiality vector target area 1902 and/or confirm a presumed corresponding customer partiality vector. The confirmation can be a positive confirmation in that the selected product may include a product partiality vector that has a relatively small variation from the customer partiality vector. Similarly, the confirmation can be a confirmation based on a negative reaction to the selected product, including when the product is selected because it has a product partiality vector that has a relatively large threshold difference with the customer partiality vector. Further, in some applications, the vector probing control system in adjusting the first subjective magnitude of the first customer subjective partiality vector adjusts the first subjective magnitude as a function of the additional premium that the customer is willing to accept to acquire the selected product. For example, the additional premium may be associated with a change scale that associated different quantities, amounts or levels of an additional premium to a corresponding change of one or more customer partiality vectors based on historic evaluations of changes in customer partiality vectors in relation to changes in customers' purchase patterns. As another example, a value may be determined as a function of a difference between the customer and the selected first subject product partiality vectors relative to the difference between the second customer and product partiality vectors, with the adjust to the first subjective customer partiality vector defined as a multiple of the value or an adjustment defined by a table of different values relative to different customer partiality vectors. Again, the table and/or multiplier can be determined based on historic changes in customers' partialities that corresponded to changes in purchase patterns corresponding to the second partiality vectors.

The vector probing control system, in some embodiments, can adjust the partiality vector target area 1902 by, in some instances, narrowing or reducing the partiality vector target area, shifting the partiality vector target area in one or more dimensions, or other adjustments. In some implementations, the vector probing control circuit in executing computer program modules of code can identify, for the customer, the multi-dimensional partiality vector target area 1902 defined within a multi-dimensional representative surface 1901, which is defined at least in part by a limited range of the first subjective magnitude for the first subjective partiality vector. The multi-dimensional partiality vector target area 1902 of the first subjective magnitude for the first subjective partiality vector can then be adjusted based on the additional premium that the customer is willing to accept based on feedback corresponding to the change in the first subjective partiality vector. These adjustments may be based on factors and/or functions similar to those described above and below (e.g., difference in alignment of partiality vectors, ratio of differences in alignment of partiality vectors relative to premium, etc.).

The level or degree of reduction can be dependent on one or more factors, such as but not limited to, the degree of alignment or misalignment between the corresponding product partiality vector and the customer partiality vector of interest, the duration of time between presenting the information to the customer and the subsequent one or more purchases, the number of subsequent purchases, the quantities of the selected product purchased in the one or more subsequent purchases, durations of time between subsequent purchases, and other such factors and information. For example, adjustments of a magnitude and/or direction of a customer partiality vector and/or the target area be a determined as a function of the effort cost of the premium paid for the product or service. In some instances, for example, effort cost is the perceived effort contained in a dollar, which is a function of the effort to earn that dollar. A customer's partiality vector can correspond to the strength of the belief that a particular order will return a good outcome. The customer's perception of the effort that is needed to impose the order creates the balance that a product's potential energy would be a good exchange of scalar effort (e.g., money).

In applying adjustments to one or more customer partiality vectors and/or corresponding partiality vector target areas 1902, the vector probing control system can execute computer program modules to cause the vector probing control system to reduce or increase the range of partiality magnitudes of the customer partiality vector target area, adjust (e.g., reduce or increase) a range of representative partiality directions corresponding to the partiality vector target area, adjust the magnitude and/or direction of the customer's presumed partiality vector, make other such adjustments, or a combination of two or more of such adjustments. For example, the vector probing control system, in adjusting the partiality vector target area, may adjust the range of representative partiality directions defining the partiality target area associated with the customer and corresponding to the partiality vector of interest. In some implementations, a single selected product may be used to confirm and/or adjust multiple partiality vector target areas and/or presumed corresponding partiality vectors associated with a customer. Again, in some embodiments, the selected test product is intentionally selected with a corresponding partiality vector that is outside of the partiality vector target area 1902 in attempts to test the customer's partialities.

In some embodiments, the vector probing control system attempts to confirm and/or more accurately determine a magnitude of one or more actual customer partiality vectors 1903 associated with the customer of interest and/or the partiality vector target area 1902 corresponding to the customer partiality vector of interest. The vector probing control system, in some applications, selects a test product where the customer has to absorb pay a premium (e.g., pay an additional cost, accept a second product partiality vector that deviates in alignment from a corresponding customer partiality vector, accept a second product partiality vector that varies from historic second product partiality vectors of multiple other products purchased in the past, accepts a delay in receiving the product, agrees to pay a shipping cost when the customer historically avoids shipping costs, and/or other such premiums) or other added expense in order to subsequently purchase or otherwise acquire the product following the selected test product being directly marketed to the customer. Feedback associated with the customer and following the marketing is processed by the vector probing control system executing computer program modules to adjust a corresponding customer partiality vector, and/or further identify or confirm the customer's actual partiality vector and/or the partiality vector target area 1902 when the customer is willing to pay or otherwise accept the premium. As described above, in some embodiments the vector probing control system 2102 may in part be implemented through multiple customer computing devices. For example, a customer computing device associated with a first customer may execute one or more computer program modules to at least locally adjust one or more customer partiality vector that are locally maintained and stored on memory of the customer computing device. In some applications, the vector probing control system may select the test product to test a customer partiality vector, and/or an accuracy of the partiality vector target area by selecting the test product that has the first product partiality vector that has a first threshold difference or misalignment with a corresponding first customer partiality vector, and the further has a second product partiality vector that has a second threshold difference or misalignment with a corresponding second customer partiality vector that corresponds to an additional premium to be absorbed by the customer that is in excess of what the customer historically has absorbed relative to the first partiality vector.

The premium that the customer is to absorb or pay to subsequently purchase or otherwise acquire the product following the marketing of the product to the customer can be a financial cost that is in excess of another related product (e.g., a competing product), an additional financial cost in excess of a product the customer has purchased in the past, a reduction in alignment between one or more other product partiality vectors and one or more customer partiality vectors that are different than the customer partiality vector of interest, an increase in complexity and/or time to acquire the product, an added cost of shipment, more frequent purchases, other such premiums, or a combination of two or more of such premiums. For example, in some embodiments, the premium cost comprises a magnitude of another product partiality vector of the test product that is a premium threshold less than a magnitude of another corresponding customer partiality vector of the customers.

As described above, the aforementioned vector probing control system 2102 and/or control circuit 1301 can utilize information including a plurality of partiality vectors for a particular customer along with vectorized product characterizations for each of a plurality of products to identify at least one product to present to a customer in attempts to more accurately identify a representative magnitude and/or direction of a customer partiality vector and/or a partiality vector target area 1902 of the partiality vector being evaluated. Additionally or alternatively, the processing and/or databases may be distributed over or more devices that are communicatively coupled over the distributed network 1310. As already suggested above, these approaches provide powerful ways for identifying products and/or services that a given person, or a given group of persons, may likely wish to buy to the exclusion of other options.

Figure 22:
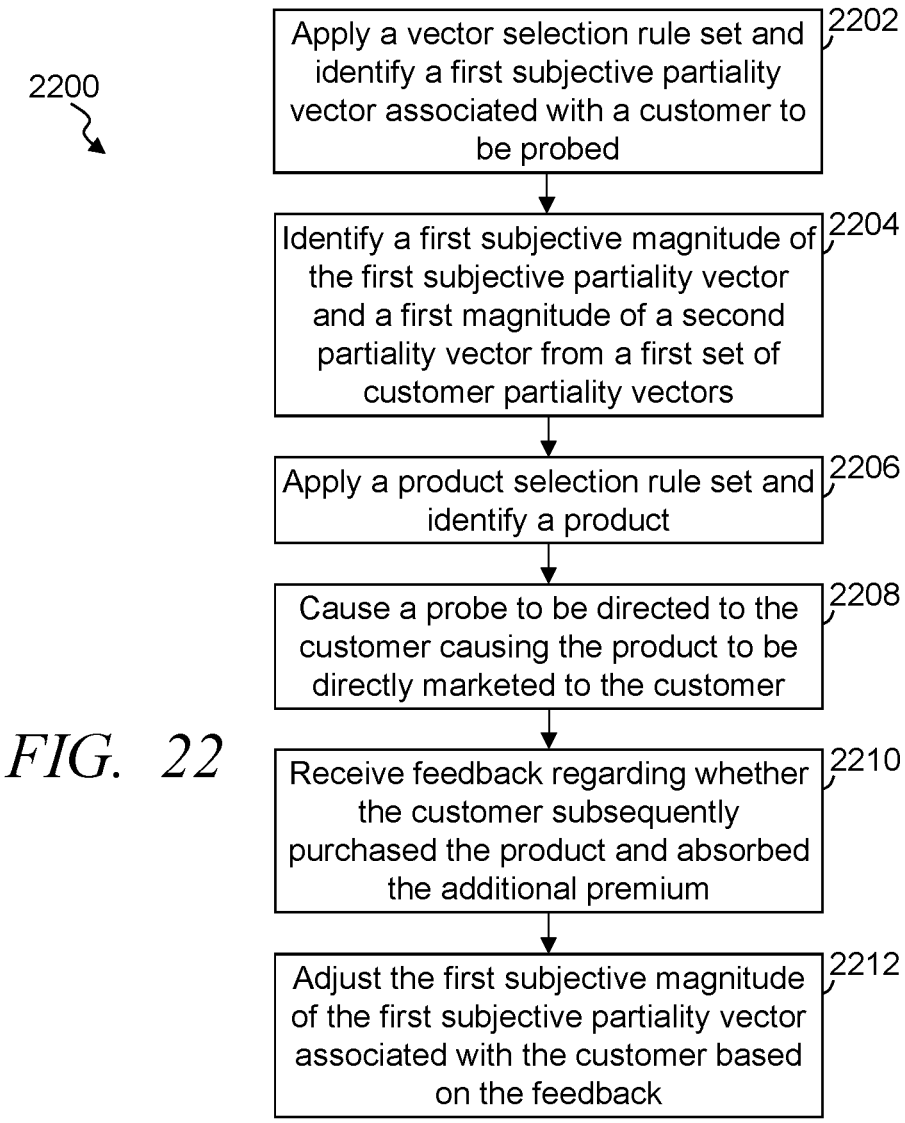
FIG. 22 illustrates a simplified flow diagram of an exemplary process of probing customers' target partiality vectors, in accordance with some embodiments.

FIG. 22 illustrates a simplified flow diagram of an exemplary process 2200 of refining retail shopping customer partiality vectors and probing customers' partiality vectors, in accordance with some embodiments. In step 2202, a vector selection rule set is applied to identify, from a customer database, a first subjective partiality vector associated with a customer to be probed. In some implementations, the customer database stores, for each of multiple different customers, a magnitude value and corresponding directional characterization for each different customer partiality vector of a set of multiple customer partiality vectors. The set of customer partiality vectors comprise multiple customer objective partiality vectors and multiple customer subjective partiality vectors including the first subjective partiality vector.

In step 2204, a first subjective magnitude of the first subjective partiality vector and a first magnitude of a second partiality vector, from a first set of customer partiality vectors associated with the first customer, are identified from the customer database. In some instances, the second partiality vector may be an objective partiality vector, while in other instances the second partiality vector may be a subjective partiality vector. In step 2206, one or more rules of a product selection rule set are applied relative to a product database and a first product is identified having a second subjective magnitude of the first subjective partiality vector and a third magnitude of the second partiality vector from a first set of product partiality vectors associated with the first product. In some embodiments, the second subjective magnitude is a subject threshold difference than the first subjective magnitude, and the third magnitude is further attributed with a first additional premium to be absorbed by the customer that is in excess of what the customer historically has absorbed relative to the first subjective partiality vector.

In step 2208, a probe is caused to be directed to the customer causing the first product to be directly marketed to the customer. The marketing can include causing a sample to be shipped to the customer, causing information to be communicated to the customer, providing a demonstration to the customer, other such marketing methods, or combination of two or more marketing methods. For example, the vector probing control system 2102 can communicate with the inventory system 2114 and determine an availability of a sample of the selected product, and instruct that inventor system to cause the sample to be delivered to the customer. Similarly, the vector probing control system may communicate with the product ordering system 2116 and direct the ordering system to order an item of the product or a sample of the product to be delivered to the customer. In step 2210, feedback is received regarding whether the customer subsequently purchased the first product and absorbed the first additional premium. The feedback can include one or more of numerous different types of feedback, including but not limited to purchases by the customer subsequent to the marketing to the customer, ratings of the selected product by the customer or someone associated with the customer (e.g., spouse, child, etc.), social media postings, and other such feedback. In some implementations, the product ordering system 2116 and/or point-of-sale systems at one or more retail shopping facilities can notify the vector probing control system of a purchase by the customer of the marketed product and/or competing products. In other instances, the vector probing control system can access product purchase information maintained in a customer database to obtain feedback following the marketing efforts.

In step 2212, the first subjective magnitude of the first subjective partiality vector associated with the customer is adjusted. In some instances, the adjustment may be based on whether the first customer subsequently purchased the selected product, timing of a subsequent purchase, a purchase of a competing product, receiving and/or detecting a rating of the selected product by the customer, receiving and/or detecting social media postings by the customer, other such feedback, or a combination of such feedback.

Some embodiments, in identifying the selected product, apply the product selection rule set and identify the first product having the third magnitude of the second partiality vector that is less than a threshold difference from the first magnitude of the second partiality vector of the first set of customer partiality vectors associated with the customer. This allows the system to limit the difference and allow a more accurate interpretation of the feedback and corresponding adjustments based on feedback. Further, some embodiments select the product with the third magnitude being within a threshold of historic magnitudes of the second partiality vector when the customer purchases similar products or other products.

In identifying the selected product, some embodiments apply the product selection rule set and identify the selected product having the third magnitude at least a premium threshold difference from the first magnitude of the second partiality vector. Further, the first additional premium includes at least the difference in magnitudes between the third magnitude of the second partiality vector and the first magnitude of the second partiality vector. In some instances, this difference is selected to be a reduction in the magnitude of the second partiality vector. The adjustment of the first subjective magnitude of the first subjective partiality vector can include adjusting the first subjective magnitude as a function of the first additional premium that the first customer is willing to accept to acquire the first product.

Some embodiments, in identifying the selected product, apply the product selection rule set and identify the product with the third magnitude of the second partiality vector being at least a premium objective threshold difference from historic objective magnitudes of the second partiality vector associated with a set of other products purchased by the customer. As such, the additional premium can include a difference in objective magnitudes between the third magnitude and the historic objective magnitudes. The vector probing control system 2102 may further access or identify for the customer a multi-dimensional partiality vector target area 1902 defined within a multi-dimensional representative surface 1901 defined by a limited range of the first subjective magnitude for the first subjective partiality vector. In some embodiments, the vector probing control system further causes the multi-dimensional partiality vector target area for the first subjective partiality vector to be adjusted based on the first additional premium.

One or more products may intentionally be selected with a relevant partiality vector that is outside the partiality vector target area. In some instances, a product can be selected having a product partiality vector that is a target threshold outside of the partiality vector target area to a corresponding customer partiality vector (e.g., having a threshold misalignment between the first subject product partiality vector and the first subjective customer partiality vector). Some embodiments implement a distributed customer database maintained across at least multiple different customer computing devices 2112, and receive processing of at least customer data stored in the distributed database 2104 from a plurality of customer computing device control circuits located in the multiple different customer computing devices that are geographically distributed over one or more geographic areas.

The vector probing control system attempts to obtain more accurate customer partiality vectors and adjust those customer partiality vectors over time to be consistent with customers' changing partialities. Accordingly, some embodiments probe the customer by selecting one or more test products that can be marketed to the customer (e.g., through samples, demonstrates, distribution of information, etc.). Based on feedback to the marketed product, the system can confirm and/or adjust the accuracy of the customer partiality vectors, corresponding mapping of one or more partiality vectors and/or corresponding partiality vector target areas. The partiality vector target areas may be defined and tested in attempts to obtain a threshold confidence level (e.g., 80% confidence) that the actual partiality vector is within the target area, while further testing may be applied in attempts to obtain a second threshold level of confidence (e.g., 95% confidence) corresponding to the actual or "bullseye" partiality vector.

Some embodiments select one or more test products that are on the boundaries or within a threshold of the boundaries or margins of the target area. Feedback from these products can confirm the target area and in some instances allow a narrowing of the target area. Some embodiments may additionally probe a customer's partiality vectors and make adjustments consistent with the probing and adjustments described in U.S. Application Ser. No. 62/467,546, filed Mar. 6, 2017, for Wilkinson et al., entitled PARTIALITY VECTOR REFINEMENT SYSTEMS AND METHODS THROUGH SAMPLE PROBING, which is incorporated herein by reference in its entirety.

Figure 23:
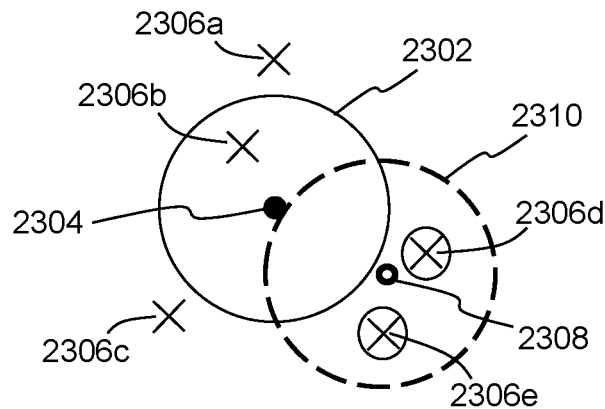
FIG. 23 illustrates a simplified two-dimensional graphic representation of a currently assumed partiality vector target area corresponding to a believed specific partiality vector within a multi-dimensional space, and an adjusted partiality vector and adjusted partiality vector target area, in accordance with some embodiments.

Some embodiments in probing partiality vectors test future states of targeted partiality vectors. FIG. 23 illustrates a simplified two-dimensional graphic representation of a currently assumed partiality vector target area 2302 corresponding to a believed specific partiality vector 2304 within a multi-dimensional space (e.g., similar to that in FIG. 19A), in accordance with some embodiments. One or more products can be selected with corresponding probing product partiality vectors 2306*a-e* (i.e., probing partiality vectors) that are one or more threshold different from the customer partiality vector and/or the target area 2302 (e.g., sending free samples and/or providing free demonstration). Based on marketing efforts relative to one or more of the identified products the system can receive feedback associated with the customer. Using the feedback (e.g., customer positively responds, "likes", or otherwise responds more positively to a subset of the probing product partiality vectors 2306*d-e*), the system can make adjustments to define an adjusted partiality vector 2308 and/or a correspond adjusted partiality vector target area 2310. Some embodiments may further probe the adjusted partiality vector 2308. For example, subsequent marketing may automatically order the product for the customer and charge the customer for the product and evaluate subsequent actions by the customer (e.g., whether the customer returns the product, submits a complaint, makes subsequent purchases, etc.) in an effort to confirm the adjusted partiality vector 2308 and adjusted partiality vector target area 2308, and/or make further adjustments in an efforts to determine a more accurate customer partiality vector.

By probing the customer, the partiality vectorization refinement system 1400 can identify different premiums that customers are willing to pay for differences in partiality vectors relative to different values than what the customer typically has pay or accepted in the past, and to identify premiums that the customer is not willing to pay or accept. For example, the system can identify products that a customer pays a premium for when those product do not provide a greater reduction in energy that the customer applies in use of that product or provide a benefit from a utility perspective. Further, the system can identify when a customer is willing to sacrifice utility or exchange a larger cost amount for a product that has less of a utility return, while providing a different subjective partiality vector (e.g., aesthetic, image, appearance of success, and other such partiality vectors). Based on the premium determined through feedback that a customer is willing to absorb or not absorb, the system can make adjustments to one or more partiality vectors or confirm an accuracy of a partiality vector corresponding to that customer. Objective and subjective partiality vectors can be probed and adjusted. Some embodiments may continue to probe and/or repeatedly probe the same partiality vector to progressively push the boundaries of the customer's partiality vector. For example, the probing may continue as long as the customer continues to accept the premium, and until the customer does not pay the premium and/or negative feedback is identified. Additionally, the system can use multiple different products to test one or more customer partiality vectors. Typically, a single product corresponds to multiple different subjective and objective partiality vectors. Accordingly, different products can be used with varying changes and/or static partiality vectors to distinguish between which changing subjective and/or objective partiality vectors for which the customer is willing to absorb the premium, and the magnitude of the premium the customer is willing to absorb (e.g., send a first product with a higher aesthetics magnitude than a prestige magnitude; and send second a second product with a higher prestige magnitude than aesthetics magnitude in order to distinguish between magnitudes of aesthetics and prestige). In some instances, products are selected that that focus premiums on limited numbers of partiality vectors in attempts to accurately identify magnitudes. Some embodiments further use the identified and/or adjusted partiality vector information to market to one or more suppliers regarding changing distribution of products, modifying a product, and/or creating a new product (e.g., notify a supplier that they should provide a product with a higher premium on aesthetics for a group of customers that are not being serviced or are being under-serviced).

In some embodiments, the customer partiality vectorization refinement system selects one or more products to be marketed to an individual customer (e.g., sample and/or demonstrate at a store). The system can determine when to market to customers who have partiality vector target solution sets near product vectors of potential products based on associations between the product partiality vectors and the customer partiality vectors (sometimes referred to as value vectors) based on information collected over time.

In some embodiments, a retail shopping customer partiality vectorization refinement system is provided comprising: a customer database storing, for each of multiple different customers, a set of multiple customer partiality vectors comprising customer objective and subjective partiality vectors; a product database storing, for each of multiple different products, a set of product objective and subjective partiality vectors; a vector probing control circuit operably coupled with the customer database and the product database, and configured to: apply a vector selection rule set to identify a first subjective partiality vector associated with a first customer to be probed, and identify a first subjective magnitude of the first subjective partiality vector and a first magnitude of a second partiality vector from a first set of customer partiality vectors associated with the first customer; apply a product selection rule set to identify a first product having a second subjective magnitude of the first subjective partiality vector and a third magnitude of the second partiality vector from a first set of product partiality vectors associated with the first product, wherein the second subjective magnitude is a first subject threshold difference than the first subjective magnitude, and the third magnitude is further attributed with a first additional premium to be absorbed by the first customer that is in excess of what the first customer historically has absorbed relative to the first subjective partiality vector; cause a first probe to be directed to the first customer causing the first product to be directly marketed to the first customer; receive feedback regarding whether the first customer subsequently purchased the first product and absorbed the first additional premium; and adjust the first subjective magnitude of the first subjective partiality vector associated with the first customer based on the feedback.

Some embodiments provide methods of refining retail shopping customer partiality vectors, comprising by a vector probing control circuit: applying a vector selection rule set and identifying, from a first customer database, a first subjective partiality vector associated with a first customer to be probed, wherein the first customer database stores, for each of multiple different customers, a magnitude value and corresponding directional characterization for each different customer partiality vector of a set of multiple customer partiality vectors, wherein the set of customer partiality vectors comprise multiple customer objective partiality vectors and multiple customer subjective partiality vectors including the first subjective partiality vector; identifying, from the customer database, a first subjective magnitude of the first subjective partiality vector and a first magnitude of a second partiality vector from a first set of customer partiality vectors associated with the first customer; applying a product selection rule set relative to a product database and identifying a first product having a second subjective magnitude of the first subjective partiality vector and a third magnitude of the second partiality vector from a first set of product partiality vectors associated with the first product, wherein the second subjective magnitude is a first subject threshold difference than the first subjective magnitude, and the third magnitude is further attributed with a first additional premium to be absorbed by the first customer that is in excess of what the first customer historically has absorbed relative to the first subjective partiality vector; causing a first probe to be directed to the first customer causing the first product to be directly marketed to the first customer; receiving feedback regarding whether the first customer subsequently purchased the first product and absorbed the first additional premium; and adjusting the first subjective magnitude of the first subjective partiality vector associated with the first customer based on the feedback.

Figure 24:
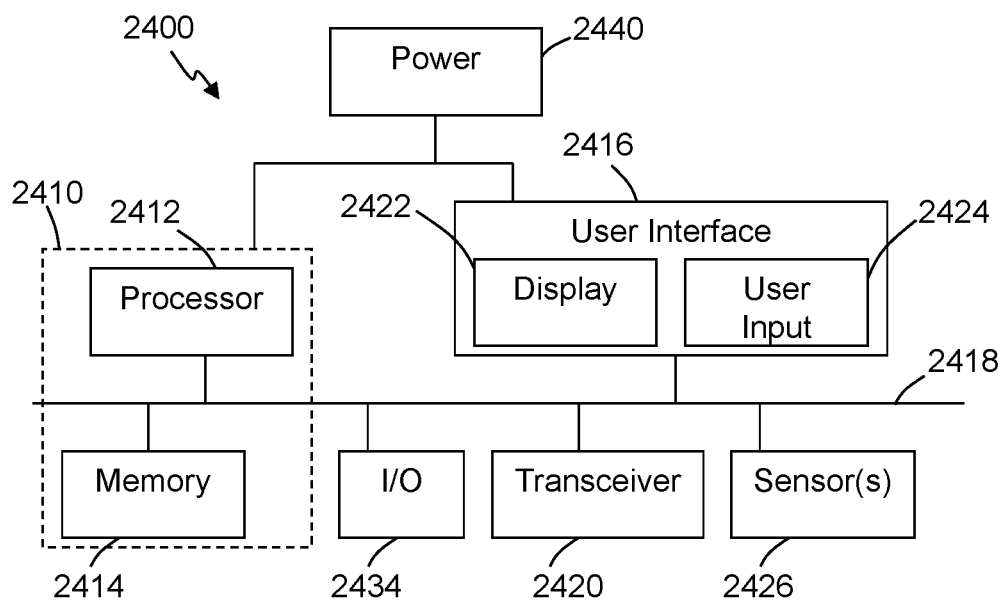
FIG. 24 illustrates an exemplary system for use in implementing methods, techniques, devices, apparatuses, systems, servers, sources and providing access to rendered retail environments, in accordance with some embodiments.

Further, the systems, circuits, circuitry, devices, processes, methods, techniques, functionality, services, servers, sources and the like described herein may be utilized, implemented and/or run on many different types of devices and/or systems. FIG. 24 illustrates an exemplary system 2400 that may be used for implementing any of the components, circuits, circuitry, systems, functionality, apparatuses, processes, or devices of the apparatus 1300 of FIG. 13, the system of FIG. 17, the vectorization refinement system 1800 of FIG. 18, the vectorization refinement system 2100, and/or other above or below mentioned systems or devices, or parts of such circuits, circuitry, functionality, systems, apparatuses, processes, or devices. For example, the system 2400 may be used to implement some or all of the control circuit 1301, the central cloud server 1701, the supplier control circuit 1702, the internet of things systems 1703, the remote resources 1704, the refinement control system 1802, the customer computing devices 1812, the inventory system 1814, the product ordering system 1816, the vector probing control system 2102, the customer computing devices 2112, the inventory system 2114, the product ordering system 2116, and/or other such components, circuitry, functionality and/or devices. However, the use of the system 2400 or any portion thereof is certainly not required.

By way of example, the system 2400 may comprise a control circuit or processor module 2412, memory 2414, and one or more communication links, paths, buses or the like 2418. Some embodiments may include one or more user interfaces 2416, and/or one or more internal and/or external power sources or supplies 2440. The control circuit 2412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 2412 can be part of control circuitry and/or a control system 2410, which may be implemented through one or more processors with access to one or more memory 2414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 2400 may be used to implement one or more of the above or below, or parts of, components, circuits, systems, processes and the like. For example, the system may implement the refinement control system 1802 with the control circuit being a vectorized refinement control circuit, the customer computing devices 1812 with computing device control circuits, the vector probing control system 2102 with the control circuit being a vector probing control circuit, the customer computing devices 2112 with computing device control circuits or other components.

The user interface 2416 can allow a user to interact with the system 2400 and receive information through the system. In some instances, the user interface 2416 includes a display 2422 and/or one or more user inputs 2424, such as buttons, touch screen, track ball, keyboard, mouse, etc., which can be part of or wired or wirelessly coupled with the system 2400. Typically, the system 2400 further includes one or more communication interfaces, ports, transceivers 2420 and the like allowing the system 2400 to communicate over a communication bus, a distributed computer and/or communication network 1310 (e.g., a local area network (LAN), the Internet, wide area network (WAN), etc.), communication link 2418, other networks or communication channels with other devices and/or other such communications or combination of two or more of such communication methods. Further the transceiver 2420 can be configured for wired, wireless, optical, fiber optical cable, satellite, or other such communication configurations or combinations of two or more of such communications. Some embodiments include one or more input/output (I/O) ports 2434 that allow one or more devices to couple with the system 2400. The I/O ports can be substantially any relevant port or combinations of ports, such as but not limited to USB, Ethernet, or other such ports. The I/O interface 2434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 2400 comprises an example of a control and/or processor-based system with the control circuit 2412. Again, the control circuit 2412 can be implemented through one or more processors, controllers, central processing units, logic, software and the like. Further, in some implementations the control circuit 2412 may provide multiprocessor functionality.

The memory 2414, which can be accessed by the control circuit 2412, typically includes one or more processor readable and/or computer readable media accessed by at least the control circuit 2412, and can include volatile and/or nonvolatile media, such as RAM, ROM, EEPROM, flash memory and/or other memory technology. Further, the memory 2414 is shown as internal to the control system 2410; however, the memory 2414 can be internal, external or a combination of internal and external memory. Similarly, some or all of the memory 2414 can be internal, external or a combination of internal and external memory of the control circuit 2412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 1310. The memory 2414 can store code, software, executables, scripts, data, content, lists, programming, programs, log or history data, user information, customer information, product information, and the like. While FIG. 24 illustrates the various components being coupled together via a bus, it is understood that the various components may actually be coupled to the control circuit and/or one or more other components directly.

Some embodiments provide retail shopping customer partiality vectorization refinement systems, comprising: a customer database storing at least a different set of multiple customer partiality vectors for each of multiple different customers; a product database storing at least a different set of multiple product partiality vectors for each of multiple different products; and a vectorized refinement control circuit operably coupled with the customer database and the product database, wherein the refinement control circuit is configured to: identify, for a first customer of the multiple customers, a multi-dimensional partiality vector target area defined within a multi-dimensional representative volume defined by a limited range of partiality magnitudes and limited range of representative partiality directions for a first customer partiality vector, wherein the partiality vector target area represents a multi-dimensional representation of an area in which an unknown actual magnitude and direction for the first customer partiality vector are predicted to lie; select a first product from the multiple different products having at least a first product partiality vector that is within a threshold alignment with the partiality vector target area, and cause the first product to be presented to the first customer; receive, following the first product being presented to the first customer, feedback associated with the first customer and corresponding to the first product; and adjust the partiality vector target area based on the feedback. In some implementations, the refinement control circuit is configured to: confirm, based on the feedback comprising at least one subsequent purchase of the first product by the first customer, a level of accuracy of the partiality vector target area; and reduce, in adjusting the partiality vector target area, the partiality vector target area.

In some embodiments, the refinement control circuit, in causing the first product to be presented to the first customer, is configured to cause a sample of the first product to be provided to the first customer. In some applications, the refinement control circuit, in adjusting the partiality vector target area, is configured to reduce the range of partiality magnitudes defining the partiality vector target area. The refinement control circuit, in adjusting the partiality vector target area, may be configured to adjust the range of representative partiality directions defining the partiality vector target area. In some implementations, the refinement control circuit, in selecting the first product, is configured to test an accuracy of the partiality vector target area by selecting the first product having the first product partiality vector that has the alignment that is a threshold vector outside of the partiality vector target area. In some embodiments, the refinement control circuit, in selecting the first product, is configured to test an accuracy of the partiality vector target area by selecting the first product having the first product partiality vector and costs the first customer a premium. Further, in some embodiments, the premium cost comprises a magnitude of a second product partiality vector of the first product that is a premium threshold less than a magnitude of a second customer partiality vector of the first customers. In some embodiments, the customer database comprises a distributed database maintained across at least multiple different customer computing devices, and the refinement control circuit is configured to receive processing of at least the distributed database from a plurality of customer computing device control circuits located in the multiple different customer computing devices that are geographically distributed over a geographic area.

Some embodiments provide methods of refining retail shopping customer partiality vectors, comprising: identifying, for a first customer of the multiple customers, a multi-dimensional partiality vector target area defined within a multi-dimensional representative volume defined by a limited range of partiality magnitudes and limited range of representative partiality directions for a first customer partiality vector, wherein the partiality vector target area represents a multi-dimensional representation of an area in which a unknown actual magnitude and direction for the first customer partiality vector are predicted to lie; selecting a first product from the multiple different products having at least a first product partiality vector that is within a threshold alignment with the partiality vector target area, and causing the first product to be presented to the first customer; receiving, following the first product being presented to the first customer, feedback associated with the first customer and corresponding to the first product; and adjusting the partiality vector target area based on the feedback. In some embodiments, the method further comprises: confirming, based on the feedback comprising at least one subsequent purchase of the first product by the first customer, a level of accuracy of the partiality vector target area; and reducing, in adjusting the partiality vector target area, the partiality vector target area.

Some embodiments in causing the first product to be presented to the first customer comprise causing a sample of the first product to be provided to the first customer. The adjusting the partiality vector target area, in some implementations, comprises reducing the range of partiality magnitudes of the first customer partiality vector. The adjusting of the partiality vector target area, in some embodiments comprises adjusting the range of representative partiality directions of the first customer partiality vector. In some embodiments, the method further comprises: testing an accuracy of the partiality vector target area comprises implementing the selecting of the first product such that the first product has the first product partiality vector that has the alignment that is a threshold vector outside of the partiality vector target area. The method, in some implementations, further comprises: testing an accuracy of the partiality vector target area comprises implementing the selecting of the first product such that the first product has the first product partiality vector and costs the first customer a premium. The selecting of the first product, in some embodiments, comprises selecting the first product having the premium cost comprising a magnitude of a second product partiality vector of the first product being a premium threshold less than a magnitude of a second customer partiality vector of the first customer. The method, in some embodiments, further comprises: implementing a distributed customer database maintained across at least multiple different customer computing devices, and causing processing of at least the customer partiality vectors through a plurality of customer computing device control circuits located in the multiple different customer computing devices that are geographically distributed over a geographic area.

Some embodiments provide retail shopping customer partiality vectorization refinement systems, comprising: a customer database storing, for each of multiple different customers, a set of multiple customer partiality vectors comprising customer objective and subjective partiality vectors; a product database storing, for each of multiple different products, a set of product objective and subjective partiality vectors; a vector probing control circuit operably coupled with the customer database and the product database, and configured to: apply a vector selection rule set to identify a first subjective partiality vector associated with a first customer to be probed, and identify a first subjective magnitude of the first subjective partiality vector and a first magnitude of a second partiality vector from a first set of customer partiality vectors associated with the first customer; apply a product selection rule set to identify a first product having a second subjective magnitude of the first subjective partiality vector and a third magnitude of the second partiality vector from a first set of product partiality vectors associated with the first product, wherein the second subjective magnitude is a first subject threshold difference than the first subjective magnitude, and the third magnitude is further attributed with a first additional premium to be absorbed by the first customer that is in excess of what the first customer historically has absorbed relative to the first subjective partiality vector; cause a first probe to be directed to the first customer causing the first product to be directly marketed to the first customer; receive feedback regarding whether the first customer subsequently purchased the first product and absorbed the first additional premium; and adjust the first subjective magnitude of the first subjective partiality vector associated with the first customer based on the feedback.

In some embodiments, the vector probing control circuit in identifying the first product applies the product selection rule set to identify the first product having the third magnitude of the second partiality vector that is less than a second threshold difference from the first magnitude of the second partiality vector of the first set of customer partiality vectors associated with the first customer. The vector probing control circuit in identifying the first product, in some implementations, applies the product selection rule set to identify the first product having the third magnitude at least a premium threshold difference from the first magnitude of the second partiality vector wherein the first additional premium comprises a difference in magnitudes between the third magnitude of the second partiality vector and the first magnitude of the second partiality vector. In some embodiments, the vector probing control circuit in adjusting the first subjective magnitude of the first subjective partiality vector adjusts the first subjective magnitude as a function of the first additional premium that the first customer is willing to accept to acquire the first product.

In some embodiments, the vector probing control circuit in identifying the first product applies the product selection rule set to identify the first product having the third magnitude of the second partiality vector at least a premium objective threshold difference from historic objective magnitudes of the second partiality vector associated with a set of other products purchased by the first customer, wherein the first additional premium comprises a difference in objective magnitudes between the third magnitude and the historic objective magnitudes. The vector probing control circuit, in some embodiments, is further configured to identify, for the first customer, a multi-dimensional partiality vector target area defined within a multi-dimensional representative surface defined by a limited range of the first subjective magnitude for the first subjective partiality vector; and adjust the multi-dimensional partiality vector target area for the first subjective partiality vector based on the first additional premium. In some embodiments, the vector probing control circuit, in identifying the first product, is configured to select the first product having the second subjective magnitude of the first subjective partiality vector that is a target threshold outside of the corresponding partiality vector target area. The customer database, in some embodiments, comprises a distributed database maintained across at least multiple different customer computing devices, and the vector probing control circuit is configured to receive processing of at least customer data stored in the distributed database from a plurality of customer computing device control circuits located in the multiple different customer computing devices that are geographically distributed over a geographic area.

Some embodiments provide methods of refining retail shopping customer partiality vectors, comprising: by a vector probing control circuit: applying a vector selection rule set and identifying, from a first customer database, a first subjective partiality vector associated with a first customer to be probed, wherein the first customer database stores, for each of multiple different customers, a magnitude value and corresponding directional characterization for each different customer partiality vector of a set of multiple customer partiality vectors, wherein the set of customer partiality vectors comprise multiple customer objective partiality vectors and multiple customer subjective partiality vectors including the first subjective partiality vector; identifying, from the customer database, a first subjective magnitude of the first subjective partiality vector and a first magnitude of a second partiality vector from a first set of customer partiality vectors associated with the first customer; applying a product selection rule set relative to a product database and identifying a first product having a second subjective magnitude of the first subjective partiality vector and a third magnitude of the second partiality vector from a first set of product partiality vectors associated with the first product, wherein the second subjective magnitude is a first subject threshold difference than the first subjective magnitude, and the third magnitude is further attributed with a first additional premium to be absorbed by the first customer that is in excess of what the first customer historically has absorbed relative to the first subjective partiality vector; causing a first probe to be directed to the first customer causing the first product to be directly marketed to the first customer; receiving feedback regarding whether the first customer subsequently purchased the first product and absorbed the first additional premium; and adjusting the first subjective magnitude of the first subjective partiality vector associated with the first customer based on the feedback. The identifying of the first product, in some embodiments, comprises applying the product selection rule set and identifying the first product having the third magnitude of the second partiality vector that is less than a second threshold difference from the first magnitude of the second partiality vector of the first set of customer partiality vectors associated with the first customer.

In some embodiments, the identifying of the first product comprises applying the product selection rule set and identifying the first product having the third magnitude at least a premium threshold difference from the first magnitude of the second partiality vector wherein the first additional premium comprises a difference in magnitudes between the third magnitude of the second partiality vector and the first magnitude of the second partiality vector. The adjusting of the first subjective magnitude of the first subjective partiality vector, in some embodiments, comprises adjusting the first subjective magnitude as a function of the first additional premium that the first customer is willing to accept to acquire the first product. In some embodiments, the identifying the first product comprises applying the product selection rule set and identifying the first product having the third magnitude of the second partiality vector at least a premium objective threshold difference from historic objective magnitudes of the second partiality vector associated with a set of other products purchased by the first customer, wherein the first additional premium comprises a difference in objective magnitudes between the third magnitude and the historic objective magnitudes. The method, in some embodiments, further comprises: identifying, for the first customer, a multi-dimensional partiality vector target area defined within a multi-dimensional representative surface defined by a limited range of the first subjective magnitude for the first subjective partiality vector; and adjusting the multi-dimensional partiality vector target area for the first subjective partiality vector based on the first additional premium. The identifying the first product, in some embodiments, comprises selecting the first product having the second subjective magnitude of the first subjective partiality vector that is a target threshold outside of the partiality vector target area. In some embodiments, the method further comprises: implementing a distributed customer database maintained across at least multiple different customer computing devices, and receiving processing of at least customer data stored in the distributed database from a plurality of customer computing device control circuits located in the multiple different customer computing devices that are geographically distributed over a geographic area.

Some embodiments provide apparatuses, comprising: a memory having stored therein: information including partiality information for each of a plurality of persons in the form of a plurality of partiality vectors for each of the persons wherein the partiality vector has at least one of a magnitude and an angle that corresponds to a magnitude of the person's belief in an amount of good that comes from an order associated with that partiality; and vectorized characterizations for each of a plurality of products, wherein each of the vectorized characterizations indicates a measure regarding an extent to which a corresponding one of the products accords with a corresponding one of the plurality of partiality vectors. In some embodiments the apparatus further comprises: a control circuit operably coupled to the memory and configured to compare a particular one of the partiality vectors for a particular one of the plurality of persons to each of a plurality of the vectorized characterizations to thereby identify a particular one of the plurality of products that best accords with the particular one of the partiality vectors. The control circuit, in some implementations, is configured to compare the particular one of the partiality vectors to each of the plurality of the vectorized characterizations using vector dot product calculations. The partiality information, in at least some embodiments, include values, preferences, aspirations, and affinities. In some embodiments, the apparatus further comprises: a control circuit operably coupled to the memory and configured as a state engine that uses the partiality vectors and the vectorized characterizations to identify at least one product to present to a customer.

In some embodiments the apparatus further comprises: a control circuit operably coupled to the memory and configured to use the partiality vectors and the vectorized characterizations to identify at least one product to present to the customer by, at least in part: using the partiality vectors and the vectorized characterizations to define a plurality of solutions that collectively form a multi-dimensional surface; selecting the at least one product from the multi-dimensional surface. The control circuit, in some instances, is further configured to use the partiality vectors and the vectorized characterizations to identify at least one product to present to the customer by, at least in part: accessing other information for the customer comprising information other than partiality vectors; using the other information to constrain a selection area on the multi-dimensional surface from which the at least one product can be selected. In some embodiments, the other information comprises objective information.

This application is related to, and incorporates herein by reference in its entirety, each of the following U.S. provisional applications listed as follows by application number and filing date: 62/323,026 filed Apr. 15, 2016; 62/341,993 filed May 26, 2016; 62/348,444 filed Jun. 10, 2016; 62/350,312 filed Jun. 15, 2016; 62/350,315 filed Jun. 15, 2016; 62/351,467 filed Jun. 17, 2016; 62/351,463 filed Jun. 17, 2016; 62/352,858 filed Jun. 21, 2016; 62/356,387 filed Jun. 29, 2016; 62/356,374 filed Jun. 29, 2016; 62/356,439 filed Jun. 29, 2016; 62/356,375 filed Jun. 29, 2016; 62/358,287 filed Jul. 5, 2016; 62/360,356 filed Jul. 9, 2016; 62/360,629 filed Jul. 11, 2016; 62/365,047 filed Jul. 21, 2016; 62/367,299 filed Jul. 27, 2016; 62/370,853 filed Aug. 4, 2016; 62/370,848 filed Aug. 4, 2016; 62/377,298 filed Aug. 19, 2016; 62/377,113 filed Aug. 19, 2016; 62/380,036 filed Aug. 26, 2016; 62/381,793 filed Aug. 31, 2016; 62/395,053 filed Sep. 15, 2016; 62/397,455 filed Sep. 21, 2016; 62/400,302 filed Sep. 27, 2016; 62/402,068 filed Sep. 30, 2016; 62/402,164 filed Sep. 30, 2016; 62/402,195 filed Sep. 30, 2016; 62/402,651 filed Sep. 30, 2016; 62/402,692 filed Sep. 30, 2016; 62/402,711 filed Sep. 30, 2016; 62/406,487 filed Oct. 11, 2016; 62/408,736 filed Oct. 15, 2016; 62/409,008 filed Oct. 17, 2016; 62/410,155 filed Oct. 19, 2016; 62/413,312 filed Oct. 26, 2016; 62/413,304 filed Oct. 26, 2016; 62/413,487 filed Oct. 27, 2016; 62/422,837 filed Nov. 16, 2016; 62/423,906 filed Nov. 18, 2016; 62/424,661 filed Nov. 21, 2016; 62/427,478 filed Nov. 29, 2016; 62/436,842 filed Dec. 20, 2016; 62/436,885 filed Dec. 20, 2016; 62/436,791 filed Dec. 20, 2016; 62/439,526 filed Dec. 28, 2016; 62/442,631 filed Jan. 5, 2017; 62/445,552 filed Jan. 12, 2017; 62/463,103 filed Feb. 24, 2017; 62/465,932 filed Mar. 2, 2017; 62/467,546 filed Mar. 6, 2017; 62/467,968 filed Mar. 7, 2017; 62/467,999 filed Mar. 7, 2017; 62/471,804 filed Mar. 15, 2017; 62/471,830 filed Mar. 15, 2017; 62/479,525 filed Mar. 31, 2017; 62/480,733 filed Apr. 3, 2017; 62/482,863 filed Apr. 7, 2017; 62/482,855 filed Apr. 7, 2017; and 62/485,045 filed Apr. 13, 2017.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A retail shopping customer partiality vectorization refinement system, comprising:
 a memory having stored therein:
  a customer database storing at least a different set of multiple customer partiality vectors for each of multiple different customers wherein each of the customer partiality vectors has at least one of a magnitude and an angle that corresponds to a magnitude for the person associated with that partiality; and
  a product database storing at least a different set of multiple product vectorized characterizations for each of multiple different products, wherein each of the vectorized characterizations indicates a measure regarding an extent to which a corresponding one of the products accords with a corresponding one of the multiple customer partiality vectors; and
 a vectorized refinement control circuit operably coupled with the customer database and the product database, wherein the refinement control circuit:
  identifies, for a first customer of the multiple customers, a multi-dimensional partiality vector target area defined within a multi-dimensional representative volume defined by a limited range of partiality magnitudes and limited range of representative partiality directions for a first customer partiality vector, wherein the partiality vector target area represents a multi-dimensional representation of an area in which an unknown actual magnitude and direction for the first customer partiality vector are predicted to lie;
  selects a first product from the multiple different products having at least a first product vectorized characterization that is within a threshold alignment with the partiality vector target area, and causes the first product to be presented to the first customer;
  receives, following the first product being presented to the first customer, feedback associated with the first customer and corresponding to the first product; and
  adjusts the partiality vector target area based on the feedback;
 wherein the customer database comprises a distributed database maintained across at least multiple different customer computing devices, and the refinement control circuit receives processing of at least the distributed database from a plurality of customer computing device control circuits located in the multiple different customer computing devices that are geographically distributed over a geographic area.

2. The system of claim 1, wherein the refinement control circuit further confirms, based on the feedback comprising at least one subsequent purchase of the first product by the first customer, a level of accuracy of the partiality vector target area; and
 reduces, in adjusting the partiality vector target area, the partiality vector target area.

3. The system of claim 2, wherein the refinement control circuit, in causing the first product to be presented to the first customer, causes a sample of the first product to be provided to the first customer.

4. The system of claim 2, wherein the refinement control circuit, in adjusting the partiality vector target area, reduces the range of partiality magnitudes defining the partiality vector target area.

5. The system of claim 4, wherein the refinement control circuit, in adjusting the partiality vector target area, adjusts the range of representative partiality directions defining the partiality vector target area.

6. The system of claim 1, wherein the refinement control circuit, in selecting the first product, tests an accuracy of the partiality vector target area by selecting the first product having the first product vectorized characterization that has the alignment that is a threshold vector outside of the partiality vector target area.

7. The system of claim 1, wherein the refinement control circuit, in selecting the first product, tests an accuracy of the partiality vector target area by selecting the first product having the first product vectorized characterization and costs the first customer a premium.

8. The system of claim 7, wherein the premium cost comprises a magnitude of a second product vectorized characterization of the first product that is a premium threshold less than a magnitude of a second customer partiality vector of the first customers.

9. A method of refining retail shopping customer partiality vectors, comprising:
- accessing a customer database storing at least a different set of multiple customer partiality vectors for each of multiple different customers wherein each of the customer partiality vectors has at least one of a magnitude and an angle that corresponds to a magnitude for the person associated with that partiality, and a product database storing at least a different set of multiple product vectorized characterizations for each of multiple different products, wherein each of the vectorized characterizations indicates a measure regarding an extent to which a corresponding one of the products accords with a corresponding one of the multiple customer partiality vectors;
- identifying, for a first customer of the multiple customers, a multi-dimensional partiality vector target area defined within a multi-dimensional representative volume defined by a limited range of partiality magnitudes and limited range of representative partiality directions for a first customer partiality vector, wherein the partiality vector target area represents a multi-dimensional representation of an area in which an unknown actual magnitude and direction for the first customer partiality vector are predicted to lie;
- selecting a first product from the multiple different products having at least a first product vectorized characterization that is within a threshold alignment with the partiality vector target area, and causing the first product to be presented to the first customer;
- receiving, following the first product being presented to the first customer, feedback associated with the first customer and corresponding to the first product;
- adjusting the partiality vector target area based on the feedback and
- implementing at least a portion of the customer database as a distributed customer database maintained across at least multiple different customer computing devices, and causing processing of at least the customer partiality vectors through a plurality of customer computing device control circuits located in the multiple different customer computing devices that are geographically distributed over a geographic area.

10. The method of claim 9, further comprising:
- confirming, based on the feedback comprising at least one subsequent purchase of the first product by the first customer, a level of accuracy of the partiality vector target area; and
- reducing, in adjusting the partiality vector target area, the partiality vector target area.

11. The method of claim 10, wherein the causing the first product to be presented to the first customer comprise causing a sample of the first product to be provided to the first customer.

12. The method of claim 10, wherein the adjusting the partiality vector target area comprises reducing the range of partiality magnitudes of the first customer partiality vector.

13. The method of claim 12, wherein the adjusting the partiality vector target area comprises adjusting the range of representative partiality directions of the first customer partiality vector.

14. The method of claim 9, further comprising:
- testing an accuracy of the partiality vector target area comprises implementing the selecting of the first product such that the first product has the first product vectorized characterization that has the alignment that is a threshold vector outside of the partiality vector target area.

15. The method of claim 9, further comprising:
- testing an accuracy of the partiality vector target area comprises implementing the selecting of the first product such that the first product has the first product vectorized characterization and costs the first customer a premium.

16. The method of claim 15, wherein the selecting the first product comprises selecting the first product having the premium cost comprising a magnitude of a second product vectorized characterization of the first product being a premium threshold less than a magnitude of a second customer partiality vector of the first customer.

* * * * *